(12) United States Patent
Goffe

(10) Patent No.: US 10,906,031 B2
(45) Date of Patent: *Feb. 2, 2021

(54) INTRA-CRYSTALLINE BINARY CATALYSTS AND USES THEREOF

(71) Applicant: PACCAR Inc, Bellevue, WA (US)

(72) Inventor: Randal A. Goffe, Everett, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,035

(22) Filed: Apr. 5, 2019

(65) Prior Publication Data

US 2020/0316571 A1 Oct. 8, 2020

(51) Int. Cl.

| | |
|---|---|
| *B01J 29/06* | (2006.01) |
| *B01J 29/72* | (2006.01) |
| *B01J 29/46* | (2006.01) |
| *B01J 29/40* | (2006.01) |
| *B01J 29/70* | (2006.01) |
| *F01N 3/20* | (2006.01) |
| *F01N 3/035* | (2006.01) |
| *F01N 3/10* | (2006.01) |
| *B01J 37/00* | (2006.01) |
| *B01D 53/94* | (2006.01) |
| *B01J 37/30* | (2006.01) |
| *B01J 29/76* | (2006.01) |
| *B01J 29/85* | (2006.01) |
| *B01J 29/80* | (2006.01) |
| *B01J 29/44* | (2006.01) |
| *B01J 29/48* | (2006.01) |
| *B01J 35/04* | (2006.01) |
| *B01J 29/74* | (2006.01) |
| *B01J 29/78* | (2006.01) |
| *B01J 35/00* | (2006.01) |
| *C01B 39/02* | (2006.01) |
| *C01B 39/06* | (2006.01) |

(Continued)

(52) U.S. Cl.
CPC ........ *B01J 29/723* (2013.01); *B01D 53/9418* (2013.01); *B01J 29/061* (2013.01); *B01J 29/405* (2013.01); *B01J 29/44* (2013.01); *B01J 29/46* (2013.01); *B01J 29/48* (2013.01); *B01J 29/7007* (2013.01); *B01J 29/7015* (2013.01); *B01J 29/7057* (2013.01); *B01J 29/7065* (2013.01); *B01J 29/7215* (2013.01); *B01J 29/743* (2013.01); *B01J 29/7415* (2013.01); *B01J 29/763* (2013.01); *B01J 29/783* (2013.01); *B01J 29/7815* (2013.01); *B01J 29/80* (2013.01); *B01J 29/85* (2013.01); *B01J 35/0006* (2013.01); *B01J 35/04* (2013.01); *B01J 37/009* (2013.01); *B01J 37/30* (2013.01); *C01B 39/02* (2013.01); *C01B 39/065* (2013.01); *F01N 3/035* (2013.01); *F01N 3/106* (2013.01); *F01N 3/2066* (2013.01); *B01D 2255/50* (2013.01); *B01D 2255/502* (2013.01); *B01D 2255/504* (2013.01); *B01D 2257/404* (2013.01); *B01D 2258/012* (2013.01); *B01J 2229/183* (2013.01); *B01J 2229/186* (2013.01); *B01J 2229/42* (2013.01); *C01B 39/04* (2013.01); *C01B 39/40* (2013.01); *C01B 39/48* (2013.01); *F01N 2370/04* (2013.01)

(58) Field of Classification Search
CPC ........ B01J 29/061; B01J 29/405; B01J 29/44; B01J 29/46; B01J 29/48; B01J 29/80; B01J 29/85; B01J 29/7007; B01J 29/7057; B01J 29/7065; B01J 29/7015; B01J 29/723; B01J 29/763; B01J 29/783; B01J 29/743; B01J 29/7815; B01J 29/7415; B01J 29/7615; B01J 2229/183; B01J 35/04; B01J 35/0006; B01J 37/30; B01J 29/7215; B01D 53/9418; B01D 2255/50; B01D 2255/502; B01D 2255/504; B01D 2257/404; B01D 2258/012; Y02T 10/24; C01B 39/02; C01B 39/04; C01B 39/06; C01B 39/065; C01B 39/40; C01B 39/48; F01N 2370/04; F01N 3/035
USPC ........ 502/60, 61, 63, 64, 65, 66, 69, 73, 74, 502/77; 423/702, 704, 705, 706, 713, 423/709; 422/177, 180
See application file for complete search history.

(56) References Cited

U.S. PATENT DOCUMENTS

| | | |
|---|---|---|
| 858,904 A | 7/1907 | Ostwald |
| 3,730,691 A | 5/1973 | Lang et al. |

(Continued)

FOREIGN PATENT DOCUMENTS

| | | |
|---|---|---|
| CN | 103866343 B | 6/2014 |
| CN | 105363497 A | 3/2016 |

(Continued)

OTHER PUBLICATIONS

Chu et al., "Isomorphous Substitution in Zeolite Frameworks", J. Phys. Chem., 89, (1985), pp. 1569-1571.*

(Continued)

*Primary Examiner* — Elizabeth D Wood
(74) *Attorney, Agent, or Firm* — Seed IP Law Group LLP

(57) ABSTRACT

The present disclosure describes, inter alia, binary catalyst compositions including a (metal) zeolite having a crystal lattice that incorporates a metal oxide, wherein the metal oxide is covalently bound to elements within the crystal lattice. The metal oxide forms an integral part of the (metal) zeolite crystal lattice, forming covalent bonds with at least the Si or Al atoms within the crystal lattice of the (metal) zeolite, and is dispersed throughout the (metal) zeolite (Continued)

crystal lattice. The metal oxide can substitute atoms within the crystal lattice of the (metal) zeolite.

21 Claims, 19 Drawing Sheets

(51) Int. Cl.
    *C01B 39/48* (2006.01)
    *C01B 39/04* (2006.01)
    *C01B 39/40* (2006.01)

(56) References Cited

U.S. PATENT DOCUMENTS

| | | | |
|---|---|---|---|
| 4,711,871 | A | 12/1987 | Wachs et al. |
| 4,929,581 | A | 5/1990 | Steinwandel et al. |
| 4,983,274 | A | 1/1991 | Chen et al. |
| 5,149,512 | A | 9/1992 | Li et al. |
| 6,407,032 | B1 | 6/2002 | Labarge et al. |
| 6,475,944 | B1 | 11/2002 | Yang et al. |
| 6,826,906 | B2 | 12/2004 | Kakwani et al. |
| 7,078,004 | B2 | 7/2006 | Voss et al. |
| 7,229,597 | B2 | 6/2007 | Patchett et al. |
| 7,509,799 | B2 | 3/2009 | Amou et al. |
| 7,632,775 | B2 | 12/2009 | Zhou et al. |
| 7,902,107 | B2 | 3/2011 | Patchett et al. |
| 7,998,423 | B2 | 8/2011 | Boorse et al. |
| 8,017,097 | B1 | 9/2011 | Southward et al. |
| 8,017,543 | B2 | 9/2011 | Andy et al. |
| 8,119,088 | B2 | 2/2012 | Boorse et al. |
| 8,359,832 | B2 | 1/2013 | Yi et al. |
| 8,388,920 | B2 | 3/2013 | Botte |
| 8,501,132 | B2 | 8/2013 | Fu et al. |
| 8,568,675 | B2 | 10/2013 | Deeba et al. |
| 8,667,785 | B2 | 3/2014 | Blakeman et al. |
| 8,679,434 | B1 | 3/2014 | Li et al. |
| 8,748,333 | B2 | 6/2014 | Nemeth et al. |
| 8,828,900 | B2 | 9/2014 | Takagi et al. |
| 8,989,637 | B2 | 3/2015 | Yoshii |
| 9,005,559 | B2 | 4/2015 | Sumiya et al. |
| 9,034,269 | B2 | 5/2015 | Hilgendorff et al. |
| 9,186,654 | B2 | 11/2015 | Qi et al. |
| 9,737,877 | B2 | 8/2017 | Goffe |
| 9,757,691 | B2 * | 9/2017 | Goffe ............... B01D 53/9418 |
| 9,764,287 | B2 | 9/2017 | Goffe |
| 10,188,986 | B2 | 1/2019 | Goffe |
| 2002/0049137 | A1 | 4/2002 | Morikawa et al. |
| 2002/0054844 | A1 | 5/2002 | Pfeifer et al. |
| 2002/0132724 | A1 | 9/2002 | Labarge et al. |
| 2005/0013756 | A1 | 1/2005 | Amou et al. |
| 2006/0049063 | A1 | 3/2006 | Murphy et al. |
| 2006/0057046 | A1 | 3/2006 | Punke |
| 2006/0257303 | A1 | 11/2006 | Telford |
| 2008/0314027 | A1 | 12/2008 | Barber et al. |
| 2009/0173063 | A1 | 7/2009 | Boorse et al. |
| 2009/0205324 | A1 | 8/2009 | Girard et al. |
| 2009/0214397 | A1 | 8/2009 | Shirono et al. |
| 2010/0139152 | A1 | 6/2010 | Hucul et al. |
| 2010/0146948 | A1 | 6/2010 | DaCosta et al. |
| 2010/0146950 | A1 | 6/2010 | Hayashi et al. |
| 2010/0172828 | A1 | 7/2010 | Althoff et al. |
| 2010/0180580 | A1 | 7/2010 | Boorse et al. |
| 2010/0247407 | A1 | 9/2010 | Larcher et al. |
| 2011/0030346 | A1 | 2/2011 | Neubauer et al. |
| 2011/0142737 | A1 | 6/2011 | Seyler et al. |
| 2011/0155643 | A1 | 6/2011 | Tov et al. |
| 2011/0250114 | A1 | 10/2011 | Augustine et al. |
| 2011/0293941 | A1 | 12/2011 | Chaumonnot et al. |
| 2011/0302909 | A1 | 12/2011 | Botte |
| 2012/0058034 | A1 | 3/2012 | Ogunwumi et al. |
| 2012/0121486 | A1 | 5/2012 | Collier et al. |
| 2012/0175247 | A1 | 7/2012 | Darrel |
| 2012/0230881 | A1 | 9/2012 | Boger et al. |
| 2012/0247092 | A1 | 10/2012 | Boorse |
| 2013/0102819 | A1 | 4/2013 | Szesni et al. |
| 2013/0121902 | A1 | 5/2013 | Adelmann et al. |
| 2013/0158138 | A1 | 6/2013 | Jothimurugesan et al. |
| 2013/0336865 | A1 | 12/2013 | Brisley et al. |
| 2014/0041366 | A1 | 2/2014 | Seyler et al. |
| 2014/0044627 | A1 | 2/2014 | Siani et al. |
| 2014/0061099 | A1 * | 3/2014 | Hussain ............... C10G 45/64 208/295 |
| 2014/0140909 | A1 | 5/2014 | Qi et al. |
| 2014/0141963 | A1 | 5/2014 | Jones et al. |
| 2014/0193746 | A1 | 7/2014 | Cerri |
| 2014/0227155 | A1 | 8/2014 | Phillips et al. |
| 2014/0234190 | A1 | 8/2014 | McKenna |
| 2015/0000737 | A1 | 1/2015 | Miyake et al. |
| 2015/0017075 | A1 | 1/2015 | Jinbo et al. |
| 2015/0017083 | A1 | 1/2015 | Maunula |
| 2015/0037233 | A1 | 2/2015 | Fedeyko et al. |
| 2015/0060472 | A1 | 3/2015 | Most et al. |
| 2015/0114882 | A1 | 4/2015 | Nagayasu et al. |
| 2015/0209766 | A1 | 7/2015 | Xavier et al. |
| 2015/0360212 | A1 | 12/2015 | Chandler et al. |
| 2016/0040576 | A1 | 2/2016 | Chandler et al. |
| 2016/0045868 | A1 | 2/2016 | Sonntag et al. |
| 2016/0074809 | A1 | 3/2016 | Goffe |
| 2016/0074839 | A1 | 3/2016 | Goffe |
| 2016/0136617 | A1 | 5/2016 | Nazarpoor et al. |
| 2016/0214086 | A1 | 7/2016 | Ano et al. |
| 2016/0303555 | A1 | 10/2016 | Park et al. |
| 2016/0339389 | A1 | 11/2016 | Hoke et al. |
| 2016/0346765 | A1 | 12/2016 | Nazarpoor et al. |
| 2017/0128881 | A1 | 5/2017 | Goffe |
| 2017/0128883 | A1 | 5/2017 | Goffe |
| 2017/0128884 | A1 | 5/2017 | Goffe |
| 2017/0128885 | A1 | 5/2017 | Goffe |
| 2017/0128913 | A1 | 5/2017 | Goffe |
| 2017/0320014 | A1 | 11/2017 | Hanson |

FOREIGN PATENT DOCUMENTS

| | | |
|---|---|---|
| CZ | 293 108 B6 | 2/2004 |
| DE | 4203807 A1 | 8/1993 |
| EP | 1945356 B1 | 9/2012 |
| EP | 3370866 A1 | 9/2018 |
| GB | 2504024 A | 1/2014 |
| GB | 2504024 B | 3/2014 |
| WO | 2004/022229 A1 | 3/2004 |
| WO | 2008/094889 A1 | 8/2008 |
| WO | 2009/050323 A1 | 4/2009 |
| WO | 2009/118195 A1 | 10/2009 |
| WO | 2012/059144 A1 | 5/2012 |
| WO | 2013/121112 A1 | 8/2013 |
| WO | 2014/027207 A1 | 2/2014 |
| WO | 2015/060472 A1 | 4/2015 |
| WO | 2017/079598 A1 | 5/2017 |
| WO | 2017/085646 A1 | 5/2017 |

OTHER PUBLICATIONS

Neylon et al., "Bifunctional Catalysts for the Selective Catalytic Reduction of NO by Hydrocarbons", Proceedings 9th Diesel Emissions Reduction Conference, 2003, pp. 1-5.*
Otto et al., "Synthetic strategies for the encapsulation of nanoparticles of Ni, Co and Fe oxides within crystalline microporous aluminosilicates", Microporous and Mesoporous Materials, 270 (2018), pp. 10-23.*
Luo et al., "Facile synthesis of zeolite-encapsulated iron oxide nanoparticles as superior catalyst for phenol oxidation", RSC Adv. 5, 2015, pp. 29509-29512.*
Xu et al., "Encapsulation of Metal Nanoparticle Catalysts Within Mesoporous Zeolites and Their Enhanced Catalytic Performances: A Review", Front Chem., 6:550, 2018, pp. 1-54.*
Carvalho et al., Design of nanocomposites with cobalt encapsulated in the zeolite micropores for selective sythesis of isoparaffins in Fischer-Tropsch reaction, Catal. Sci. Technol. 7, 2017, pp. 5019-5027.*
Bernhard, A.M., et al., "Catalytic Urea Hydrolysis in the Selective Catalytic Reduction of NOx: Catalyst Screening and Kinetics on Anatase TiO2 and ZrO2," Journal of Catalysis Science and Technology, 4(3):942, 2013.

(56) References Cited

OTHER PUBLICATIONS

Birkhold, F., et al., "Modeling and Simulation of the Injection of Urea-Water-Solution for Automotive SCR DeNOx-Systems," Applied Catalysis B: Environmental 70(1-4):119-127, Jan. 2007.

Calvo Zueco, S., et al., "Urea SCR Systems in Focus New Challenges in the Development of Exhaust Systems," Springer Link [Online], Sep. 2007, <https://static-content.springer.com/lookinside/art%3A10.1007%2FBF03226854/001.png> [retrieved Feb. 17, 2016], 3 pages.

Conway, R., et al., "Demonstration of SCR on a Diesel Particulate Filter System on a Heavy Duty Application," SAE Technical Paper 2015-01-1033, Apr. 14, 2015, Abstract.

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

Dong, H., et al., "Effect of Urea Thermal Decomposition on Diesel NOx-SCR Aftertreatment Systems," SAE Technical Paper 2008-01-1544, Abstract.

"Engine Aftertreatment Systems: Operator's Manual," No. Y53-1090C, Paccar Inc, Bellevue, Washington, 2011, 44 pages.

European Search Report dated Jul. 11, 2016, issued in related European Application No. 15184785, filed Sep. 11, 2015, 11 pages.

Extended European Search Report, dated Feb. 4, 2019, mailed in corresponding European Application No. 18175406.0, filed May 31, 2018, 12 pages.

Extended European Search Report, dated Oct. 15, 2018, mailed in corresponding European Application No. 18175456.5, filed Jun. 4, 2018, 9 pages.

Final Office Action dated Oct. 11, 2016, from U.S. Appl. No. 14/486,858, filed Sep. 15, 2014, 15 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

International Search Report and Written Opinion dated Mar. 30, 2017, received for International Application No. PCT/US2016/060583, filed Nov. 4, 2016, 7 pages.

Johannessen, T., "3rd Generation SCR System Using Solid Ammonia Storage and Direct Gas Dosing: Expanding the SCR window for RDE," presented by Dr. Tue Johannessen at US DoE DEER conference, 2012, 23 pages.

Koebel, M., and E.A. Strutz, "Thermal and Hydrolytic Decomposition of Urea for Automotive Selective Catalytic Reduction Systems: Thermochemical and Practical Aspects," Journal of Industrial and Engineering Chemistry 42:2093-2100, 2003.

Köster, K., et al., "Regeneration of Hemotiltrate by Anodic Oxidation of Urea," Artificial Organs 7(2):163-168, May 1983.

Krocher, "Chapter 9: Aspects of Catalyst Development for Mobile Urea-SCR Systems—From Vanadia-Titania Catalysts to Metal-Exchanged Zeolites," in P. Granger and V.I. Parvulescu (ed.), Elsevier B.V., 2007, pp. 261-289.

Kwak, J.H., et al., "Effects of Hydrothermal Aging on $NH_3$—SCR Reaction Over Cu/Zeolites," Journal of Catalysis 287(1):203-209, Mar. 2012.

Kwak, J.H., et al., "Excellent Activity and Selectivity of Cu—SSZ-13 in the Selective Catalytic Reduction of NO(x) and $NH_3$," Journal of Catalysis 275(2):187-190, Oct. 2010.

Neylon et al., "Bifunctional Catalysts for the Selective Catalytic Reduction of NO by Hydrocarbons," Proceedings of 9th Diesel Emissions Reduction Conference, Newport, R.I., Aug. 24-28, 2003, 5 pages.

Non-Final Office Action dated Jan. 19, 2017, from U.S. Appl. No. 14/935,199, filed Nov. 6, 2015, 8 pages.

Non-Final Office Action dated Jan. 23, 2017, from U.S. Appl. No. 14/935,048, filed Nov. 6, 2015, 17 pages.

Non-Final Office Action, dated Sep. 19, 2018 in related U.S. Appl. No. 15/612,833, filed Jun. 2, 2017, 25 pages.

Office Action dated Dec. 1, 2016, from related U.S. Appl. No. 14/934,955, filed Nov. 6, 2015, 20 pages.

Office Action dated Dec. 1, 2016, from U.S. Appl. No. 14/934,955, filed Nov. 6, 2015, 27 pages.

Office Action dated Dec. 12, 2016, from related U.S. Appl. No. 14/935,001, filed Nov. 6, 2015, 7 pages.

Office Action dated Dec. 12, 2016, from U.S. Appl. No. 14/935,001, filed Nov. 6, 2015, 15 pages.

Office Action dated Jan. 19, 2017, from related U.S. Appl. No. 14/935,199, filed Nov. 6, 2015, 19 pages.

Office Action dated Jan. 19, 2017, from U.S. Appl. No. 14/935,199, filed Nov. 6, 2015, 8 pages.

Office Action dated Jan. 23, 2017, from related U.S. Appl. No. 14/935,048, filed Nov. 6, 2015, 9 pages.

Office Action dated Jan. 23, 2017, from related U.S. Appl. No. 14/935,048, filed Nov. 6, 2015, 20 pages.

Office Action dated May 31, 2016, from U.S. Appl. No. 14/486,858, filed Sep. 15, 2014, 17 pages.

Partial European Search Report dated Mar. 16, 2016, issued in corresponding European Application No. 15184785.2, filed Sep. 11, 2015, 6 pages.

Partial European Search Report, dated Oct. 15, 2018, mailed in corresponding European Application No. 18175406.0, filed May 31, 2018, 14 pages.

Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.

Patzer II, J.F., et al., "Voltage Polarity Relay-Optimal Control of Electrochemical Urea Oxidation," IEEE Transactions on Biomedical Engineering 38(11):1157-1162, Nov. 1991.

Piazzesi et al., "Isocyanic Acid Hydrolysis Over Fe—ZSM5 in Urea-SCR," Catalysis Communications 7(8):600-603, Aug. 2006.

Rappé, K.G., "Combination and Integration of DPF-SCR Aftertreatment Technologies," presented by Kenneth G. Rappé at Annual Merit Review and Peer Evaluation, May 16, 2012, 24 pages.

Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.

Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.

Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.

Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.

Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.

Rappé, K.G., et al., "II.B.12 Combination and Integration of DPF-SCR After-Treatment," Advanced Combustion Engine R&D, FY 2011 Annual Report, Pacific Northwest National Laboratory, Richland, Washington, pp. 227-230.

Restriction Requirement dated Jan. 7, 2016, from U.S. Appl. No. 14/486,858, filed Sep. 15, 2014, 9 pages.

(56) References Cited

OTHER PUBLICATIONS

Shoeib, M., et al., "Electroless Nickel Coatings on Glass Substrate: Physical and Electrochemical Properties," <https://www.steel-grips.com/articles/2013/sg13002.pdf>, 4 pages.

Extended European Search Report, dated Jun. 18, 2019, mailed in corresponding EP Application No. 16863064.8, filed Nov. 4, 2016, 8 pages.

Borodianska, H., et al., "Nanoblast Synthesis and SPS of Nanostructured Oxides for SOFC," Journal of Electroceramics, 22(1-3):47-54, Dec. 2007.

Communication Pursuant to Article 94(3) EPC, issued in corresponding European Application No. 15184785.2, filed Sep. 11, 2015, 6 pages.

Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.

Yao, S.J., et al., "Anodic Oxidation of Urea and an Electrochemical Approach to De-ureation," Nature 241(5390):471-472, Feb. 1973.

Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.

Yim et al., "Decomposition of Urea into NH3 for the SCR Process," Ind. Eng. Chem. Res. 2004, 43, 4856-4863.

Canadian Office Action dated Aug. 8, 2019, issue from corresponding Canadian Application No. 3,004,079, filed Nov. 4, 2016, 3 pages.

Shwan et al., "Solid-State Ion-Exchange of Copper into Zeolites Facilitated by Ammonia at Low Temperature," *ACS Catal.* 5, pp. 16-19, 2015. (4 pages).

* cited by examiner

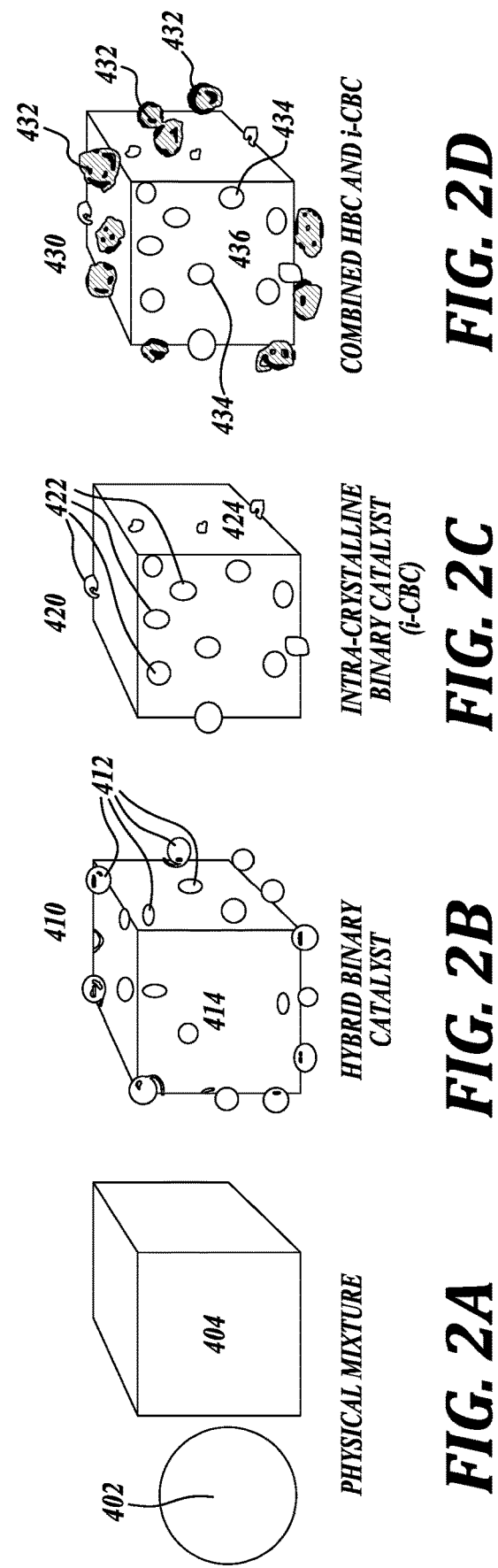

INTRA-CRYSTALLINE BINARY CATALYSTS AND USES THEREOF

BACKGROUND

Internal combustion engine exhaust emissions, and especially diesel engine exhaust emissions, have come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Aftertreatment systems may be utilized to reduce or eliminate emissions of these and other combustion products.

FIG. 1A shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96, the diesel particulate filter (DPF) 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

The treated exhaust gases can then proceed through a compartment containing a diesel exhaust fluid (DEF) doser 102 for the introduction of a reductant, such as ammonia or a urea solution. The exhaust gases then flow to a selective catalytic reduction (SCR) system 104, which can include a catalytic core having a selective catalytic reduction catalyst (SCR catalyst) loaded thereon.

System 24 can include one or more sensors (not illustrated) associated with components of the system 24, such as one or more temperature sensors, $NO_x$ sensor, $NH_3$ sensor, oxygen sensor, mass flow sensor, particulate sensor, and a pressure sensor.

As discussed above, the exhaust aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

The performance of the SCR catalyst is often counterbalanced by catalyst durability. This challenge is further compounded by the increasingly stringent emissions regulatory demands on the one hand, and the economic pressure surrounding fuel economy on the other. Furthermore, the performance of the SCR catalyst is influenced by the level of engine out $NO_x$ (EO $NO_x$) that has to be processed by the SCR catalyst. The current trend is in the direction of higher engine out $NO_x$ to improve fuel economy, while emission levels are simultaneously being reduced. For example, at present, EO $NO_x$ can reach as high as 7 g/kW-hr for at least a short period of time. However, it is anticipated that in the future, there will be a move towards very low tailpipe $NO_x$ (e.g., decreasing from about 0.2 to about 0.02 g/kW-hr).

High EO $NO_x$ has been shown to result in urea deposit build up in the SCR, due to the extremely high levels of diesel exhaust fluid that is introduced into the system, and insufficient residence time for complete decomposition to form $NH_3$. The formation and accumulation of urea deposits on the SCR catalyst can result in severe damage to both the chemical and physical integrity of the SCR coating. Furthermore, the high intensity of diesel exhaust fluid dosing and the relatively long duration of the dosing in urea decomposition reactor 102 can result in large quantities of water being released onto the SCR catalyst. As the SCR catalyst can be primarily composed of zeolites, which are powerful water adsorbing materials, the quantities of water can present a problem with both durability and cold start performance of the SCR catalyst.

At low EO $NO_x$ conditions, challenges are similar to those present under extended idling and cold start conditions. In other words, when SCR temperatures are too low for diesel exhaust fluid dosing and normal SCR operation (between about 250-450° C.), other strategies are required to meet emissions standards.

Without wishing to be bound by theory, it is believed that the advent of engine gas recirculation (EGR) has resulted in reduced peak in-cylinder temperatures for combustion to reduce engine out $NO_x$. The reduced peak in-cylinder temperatures are highly desirable from an emissions control perspective. However, the lower peak in-cylinder temperatures also result in undesirable lower fuel economy. The reduced engine exhaust temperatures that result from increasing use of EGR also have a negative impact on cold-start conditions for engine aftertreatment system (EAS) performance. Effective emissions control by EAS requires temperatures of at least 200° C. to be attained before DEF dosing may commence. Therefore, during the EAS heat-up period under cold-start conditions (i.e., at temperatures of less than 200° C.), there is no emissions control.

Thus, some challenges that are encountered in emissions control include:

(1) Cold-start conditions with relatively low engine exhaust temperatures. While cold start conditions can be addressed by close coupling the SCR to the engine to achieve maximum heat-up rate, with exposure of the SCR catalyst to non-pretreated exhaust directly from the engine; however, only partial $NO_x$ reduction can be achieved in this manner. Therefore, a second downstream SCR (or a SCRF) is required.

(2) Increased system size and complexity, which arise when the EAS includes a close coupled zeolite-based SCR, therefore, a DOC upstream of the SCR is required for $NO_2$-make for optimal performance, with a DEF doser and an ammonia slip catalyst (ASC), also called an ammonia oxidation catalyst (AMOX), downstream of the SCR to decrease $NH_3$ slip into the DOC. In some instances, while a close coupled vanadia-based SCR would not require a DOC upstream of the SCR, there exists a risk of sublimed vanadium escaping into the environment.

(3) Space limitations for close coupling, which require that the EAS be made more compact, for example, by combining SCR and DPF to form a SCRF, which presents the following challenges:
  (i) Competition between the fast SCR reaction and soot oxidation reaction for the available $NO_2$ from the DOC;
  (ii) No passive soot oxidation, because platinum group metals (PGMs) cannot be used on the DPF substrate due to the presence of $NH_3$ for the SCR reaction. Oxidation of $NH_3$ with PGMs also produces $N_2O$, which is an undesirable greenhouse gas.
  (iii) The reduced ash loading capacity of the SCRF relative to a DPF and the associated higher pressure change ($\Delta P$) dictate a shorter ash cleaning interval and higher cost of ownership for the consumer.
  (iv) The potential for $NH_3$ and/or DEF to suppress passive soot oxidation due to:
    (a) Neutralization of $NO_2$ by ammonium nitrate formation, and/or
    (b) Deposition of undecomposed urea particulates onto the catalysts from DEF, which contribute to $\Delta P$ and potential catalyst poisoning.

(4) The potential for increased poisoning and hydrothermal aging of EAS catalysts are a major concern that arises from both close coupling of the SCR and in particular, when SCR on DPF (e.g., SCRF) technologies are employed.

(5) Increasingly stringent emissions regulations are likely to be enforced in the future; including tailpipe (TP) $NO_x \leq 0.02$ g/kw-hr, lower $N_2O$ emissions standards, and generally tightened greenhouse gas regulation.

Without wishing to be bound by theory, it is believed that the properties of synthetic aluminosilicate zeolite molecular sieves form the basis of numerous commercially important catalytic, adsorption, and ion exchange applications due to a unique combination of high surface area, uniform porosity, and electrostatically-charged sites induced by tetrahedrally coordinated $Al^{3+}$. It is believed that the active sites of zeolites can be modified and adsorbents and catalysts can be tailor-made for a wide range of uses.

Emissions control is one of the most important uses for zeolite-based catalysts. To increase copper loading, which leads to increased ammonia storage, two main strategies have been used by catalyst suppliers:

(1) Increased $Al_2O_3$ content of the zeolite (for locking Cu ions in place in the zeolite framework) increases the number of catalytic sites for ammonia storage and $NO_x$ reduction. For example, the Cu can be held in close association with the $Al^{3+}$ sites of the framework by ion exchange forces (e.g., ionic bonds), and can have a certain degree of mobility and can be exchanged with other cationic species. However, higher $Al_2O_3$ content results in lower $SiO_2$ content and reduced durability. Therefore, the optimum Si/Al ratio is considered to be 12, which provides a compromise between ammonia storage, $NO_x$ reduction, and catalyst durability. As used herein, the term "framework" refers to the crystal lattice of a given material.

(2) Prolonged (and often repeated) dilute copper exchange steps are required for achieving optimal copper loading in zeolite catalysts, while minimizing formation of copper oxide (CuO). Copper oxide is not catalytically active for NOx conversion, but is directly responsible for $N_2O$ formation, particularly in the presence of $NO_2$. In particular, it is believed that formation of CuO occurs under two conditions:
  (a) To decrease the likelihood of CuO formation during copper loading, very dilute copper solutions, extended ion exchange procedure times, and acid conditions (pH ~3) are used. The acidic conditions maintain CuO in solution and decrease the likelihood of deposition on the zeolite crystal surface.
  (b) Catalyst aging causes copper migration from the active sites created by $Al_2O_3$ content to form CuO crystals outside of the (Si/Al) framework. High copper loading in the zeolite framework tends to cause more than one copper ion in each location, thus facilitating CuO nanocrystal formation in the zeolite crystal upon aging. When nanocrystals of CuO form within the zeolite crystal, this can erode the crystal structure from the inside, and contribute to physical damage of the catalyst in the aging process (in addition to contributing to $N_2O$-make). In order to minimize this occurrence, very dilute copper exchange solutions and long process times are employed. In addition, ion exchange is an equilibrium process, which sets a limitation on how much copper can be loaded into the available active sites of the zeolite during each loading step; thereby limiting catalytic activity. Thus, multiple copper loading steps with dilute solution is a common practice.

Prolonged ion exchange procedures in relatively dilute solution achieve the desired level of copper loading for conventional SCR catalysts. A strategy based upon decreasing (Si/Al) ratio enables the optimization of ammonia storage. However, this approach tends to reduce hydrothermal durability as aluminum content increases.

Thus, ultra-low $NO_x$ regulations dictate that aftertreatment catalysts must function more efficiently at lower temperatures; including the cold-start portion of the Federal Test Procedure cycle. In addition, $N_2O$-make must remain low, or ever be lower than current tailpipe levels. There is a need for catalysts (e.g., engine aftertreatment catalysts) that can address the challenges facing emission control. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a binary catalyst composition, including a zeolite having a crystal lattice comprising a metal oxide, wherein the metal oxide is covalently bound to elements within the crystal lattice.

In another aspect, the present disclosure features a method of making the binary catalyst composition above, including: providing a reaction mixture including an organic zeolite-templating agent, a seed catalyst composition including a plurality of metal oxide nanoparticles hybridized to a zeolite, a zeolite precursor, optionally a metal oxide precursor, and a base; stirring the mixture; incubating the mixture at elevated temperature for a period of time; filtering the mixture to obtain a solid; washing and drying the solid, and calcining the solid to provide the binary catalyst composition.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 2A is an illustration of a physical mixture of (metal) zeolite and metal oxide.

FIG. 2B is an illustration of a hybrid binary catalyst.

FIG. 2C is an illustration of an intra-crystalline binary catalyst of the present disclosure.

FIG. 2D is an illustration of an embodiment of an intra-crystalline binary catalyst of the present disclosure having additional metal oxides nanoparticles covalently bound to the surface of the (metal) zeolite.

FIG. 3 provides evidence of the competition between $Al^{3+}$ and the covalent bonding moiety of the metal oxide nanoparticles for bonding sites in a (metal) zeolite.

DETAILED DESCRIPTION

Figure 1A:
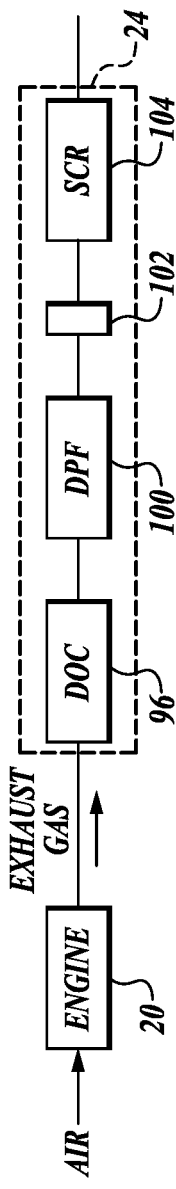
FIG. 1A is a block diagram of an example of an aftertreatment system coupled to an internal combustion engine.

The present disclosure describes, inter alia, intra-crystalline binary catalyst compositions including a primary catalyst (e.g., a (metal) zeolite) having a crystal lattice (e.g., a (metal) zeolite's crystal lattice) that incorporates a secondary catalyst (e.g., a metal oxide), wherein the secondary catalyst is covalently bound to elements within the crystal lattice of the primary catalyst. In an intra-crystalline binary catalyst, the secondary catalyst forms an integral part of the primary catalyst's crystal lattice, forming covalent bonds with at least the Si or Al atoms within the crystal lattice of the primary catalyst, and is dispersed throughout the primary catalyst's crystal lattice. The secondary catalyst can substitute atoms within the crystal lattice of the primary catalyst. The catalyst composition is also referred to herein as an intra-crystalline binary catalyst (i-CBC).

The catalyst compositions of the present disclosure enhance ammonia storage and low temperature $NO_x$ reduction, facilitate passive soot oxidation when the catalyst composition is in an SCR-on-DPF (SCRF) configuration, and provide other beneficial catalytic properties, discussed below. When the catalyst composition is loaded with a metal, such as copper or iron, in addition to the metal oxide serving as a sink for "mopping up" or scavenging reactive metal species (e.g., CuO) released from the (metal) zeolite framework (e.g., due to hydrothermal aging), excess metal (e.g., copper or iron) in the catalyst composition do not become located at the desired $Al_2O_3$ sites of the (metal)

zeolite, which have $NO_x$ reduction catalytic activity, thereby providing enhanced hydrothermal stability compared to physical mixtures of (metal) zeolite and metal oxide, or hybrid binary catalysts including (metal) zeolite and metal oxide covalently bound to the surface of the (metal) zeolite, as described, for example, in U.S. application Ser. No. 15/612,815 filed Jun. 2, 2017 and issued as U.S. Pat. No. 10,675,586 on Jun. 9, 2020 and in U.S. application Ser. No. 15/612,833 filed Jun. 2, 2017 which has been published as US Publication No. 2018/0345217 on Dec. 6, 2018 and allowed on Jul. 15, 2020, each of which is incorporated herein by reference in its entirety.

The catalyst compositions of the present disclosure represent a new class of (metal) zeolite, with intra-crystalline metal oxide nanoparticles. The catalyst compositions can have ≥1% by weight metal oxide within the (metal) zeolite crystal lattice itself (e.g., a SSZ-13 chabazite crystal lattice) and about double the conventional alumina content of the zeolite. When loaded with copper cations, the catalyst compositions of the present disclosure exhibit improved $NO_x$ reduction and ammonia storage, while showing little to no increase in $N_2O$ produced (partially) from ammonia oxidation.

As discussed above, a class of zeolites modified by covalently bounded metal oxide nanoparticles on the surface of the zeolite, referred to as hybrid binary catalysts, were previously described in U.S. application Ser. Nos. 15/612, 815 and 15/612,833, filed Jun. 2, 2017. Compared to hybrid binary catalysts described in U.S. application Ser. Nos. 15/612,815 and 15/612,833, the intra-crystalline catalyst compositions of the present disclosure have the beneficial properties previously described for the hybrid binary catalysts, with the following additional benefits:
 i. the intra-crystalline catalyst compositions have enhanced ammonia storage compared to the hybrid binary catalysts;
 ii. the intra-crystalline catalyst compositions have enhanced copper loading with minimal CuO formation and corresponding $N_2O$-make compared to the hybrid binary catalysts;
 iii. the intra-crystalline catalyst compositions have improved catalyst durability compared to the hybrid binary catalysts;
 iv. the intra-crystalline catalyst compositions have better low temperature passive soot oxidation lightoff (e.g., at ≤200° C.) compared to the hybrid binary catalysts;
 v. the intra-crystalline catalyst compositions have reduced water holding capacity, and hence faster heat-up at "cold start" compared to the hybrid binary catalysts;
 vi. the intra-crystalline catalyst compositions have vastly improved urea hydrolysis properties compared to the hybrid binary catalysts; and
 vii. the intra-crystalline catalyst compositions have lower manufacturing cost compared to the hybrid binary catalysts.

FIG. 2A-2C schematically illustrates the structural differences between a physical mixture of metal oxides with a (metal) zeolite (FIG. 2A), a hybrid binary catalyst (FIG. 2B), and the intra-crystalline binary catalyst compositions (FIG. 2C) of the present disclosure. FIG. 2A shows a physical mixture of metal oxides 402 with (metal) zeolites 404, where both are micron sized and exist as separate particles that are physically mixed with one another. FIG. 2B shows a hybrid binary catalyst 410, where small metal oxide nanoparticles 412 are covalently attached to the surface of larger (metal) zeolite particles 414. FIG. 2C is an illustration of the intra-crystalline catalyst composition 420, where nanoparticles of metal oxides 422 are covalently incorporated into and throughout the crystal lattice of (metal) zeolite 424. FIG. 2D is a combination of a hybrid binary catalyst 430 and an intra-crystalline binary catalyst composition, and thus also includes an intra-crystalline binary catalyst composition. In FIG. 2D, metal oxide nanoparticles 432 are covalently attached to the surface of the (metal) zeolite particles 436 and metal oxide nanoparticles 434 are also covalently bound throughout the crystal lattice of the (metal) zeolite's crystal framework. The composition of the metal oxide nanoparticles 432 and 434 can be the same, or different.

Definitions

As used herein, "hybridization," "hybridizing," or "hybridized" refers to the chemical reaction between precursor molecules with specific elements on the surface of the (metal) zeolite, resulting in formation of bonds (e.g., covalent bonds, and/or ionic bonds) between the precursors and elements in the (metal) zeolite in the metal oxide nanoparticles. The hybridization can be verified using scanning transmission electron microscopy with elemental analysis, X-ray diffraction, and electron energy loss spectroscopy (EELS) microstructural analysis techniques. For example, elemental mapping of metal oxide and any cationic dopants can show an aggregate of metal oxide nanoparticle, and Si and/or Al in the zeolite can be present in the metal oxide phase, with no zeolite crystal present in the background. Furthermore, STEM studies can indicate that the metal oxide phase is crystalline. Therefore, it is reasonable to assume that the incorporation of Si and Al into the metal oxide phase is by way of covalent and/or ionic bonds in the $ZrO_2$ crystal lattice. Without wishing to be bound by theory, it is believed that a metal oxide precursor first forms a coordination bond with the surface atoms of a zeolite (i.e., Si and/or Al), which is facilitated by the use of a chelating agent, such as urea, in the reaction mixture. The formation of this coordination complex causes disruptions in the crystal structure near the surface. Therefore, a certain degree of deconstruction of the zeolite surface layer(s) occurs to release Si and/or Al for incorporation into the metal oxide phase as it forms.

As used herein, "intra-crystalline" refers to incorporation of an element into a host material's crystal lattice structure, where the element occupies a crystal lattice site that would otherwise be occupied by an atom of the host material. The element forms one or more covalent bonds with the atoms of the crystal lattice and can replace a host's atom in the crystal lattice.

As used herein, "loading" is synonymous to "exchanging," and "loaded" is synonymous to "exchanged," and refer to the replacement of one cation at an ion exchange site in the zeolite with a target cation (e.g., $Cu^{2+}$ and/or $Fe^{3+}$), through an ion exchange mechanism.

As used herein, "doping" refers to the formation of covalent bonds where an introduced cation becomes incorporated into the lattice structure of the host. For example, doping occurs when elements such as yttrium are introduced into the metal oxide $ZrO_2$, and when copper from an exemplary Cu-loaded SSZ-13 framework is scavenged by the metal oxide (where the copper is covalently bound into the metal oxide's lattice structure). Therefore, compared to loading, doping is a more permanent form of cation sequestration.

As used herein, "microporous" refers to material having pores of a maximum pore dimension of up to 2 nm, "mesoporous" refers to a material having pores of a maximum pore dimension of from 2 to 50 nm, and "macroporous" refers to a material having pores of a maximum pore dimension of greater than 50 nm. The maximum pore dimension refers to the maximum cross-section in a given pore of irregular or regular shape.

As used herein, "oxidative power" is defined as the temperature at which 50% of the CO is oxidized to $CO_2$ when a simulated exhaust stream including nitric oxide (600 ppm), ethylene (75 ppm $C_2H_4$), CO (300 ppm), oxygen (10%), carbon dioxide (5.6%), water (6%), and nitrogen (the balance of simulated exhaust stream), is exposed to a catalyst (e.g., a metal oxide catalyst) at a space velocity of 60,000 $hr^{-1}$ in a reverse light off study (starting at 600° C., to a temperature of 160° C.). As an example, a metal oxide with a relatively low oxidative power has a ($T_{50}CO$) of >600° C. (e.g., $ZrO_2$), while a metal oxide with relatively high oxidative power has a ($T_{50}CO$) of <500° C.

As used herein, "reductive power" refers to the ability to enhance the $NO_x$ storage property to enhance $NO_x$ conversion.

As used herein, "significantly" or "substantially" refers to greater than 90% (e.g., greater than 95%, or greater than 98%).

As used herein, "about" refers to ±5% (e.g., ±3%) of a given value.

As used herein, a selective catalytic oxidation (SCO) catalyst is a catalyst that facilitates:
  i. Formation of $NO_2$ species in situ by the reaction of $NO+\frac{1}{2}O_2 \rightarrow NO_2$, to serve as reactive intermediates from nitrogen oxides in the exhaust stream, without significantly oxidizing $NH_3$ into $N_2O$. For embodiments of the catalysts of the present disclosure, even if $NH_3$ oxidation occurs, in some instances the primary product is $N_2$, which is a desirable outcome.
  ii. Hydrocarbon oxidation at considerably lower temperatures, for example, the oxidation of longer chain unsaturated hydrocarbons such as propylene.

As used herein, a selective catalytic reduction (SCR) catalyst is a catalyst that catalyzes the reduction of $NO_x$ to nitrogen and water.

As used herein, a urea hydrolysis catalyst is a catalyst that hydrolyzes urea and isocyanic acid (HNCO) with minimal or zero formation of high molecular weight aromatic (HMAr) compounds such as cyanuric acid, ammilide, ammeline, and/or melamine.

As used herein, a DPF catalyst is a catalyst that captures soot particles and contains platinum group metals (PGM) for $NO_2$-make to facilitate soot lightoff at relatively low temperatures (e.g., <350° C.) for passive soot oxidation. The DPF can also serve as an ash storage device.

As used herein, a DOC is a catalyst that oxidizes gases and other volatile particulates from the engine exhaust, including hydrocarbons, CO and NO (which is oxidized to make $NO_2$, made possible by the relatively high PGM loading.

As used herein, an ammonia oxidation (AMOX) catalyst is a catalyst that includes a layer of PGM (such as a DOC), covered by a SCR catalyst layer, which is located after a SCR to carry out dual functions of (1) reducing $NO_x$, and (2) scavenge excess $NH_3$ and selectively oxidize $NH_3$ to $N_2$, thus avoiding $NH_3$ slip.

As used herein, a 4-way catalyst is a catalyst that can serve the roles of a DOC, DPF catalyst, SCR catalyst, urea hydrolysis catalyst, and AMOX catalyst concurrently.

Intra-Crystalline Binary Catalyst Compositions

The intra-crystalline binary catalyst compositions of the present disclosure can include specific chemical elements that possess the desired electronegativities for various chemical reactions that occur in an engine aftertreatment system. Table A shows a list of suitable elements with desirable electronegativity values that can be used in the catalyst compositions, as well as the oxidation states of these elements that can be present in the catalyst compositions. In some embodiments, the catalyst compositions include Ba (barium), Cu (copper), Co (cobalt), Zr (zirconium), Nb (niobium), Mo (molybdenum), Ti (titanium), W (tungsten), La (lanthanum), and/or Fe (iron).

TABLE A

Electronegativity and oxidation states of selected elements from the periodic table.

| Period | Group | Element | Electronegativity (Paulings) | Oxidation State |
|---|---|---|---|---|
| 4 | Alkaline earth | Ca | 1 | $1^+, 2^+$ |
| 5 | Alkaline earth | Sr | 0.95 | $2^+$ |
| 6 | Alkaline earth | Ba | 0.89 | $1^+, 2^+$ |
| 3 | 3A | Al | 1.61 | $1^+, 2^+, 3^+, [1^-, 2^-, 3^-]$ |
|   | 4A | Si | 1.90 | $1^+, 2^+, 3^+, 4^+, [1^-, 2^-, 3^-, 4^-]$ |
| 4 | Transition metal | Sc | 1.36 | $1^+, 2^+, 3^+$ |
|   | Transition metal | Ti | 1.54 | $2^+, 3^+, 4^+ [1^-, 2^-]$ |
|   | Transition metal | V | 1.63 | $2^+, 3^+, 4^+, 5^+ [3^-]$ |
|   | Transition metal | Cr | 1.66 | $1^+, 2^+, 3^+, 4^+, 5^+, 6^+ [1^-, 2^-, 4^-]$ |
|   | Transition metal | Mn | 1.56 | $2^+, 3^+, 4^+, 5^+, 6^+, 7^+ [1^-, 2^-, 3^-]$ |
|   | Transition metal | Fe | 1.83 | $2^+, 3^+, 4^+, 5^+, 6^+ [1^-, 2^-, 4^-]$ |
|   | Transition metal | Co | 1.88 | $2^+, 3^+, 4^+, 5^+ [3^-]$ |
|   | Transition metal | Ni | 1.91 | $2^+, 3^+, 4^+ [1^-, 2^+]$ |
|   | Transition metal | Cu | 1.9 | $1^+, 2^+, 3^+, 4^+ [2^-]$ |
|   | Transition metal | Zn | 1.65 | $1^+, 2^+ [0, 2^-]$ |
| 5 | Transition metal | Y | 1.22 | $1^+, 2^+, 3^+$ |
|   | Transition metal | Zr | 1.33 | $1^+, 2^+, 3^+, 4^+ [2^-]$ |
|   | Transition metal | Nb | 1.6 | $1^+, 2^+, 3^+, 4^+, 5^+ [1^-, 3^-]$ |
|   | Transition metal | Mo | 2.16 | $1^+, 2^+, 3^+, 4^+, 5^+, 6^+ [0, 1^-, 2^-, 4^-]$ |
|   | Transition metal | W | 1.7 | $1^+, 2^+, 3^+, 4^+, 5^+, 6^+ [0, 1^-, 2^-, 4^-]$ |
| 6 | Lanthanide | Ce | 1.12 | $1^+, 2^+, 3^+, 4^+$ |
| 6 | Lanthanide | La | 1.1 | $1^+, 2^+, 3^+$ |

Further to the advantages listed above, the catalyst compositions of the present disclosure can provide one or more of the following benefits:

i. The catalyst compositions include a refractory metal oxide that is abundant and relatively low cost, durable and with relatively low oxidative power (e.g., $ZrO_2$).

ii. The catalyst compositions can have dopants to create oxygen vacancies in the crystal lattice of the zeolite and metal oxide (e.g., zirconium dioxide). The dopants (e.g., $Ba^{2+}$, $Ca^{2+}$, or $Sr^{2+}$) are relatively low in cost and have reductive power that can counterbalance the oxidative power of the metal oxide, while positively impacting $NO_x$ storage.

iii. The catalyst compositions incorporate selected high oxidative power species (e.g., Ti, Co, Cr, Mn, Nb, V, Mo, and/or W-containing oxides) into a mixed metal oxide structure, to tailor the final oxidative power according to a specific application. The high oxidative power species can be employed in different oxidation states as needed. For example, a species having high oxidative power (1.5-2.2 Paulings) is useful for DOC applications, while a species having relatively moderate (1 to <1.5 Paulings) to low oxidative power (<1.0 Paulings) is useful for high durability SCR applications. One major exception is cerium (a lanthanide element), with electronegativity that falls in the moderate range but is also very effective for DOC application.

Some considerations for the oxidative properties of the catalyst compositions include:

i. without wishing to be bound by theory, it is believed that the oxidative power of the final (e.g., zirconia doped) mixed oxide is important, therefore elements with high Pauling values can be used in SCR applications at relatively low doping levels. At higher doping levels, the same element can be highly effective in DOC applications.

ii. without wishing to be bound by theory, it is believed that the valency of the element plays an important role in the observed oxidative power. Therefore, selection of an element having a low valence state (e.g., 2+, such as $Co^{2+}$) as a dopant in $ZrO_2$ can be useful in SCR application, while an element having high valence ($\geq$3+) can be more preferred in DOC applications.

The catalyst compositions can incorporate acidic (i.e., anionic) groups, such as $VO_4^{3-}$ in zirconium vanadate, $ZrO_3^{2-}$ in barium zirconate, and/or $Mo_7^{6-}$ in zirconium molybdate, which facilitate high binding capacity for cations that provide catalytic activity in emissions control. For example, $Cu^{2+}$ and/or $Fe^{2+}$ can be used for $NO_x$ reduction; and $Pt^{2+}/Pt^0$, other platinum-group metals (PGMs) and certain base metals (e.g., $Ni^{2+}$ and $Fe^{3+}$) can facilitate oxidative reactions required for DOC and AMOX catalysts.

As discussed above, in general, the intra-crystalline binary catalyst compositions include a primary catalyst that can be a particle having a crystal lattice, and a secondary catalyst. The secondary catalyst is covalently bound and dispersed throughout the crystal lattice of the primary catalyst, and can be found occupying the lattice sites otherwise occupied by atoms from the primary catalyst. In some embodiments, referring to FIG. 2C, the primary catalyst 424 is a (metal) zeolite. The (metal) zeolite 424 has a plurality of metal oxide secondary catalyst nanoparticles 422 dispersed within its crystal lattice. In some embodiments, referring to FIG. 2D, the intra-crystalline binary catalyst compositions is a combination of a hybrid binary catalyst 430 and an intra-crystalline catalyst composition, where metal oxide nanoparticles 432 are covalently attached to the surface of the (metal) zeolite particles 436 and covalently incorporated throughout the crystal lattice of the (metal) zeolite.

The well-dispersed secondary catalyst provides highly reactive catalytic sites that can operate in a synergistic manner with the primary catalyst. For example, the secondary catalyst (e.g., a metal oxide) can adsorb NO and rapidly convert the NO to $NO_2$, which reacts in the presence of $NH_3$ on an adjoining primary catalyst site (e.g., a (metal) zeolite) to produce $N_2$. Because the secondary catalyst is throughout the crystal lattice of the (metal) zeolite, a large number of catalytically active sites can be provided, with enhanced catalytic activity.

Without wishing to be bound by theory, it is believed that the intra-crystalline binary catalyst compositions provide different types of active sites that are located in close proximity to one another within the (metal) zeolite. The different types of active sites can provide combined catalytic functionalities, faster reaction kinetics, synergy for high performance catalyst activity, and/or improved catalyst durability. In some embodiments, the different types of active sites can allow for rational catalyst design for SCR, DOC, or other catalysts in an EAS; and/or can allow for compact and lightweight EAS. Without wishing to be bound by theory, it is believed that faster reaction kinetics result from the increased number and close proximity of the catalyst active sites in the intra-crystalline binary catalyst compositions, such that multiple catalytic reactions can occur in close proximity to one another both in time and space. For example, a SCR catalyst and a selective catalytic oxidation (SCO) catalyst can be spaced apart in the angstrom range in an intra-crystalline binary catalyst composition, at much greater numbers than in a hybrid binary catalyst, which in turn is closer in distance by 2 to 3 orders of magnitude compared to physically mixed particles of a SCR and SCO catalyst, as described, for example, in U.S. Pat. No. 9,764,287 issued Sep. 19, 2017 (U.S. application Ser. No. 14/935,199 filed Nov. 6, 2015).

Without wishing to be bound by theory, it is believed that improved catalyst durability can be achieved with an intra-crystalline binary catalyst due to combination of properties of the components of the catalyst. For example, a highly oxidative secondary catalyst can be combined with a high temperature-tolerant primary catalyst in an appropriate ratio to achieve an intra-crystalline binary catalyst that has both high oxidative properties and temperature tolerance.

Without wishing to be bound by theory, it is believed that the primary and secondary catalysts can act in synergy with respect to one another when catalyzing the decomposition of exhaust gases, where the primary and secondary catalysts can both participate in a redox reaction, with one catalyst acting as a reducing agent (e.g., an anode) and the other catalyst acting as an oxidizing agent (e.g., a cathode). The redox reaction is a spontaneous and self-perpetuating process that occurs at adjacent active sites, where mass transfer limitations are minimal due to the close proximity of the active sites in a crystal lattice. The intra-crystalline binary catalyst components can be selected to possess ion exchange/binding properties to enable ion transport between sites. For example, doping of $ZrO_2$ with $Y^{3+}$ cationic dopant creates lattice vacancies that permit $O^{2-}$ transport through the (metal) zeolite crystal lattice. On the other hand, dopants such as $Ba^{2+}$ can create lattice vacancies (e.g., in $BaZrO_3$) that permit cation binding, and hence transport of cations (e.g., $H_3O^+$) between reduction/oxidation sites in the crystal lattice.

In some embodiments, the intra-crystalline binary catalyst compositions of the present disclosure have a primary catalyst that is loaded (e.g., by ion exchange reactions) with one or more metal cations, in particular Cu and Fe cations, to provide a metal zeolite. As used here, "metal zeolite"

refers to a zeolite that has been loaded with Cu or Fe cations. In some embodiments, the primary catalyst includes an aluminosilicate zeolite.

In some embodiments, the metal oxide secondary catalyst is doped with a metal cation other than Cu and Fe cations, such as $Pt^{2+}$, $Pd^{2+}$, $Rh^{2+}$, and/or $Ni^{2+}$ in the metal oxide secondary catalyst's active sites. In certain embodiments, the metal oxide secondary catalyst is doped with Cu, Fe, Pt, Pd, Rh, and/or Ni in the metal oxide secondary catalyst's active sites.

In some embodiments, the intra-crystalline binary catalysts of the present disclosure are substantially free of alkali metal ions, such as $Na^+$ and $K^+$. As will be shown in the Examples below, use of a 28% $NH_3$ aqueous solution or a 1M $NH_4NO_3$ aqueous solution at an elevated temperature during the synthesis of the intra-crystalline binary catalysts can extract Na or K cations. Without wishing to be bound by theory, it is believed that in some embodiments, the presence of Na or K cations can adversely impact aging of the intra-crystalline catalyst.

In certain embodiments, the one or more zeolite does not include any cations.

In some embodiments, the intra-crystalline binary catalyst compositions include from 0.5 wt % (e.g., from 1 wt %, from 10 wt %, from 20 wt %, from 30 wt %, from 40 wt %, from 50 wt %, from 60 wt %, from 70 wt %, from 80 wt %, from 85 wt %, from 90 wt %, from 95 wt %, from 97.5 wt %, from 98 wt %, from 98.5 wt %, from 99 wt %, from 99.5 wt %) to 99.9 wt % (e.g., to 99.5 wt %, to 99 wt %, to 98.5 wt %, to 98 wt %, to 97.5 wt %, to 95 wt %, to 90 wt %, to 80 wt %, to 70 wt %, to 60 wt %, to 50 wt %, to 40 wt %, to 30 wt %, to 20 wt %, to 10 wt %, or to 1 wt %) of the one or more (metal) zeolites. The intra-crystalline binary catalyst can have a structure shown in FIG. 2D, where a combination of a hybrid binary catalyst 430 and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework.

In certain embodiments, the intra-crystalline binary catalyst compositions include from 90 wt % to 99.9 wt % (e.g., from 95 wt % to 99.9 wt %, from 97.5 wt % to 99.9 wt %, from 98 wt % to 99.9 wt %, from 99 wt % to 99.9 wt %, from 99.5 wt % to 99.9 wt %, from 95 wt % to 99 wt %, from 97.5 wt % to 99 wt %, or from 98 wt % to 99 wt %) of the one or more (metal) zeolites. The intra-crystalline binary catalyst can have a structure shown in FIG. 2C, where nanoparticles of metal oxides are covalently incorporated into and throughout the crystal lattice of (metal) zeolite.

In some embodiments, the metal zeolite is a Fe-loaded aluminosilicate zeolite, a Cu-loaded aluminosilicate zeolite, and/or a Fe- and Cu-loaded aluminosilicate zeolite. In certain embodiments, the metal zeolite is a Fe-loaded chabazite, a Cu-loaded chabazite, and/or a Fe and Cu-loaded chabazite. In certain embodiments, the metal zeolite is a Fe- and/or Cu-loaded aluminosilicate zeolite. In some embodiments, the (metal) zeolite includes SSZ-13 chabazite, other aluminosilicate zeolites having SSZ-type zeolite structures, ZSM-5, and/or β-zeolite. In certain embodiments, the (metal) zeolite includes a chabazite. In certain embodiments, the (metal) zeolite includes ZSM-5 or β-zeolite. In certain embodiments, the (metal) zeolite includes SSZ-13 and/or other thermally durable zeolites.

The zeolite or the metal zeolite can have a Si/Al ratio of 2 or more (e.g., 4 or more, 6 or more, 8 or more, 10 or more, 12 or more, 15 or more, or 20 or more) and/or 25 or less (e.g., 20 or less, 15 or less, 12 or less, 10 or less, 8 or less, 6 or less, or 4 or less). In some embodiments, the zeolite or the metal zeolite has a Si/Al ratio of from 2 to 12 (e.g., from 2 to 10, from 2 to 8, from 6 to 12, from 6 to 10, or from 8 to 10). In some embodiments, the Si/Al ratio is from 10 to 20 (e.g., from 12 to 20, from 14 to 20, from 16 to 20, or from 18 to 20). The Si/Al ratio can provide an intra-crystalline binary catalyst with good durability.

To assess the durability of an intra-crystalline binary catalyst composition, a low temperature catalyst aging test can be performed. For the test, 10 g of a SCR catalyst powder can be mixed with 28% $NH_3$ solution, placed in a Teflon lined high pressure rated reactor, and incubated for 30 hours at 160° C. The catalyst can then be washed and dried, and XRD profiles can be compared before and after treatment. If the catalyst composition is stable, the XRD results can show little change in crystallinity. In some embodiments, the hydrothermal aging test can be conducted at 800° C. for 16 hours, and the XRD profiles can be compared before and after treatment.

In certain embodiments, the intra-crystalline binary catalyst can be mesoporous, having a porosity of greater than or equal to 0.3 $cm^3/g$ (e.g., greater than 0.33 $cm^3/g$, greater than 0.35 $cm^3/g$, greater than 0.4 $cm^3/g$, or greater than 0.5 $cm^3/g$) and/or less than or equal to 0.6 $cm^3/g$ (less than or equal to 0.5 $cm^3/g$, less than or equal to 0.4 $cm^3/g$, less than or equal to 0.35 $cm^3/g$, or less than or equal to 0.33 $cm^3/g$). The porosity of the intra-crystalline binary catalyst can be determined by BET surface area measurement.

In some embodiments, the intra-crystalline binary catalyst compositions of the present disclosure have a secondary catalyst that includes one or more metal oxides. The metal oxides can be in the form of nanoparticles, having a maximum dimension of from 0.1 nm (e.g., from 0.5 nm, from 1 nm, from 2 nm, from 3 nm, or from 4 nm) to 5 nm (e.g., to 4 nm, to 3 nm, to 2 nm, to 1 nm, or to 0.5 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; or about 3 nm). The secondary catalyst can be imaged via electron microscopy, and can be discrete nanoparticles dispersed throughout the crystal lattice of the primary catalyst. The secondary catalyst can be covalently bound to the (metal) zeolite's crystal lattice. For example, the secondary catalyst can be covalently bound to the Si atoms in the (metal) zeolite's crystal lattice. In some embodiments, the secondary catalyst occupies the sites corresponding to aluminum in the (metal) zeolite's crystal lattice. The intra-crystalline binary catalyst can have a structure shown in FIG. 2C, where nanoparticles of metal oxides are covalently incorporated into and throughout the crystal lattice of (metal) zeolite.

In some embodiments, the intra-crystalline binary catalyst compositions have a secondary catalyst that includes one or more metal oxides in the form of nanoparticles, having a maximum dimension of from 0.1 nm (e.g., from 1 nm, from 5 nm, from 10 nm, from 20 nm, from 30 nm, or from 40 nm) to 50 nm (e.g., to 40 nm, to 30 nm, to 20 nm, to 10 nm, to 5 nm, or to 1 nm). The intra-crystalline binary catalyst can have a structure shown in FIG. 2D, where a combination of a hybrid binary catalyst and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework. The metal oxide nanoparticles within a (metal) zeolite matrix can have a maximum dimension of from 1 nm to 5 nm (e.g., from 1 nm to 4 nm, from 2 nm to 5 nm, from 3 nm to 5 nm; or about 3 nm).

The one or more metal oxides of the secondary catalyst of the intra-crystalline binary catalyst compositions can include, for example, lanthanum oxide, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, platinum oxide, palladium oxide, iridium oxide, nickel oxide, barium oxide, yttrium oxide, scandium oxide, calcium oxide, ferric oxide, manganese oxide, lanthanum oxide, strontium oxide, cobalt oxide, copper oxide, iron oxide, and/or any combination thereof. In some embodiments, the one or more metal oxides of the intra-crystalline binary catalyst compositions are zirconium oxide, vanadium oxide, cerium oxide, manganese oxide, chromium oxide, cobalt oxide, titanium oxide, tungsten oxide, barium oxide, and/or any combination thereof. In certain embodiments, the one or more metal oxides of the intra-crystalline binary catalyst compositions include zirconia, ceria, vanadia, chromium oxide, barium oxide and niobium oxide. In some embodiments, the one or more metal oxides of the intra-crystalline binary catalyst compositions include lanthanum oxide, strontium oxide, cobalt oxide, and/or iron oxide.

In some embodiments, the catalyst compositions can have from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal oxide secondary catalysts. As used herein, a recited ranges includes the end points, such that from 0.5 wt % to 99.5 wt % includes both 0.5 wt % and 99.5 wt %. The intra-crystalline binary catalyst can have a structure shown in FIG. 2D, where a combination of a hybrid binary catalyst 430 and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework.

In certain embodiments, the intra-crystalline binary catalyst compositions include 0.05 wt % or more (e.g., 0.1 wt % or more, 0.5 wt % or more, 1 wt % or more, 1.5 wt % or more, 3 wt % or more, or 4 wt % or more) and/or 5 wt % or less (e.g., 4 wt % or less, 3 wt % or less, 1.5 wt % or less, 1 wt % or less, 0.5 wt % or less, or 0.1 wt % or less) of the secondary catalyst that includes one or more metal oxides. In certain embodiments, the intra-crystalline binary catalyst compositions include 0.05 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less) of the secondary catalyst that includes one or more metal oxides. In some embodiments, the intra-crystalline binary catalyst compositions include from 0.05 wt % to 2 wt % (e.g., 0.1 to 2 wt %, 0.1 to 1.75 wt %, 0.1 to 1.5 wt %, 0.1 to 1 wt %, 0.1 to 0.5 wt %, 0.25 wt % to 2 wt %, 0.5 wt % to 2 wt %, 0.75 wt % to 2 wt %, 1.0 wt % to 2 wt %, 1.25 wt % to 2 wt %, or 1.5 wt % to 2 wt %) of the secondary catalyst that includes one or more metal oxides. The intra-crystalline binary catalyst can have a structure shown in FIG. 2C, where nanoparticles of metal oxides are covalently incorporated into and throughout the crystal lattice of (metal) zeolite.

In some embodiments, the intra-crystalline binary catalyst compositions further include a cationic dopant. The cationic dopant can be located in the secondary catalyst. In some embodiments, the cationic dopant is found in the secondary catalyst, but not in the primary catalyst. For example, the intra-crystalline binary catalyst compositions can include a cation of Ca, Mg, Sc, Y, Tc, Ag, Cd, In, Sn, Hf, Re, Os, Ir, Au, Tl, Pr, Nd, Cu, Ni, Ti, V, Nb, Ta, Cr, Zr, Mo, W, Mn, Fe, Zn, Ga, Al, In, Ge, Si, Co, Ba, La, Ce, Nb, Sr, Pt, Pd, Rh, and any combination thereof. In some embodiments, the cationic dopant can include an oxide that includes $Ca^{2+}$, $Mg^{2+}$, $Sc^{3+}$, $Y^{3+}$, $Tc^{7+}$, $Ag^{+}$, $Cd^{2+}$, $In^{3+}$, $Sn^{2+}$, $Hf^{4+}$, $Re^{4+}$, $Os^{4+}$, $Ir^{4+}$, $Ir^{3+}$, $Au^{3+}$, $Tl^{3+}$, $Pr^{3+}$, $Nd^{3+}$, $Cu^{2+}$, $Cu^{+}$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof. In certain embodiments, the cationic dopant is an oxide that includes $Pt^{2+}$, $Pd^{2+}$, and/or $Rh^{2+}$.

In certain embodiments, the intra-crystalline binary catalyst compositions include a cationic dopant of one or more of the following elements: Ca, Sr, Ba, Sc, Ti, V, Cr, Mn, Fe, Co, Ni, Cu, Zn, Y, Zr, Nb, Mo, W, La, Ce, Pd, and/or Rh, which can be in the form of an oxide, and/or in the form of dopants in the intra-crystalline binary catalyst compositions. As discussed above, the cationic dopant can be located in the secondary catalyst. In some embodiments, the cationic dopant is found in the secondary catalyst, but not in the primary catalyst. In some embodiments, when in the form of dopants, the dopant cation is achieved by incipient wetness impregnation and is bound by the anion exchange characteristics of the metal oxide. In some embodiments, one or more metal oxides of the secondary catalysts of the intra-crystalline binary catalyst compositions include a cation of one or more of Ba, Co, Fe, Zr, Pd, and/or Rh. The cationic dopant can be present in the intra-crystalline binary catalyst at a concentration of 0.01 wt % or more (e.g., 0.1 wt % or more, 1 wt % or more, 2 wt % or more, 3 wt % or more, 4 wt % or more, 5 wt % or more, or 6 wt % or more) and/or 7 wt % or less (e.g., 6 wt % or less, 5 wt % or less, 4 wt % or less, 3 wt % or less, 2 wt % or less, 1 wt % or less, or 0.1 wt % or less), relative to the whole of the intra-crystalline binary catalyst. In some embodiments, the cationic dopant is present in the intra-crystalline binary catalyst at a concentration of 0.01 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less), relative to the whole of the intra-crystalline binary catalyst.

The intra-crystalline binary catalyst compositions of the present disclosure have adjustable compositions. For example, the composition can be changed by adjusting an oxidative power to address the tradeoff between $NO_x$ reduction performance and durability. In some embodiments, the optimal composition can be determined for each metal oxide of the secondary catalyst. In some embodiments, the one or more metal oxides of the secondary catalyst of the intra-crystalline binary catalyst compositions are $CeO_2:ZrO_2$ (i.e., a mixture of $CeO_2$ and $ZrO_2$ having, for example, from 40 wt % to 60 wt % $CeO_2$, $Y_2O_3:CeO_2$ (i.e., a mixture of $Y_2O_3$ and $CeO_2$, where, in some embodiments, has about 10 wt % of $Y_2O_3$), $BaZrO_3$, $Zr_{0.8}Sr_{0.2}CoO_3$, $Zr_{0.9}Ca_{0.1}O_x$ where x is an amount of O that counterbalances the Zr and Ca cations of the composition, $Zr_{0.5}Ba_{0.5}Mn_3O_4$, $Ba_{0.3}Zr_7O_x$ ($Ba_3Zr_7$ oxide) where x is an amount of O that counterbalances the Ba and Zr cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides (e.g., $ZrO_2$), $TiO_2$:$CeO_2$ (i.e., a mixture of $TiO_2$ and $CeO_2$), $Y_2O_3$:$ZrO_2$, $ZrV_2O_7$, $Zr_{0.3}Ba_{0.1}V_{0.6}O_x$ where x is an amount of O that counterbalances Zr, Ba, and V, $TiO_2$:$ZrV_2O_7$, each optionally including a cationic dopant that is an oxide that includes $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, and/or $Nb^{5+}$. In some embodiments, the metal oxide of the secondary catalyst in the intra-crystalline binary catalysts is $ZrO_2$, $Y_2O_3$:$ZrO_2$, $ZrV_2O_7$, $Zr_{0.3}Ba_{0.1}V_{0.6}O_x$ where x is an amount of O that counterbalances the Zr, Ba, and V cations of the composition, $Zr_{0.7}Ti_{0.3}VO_x$ where x is an amount of O that counterbalances the Z, Ti, and V cations of the composition, $Zr_{0.7}Ba_{0.3}$ oxide, and/or $CeO_2$:$ZrO_2$. In certain embodiments, while $CeO_2$ has higher oxidative power, $ZrO_2$ is selected instead as the secondary catalyst based upon both durability consideration and its ability to be modified by doping with strong oxidizing species (such as $Mn_3O_4$, $CoO_3$, $V_2O_7$, $CrO_3$, $WO_2$, $MoO_2$, NiO, $Fe_3O_4$, any combination thereof, and the like), in addition to modifiers such as BaO, which can enhance $NO_x$ storage.

In some embodiments, the intra-crystalline binary catalyst compositions do not include a cationic dopant. In some embodiments, the catalyst composition consists of a (metal) zeolite including metal oxide and a cationic dopant. In certain embodiments, the catalyst composition consists of a (metal) zeolite and a metal oxide. In some embodiments, the one or more metal oxides do not include a cationic dopant. In some embodiments, the secondary catalyst consists of a metal oxide including a cationic dopant. In certain embodiments, the secondary catalyst consists of a metal oxide.

The intra-crystalline binary catalyst compositions of the present disclosure can have a variety of desirable properties. For example, the intra-crystalline binary catalyst compositions can have a thermal resistance of up to 600° C. As used herein, "thermal resistance" refers to the ability of a catalyst to retain catalytic activity even with repeated exposure of up to 600° C. over an extended period of time (e.g., 100 hours or more). In some embodiments, a standard accelerated aging test includes hydrothermal aging studies at 800° C. for 16 hours in 8% water vapor.

The intra-crystalline binary catalyst compositions can offer combinations of desirable catalytic properties. For example, a SCR catalyst including Cu and/or Fe-loaded zeolite-based catalyst compositions having one metal oxide in the crystal lattice of the metal zeolite can be additionally modified with a selective catalytic oxidation (SCO) catalyst by impregnation of an applied washcoat using an appropriate precursor solution (such as zirconium(IV) oxynitrate hydrate), without the need to mix separate SCR and SCO particles. High SCR:SCO ratios can be achieved with equivalent or higher SCO surface area for enhanced $NH_3$ storage capacity with a lower mass of metal oxide, compared to that for a physical mixture of primary and secondary catalyst particles or hybrid binary catalysts. The SCO phase can be tailored to obtain optimal oxidative power (e.g., with $CrO_3$) independently of storage capacity for reactants such as $NH_3$ or for $NO_x$ (e.g., with BaO). In some embodiments, the intra-crystalline binary catalyst compositions of the present disclosure provides the ability to design and construct all major types of heavy duty diesel aftertreatment catalyst, such as a 4-way catalyst, described below.

In some embodiments, the intra-crystalline binary catalyst compositions convert $NO_x$ at an efficiency of greater than or equal to 80% (e.g., greater than or equal to 85%, greater than or equal to 90%, or greater than or equal to 95%) at 200° C., and/or oxidizes soot at an efficiency of greater than or equal to 10% (e.g., greater than or equal to 20%, greater than or equal to 25%, or greater than or equal to 30%) at steady state, at a temperature of less than or equal to 200° C. The catalyst composition has an ammonia storage capacity of 1.5 g/L or more (e.g., 2 g/L or more, 3 g/L or more, 4 g/L or more, 5 g/L or more, or 6 g/L or more) and/or 7 g/L or less (e.g., 6 g/L or less, 5 g/L or less, 4 g/L or less, 3 g/L or less, or 2 g/L or less) at 100° C. The catalyst composition can produce oxygen gas while reducing emission of CO, NO, $NO_2$, $N_2O$, hydrocarbons (e.g., volatile organic compounds, "VOC"), sulfur-containing gases, soot, urea, ammonia, or any combination thereof. In some embodiments, the catalyst composition has an ammonia storage capacity of 2 g/L or more and/or 7 g/L or less (e.g., 2.5 g/L or more and/or 7 g/L or less, or 3 g/L or more and/or 7 g/L or less). Without wishing to be bound by theory, it is believed that by incorporating metal oxide nanoparticles into the (metal) zeolite's crystal lattice, the overall hydrophilicity of the resulting intra-crystalline binary catalyst composition is decreased compared to a catalyst having the same elemental composition in the same proportions, but where metal oxide nanoparticles have not been incorporated into the crystal lattice of a host (metal) zeolite. The decreased hydrophilicity contributes to the dramatically improved ammonia storage of the intra-crystalline binary catalyst compositions of the present disclosure, when compared, for example, to a hybrid binary catalyst that has the same metal oxide and (metal) zeolite elemental compositions and proportion, as it is believed that water competes with ammonia for binding sites in the catalyst compositions. Thus, by decreasing hydrophilicity of the catalyst compositions, less water is taken up by the catalyst compositions, and more ammonia can be stored in the catalyst compositions. The decreased hydrophilicity also contributes to the increased soot oxidation efficiency of the intra-crystalline binary catalyst compositions of the present disclosure, when compared, for example, to a hybrid binary catalyst that has the same metal oxide and (metal) zeolite elemental compositions and proportions. The intra-crystalline binary catalyst compositions can be incorporated into, for example, a diesel particulate filter.

The intra-crystalline binary catalyst compositions of the present disclosure can have tailored cold start and cold FTP cycle performance. Without wishing to be bound by theory, it is believed that the decreased hydrophilicity of the catalytic compositions leads to faster water evaporation and catalyst heat-up, thereby dramatically shortening the cold start period (during which untreated emissions can be released into the environment). As used herein, cold start conditions refer to the first 400 seconds after key-on as the temperature of the aftertreatment increases to achieve the optimal 350-450° C. range for $NO_x$ reduction. As used herein, an "FTP cycle" refers to an EPA Federal Test Procedure, commonly known as FTP-75 for a city driving cycle. The intra-crystalline binary catalyst compositions can provide $NO_x$ reduction catalyst compositions with effective performance in low or zero $NO_2$ conditions, such as when a close couple SCR is employed without a DOC upstream, or when a SCRF is used and soot oxidation reaction competes with the fast SCR reaction for the available $NO_2$. A DOC is used to produce sufficient $NO_2$ to optimally obtain a $NO_2$/$NO_x$ ratio of unity, such that the exhaust stream contains equal amounts of $NO_2$ to $NO_x$. As $NO_2$/$NO_x$ declines, so does the $NO_x$ reduction efficiency, due to the critical role played by $NO_2$ in the "fast" SCR reaction (see reaction (3), above).

In some embodiments, the intra-crystalline binary catalyst compositions of the present disclosure have a BET surface area of 450 m²/g or more (e.g., 500 m²/g or more, 550 m²/g or more, or 600 m²/g or more) and/or 650 m²/g or less (e.g., 600 m²/g or less, 550 m²/g or less, or 500 m²/g or less). In some embodiments, the intra-crystalline binary catalyst compositions have a BET surface area of 500±50 m²/g. In some embodiments, the intra-crystalline binary catalyst compositions have a median pore diameter of about 5-6 Å. The pore diameter can be obtained by BET measurements. Without wishing to be bound by theory, it is believed that intra-crystalline binary catalyst compositions with a large BET surface area has greater catalytic activity compared to an intra-crystalline binary catalyst composition with a smaller BET surface area.

In some embodiments, the intra-crystalline binary catalyst compositions have increased catalytic activity compared to a corresponding hybrid binary catalyst or a physical mixture of primary and secondary catalysts.

Engine Aftertreatment Catalysts

The intra-crystalline binary catalyst compositions of the present disclosure are highly versatile and can be used, for example, as a diesel oxidation catalyst (DOC), a diesel particulate filter (DPF) catalyst, a selective catalytic reduction (SCR) catalyst that can be used in a conventional SCR and/or in a SCRF configuration, a urea hydrolysis catalyst, and/or an ammonium oxidation (AMOX) catalyst.

As an example, a intra-crystalline binary catalyst-based DOC can have a (metal) zeolite primary catalyst of relatively high thermal resistance (e.g., SSZ-13), while possessing good hydrocarbon (HC) and $NO_x$ storage capacities. As used herein, "storage capacity" refers to the ability of a catalyst to adsorb amounts of the reactant species on the surface as a first step in the heterogeneous catalysis process. Therefore, it is understood by a person of ordinary skill in the art that good storage capacities (i.e., good adsorptive properties) are desirable for good reaction rates.

Storage capacities can be modified by exchanging cations (e.g., $Cu^{2+}$ and/or $Fe^{3+}$) into the active sites of the zeolite. The secondary catalyst in the intra-crystalline binary catalyst-based DOC can be a metal oxide that has relatively high oxidative power (e.g., $CeO_2:ZrO_2$, Y-doped $CeO_2$, $BaZrO_3$, $Zr_{0.8}Sr_{0.2}CoO_3$, $Zr_{0.8}Co_{0.2}O_4$, $CeO_2$—$Mn_3O_4$, Ce/Co/Zr, and/or $TiO_2$—$CeO_2$), modified with cations that can enhance $NO_x$ storage (e.g., $Ba^2$), as well as enhance $NO_x$, CO, and HC oxidation compared to conventional Cu-zeolite-based SCR catalysts (e.g., $Pt^{2+}$, $Pd^{2+}$, $Rh^{2+}$, $Cu^{2+}$, $Ni^{2+}$, and/or $Fe^{3+}$) In some embodiments, a intra-crystalline binary catalyst-based DOC includes a (metal) zeolite primary catalyst with a metal oxide secondary catalyst such as $ZrV_2O_7$; $Zr_{0.3}Ba_{0.1}V_{0.6}O_x$ where x is an amount of O that counterbalances the Zr, Ba, and V cations of the composition, and/or $Ce_{0.6}Zr_{0.4}$, which can be further modified with $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, and/or $Nb^{5+}$. In some embodiments, complex oxides can have non-stoichiometric amounts of oxygen to lattice oxygen vacancies due to loading/doping of the foreign cation into the lattice structure.

The intra-crystalline binary catalyst-based DOC can be located upstream of the SCR. An important variant of a DOC is a partial oxidation catalyst (POC), which is a DOC-like catalyst applied to a particle filter that enables the oxidation of volatile organic compound (VOC) components of particulate matter in the exhaust gas while allowing larger particles to pass through to the DPF. The POC can serve the normal function of the DOC, and may preferentially be located upstream of a SCRF, to reduce as much as 50% of the soot reaching the SCRF; thus almost doubling the ash cleaning interval for a SCRF, which is otherwise considerably less when compared to a conventional DPF.

In some embodiments, DPF catalysts are constructed from intra-crystalline binary catalyst compositions as described above for the DOC. A conventional DPF is located downstream of the DOC and upstream of the SCR, and is made of a particle filter substrate with a Pt, Pd, and/or Rh-based catalyst coating that can oxidize $NO_x$ to generate $NO_2$; oxidize residual HC that can pass through the DOC; passively and/or actively oxidize soot in regenerating the DPF to form ash for storage; and provide a higher storage capacity, which results in a longer cleaning interval and a lower maintenance cost for the EAS. In some embodiments, as with DOC catalysts, the intra-crystalline binary catalyst-based DPF catalyst includes little or no Pt, Pd, and/or Rh content.

In some embodiments, an intra-crystalline binary catalyst-based SCR catalyst includes (metal) zeolites with relatively high thermal resistance such as SSZ-13, which has been loaded with $Cu^{2+}$ and/or $Fe^{3+}$. The secondary catalyst in the intra-crystalline binary catalyst-based SCR catalyst can be a metal oxide that has an oxidative power that can be tailored based upon the trade-off between $NO_x$ reduction performance and durability, such as $ZrO_2$ or Y-doped $ZrO_2$, $ZrV_2O_7$, $TiO_2/ZrV_2O_7$, $Zr_{0.3}Ba_{0.1}V_{0.6}O_x$ where x is an amount of O that counterbalances the Zr, Ba, and V cations of the composition, $TiO_2:ZrV_2O_7$ (e.g., $Zr_{0.7}Ti_{0.3}VO_x$ where x is an amount of O that counterbalances the Zr, Ti, and V cations of the composition), $Zr_{0.7}Ba_{0.3}$ oxide, and/or $CeO_2:ZrO_2$. The intra-crystalline binary catalyst-based SCR catalyst can be employed in a conventional SCR and/or in a SCRF configuration.

In certain embodiments, the intra-crystalline binary catalyst-based SCR catalyst includes a metal oxide secondary catalyst such as $CeO_2:ZrO_2$ (i.e., a mixture of $CeO_2$ and $ZrO_2$, such as from 40% to 60 wt % Ce in Zr), $Ce_{0.6}Zr_{0.4}O_x$ where x is an amount of O that counterbalances the Zr and Ce cations of the composition, $Y_2O_3:CeO_2$ (i.e., a mixture of $Y_2O_3$ and $CeO_2$), $BaZrO_3$, $Zr_{0.8}Sr_{0.2}CoO_3$, $Zr_{0.9}Ca_{0.1}O_x$ where x is an amount of O that counterbalances the Zr and Ca cations of the composition, $Zr_{0.5}Ba_{0.5}Mn_3O_4$, $Ba_3Zr_{0.7}O_x$ where x is an amount of O that counterbalances the Zr and Ba cations of the composition, $Zr_{0.5}Ba_{0.5}CrO_3$, $Zr_{0.5}Ba_{0.5}CoO_x$ where x is an amount of O that counterbalances the Zr, Ba, and Co cations of the composition (including higher oxidation states of cobalt oxide), Zr oxides and/or $TiO_2:CeO_2$, $ZrO_2$, $Y_2O_3:ZrO_2$, $ZrV_2O_7$, $Zr_{0.3}Ba_{0.1}V_{0.6}O_x$ where x is an amount of O that counterbalances the Zr, Ba, and V cations of the composition, and/or $TiO_2:ZrV_2O_7$ (e.g., $Zr_{0.7}Ti_{0.3}VO_x$ where x is an amount of O that counterbalances the Zr, Ti, and V cations of the composition).

Figure 1B:
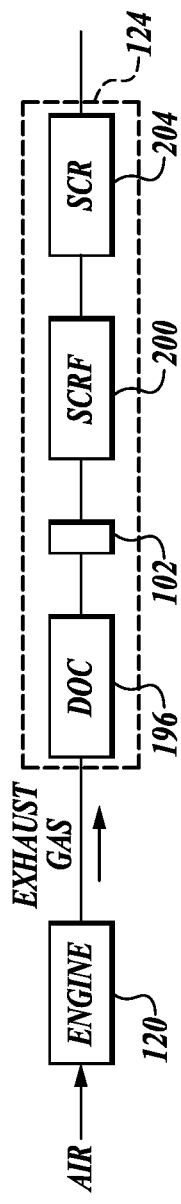
FIG. 1B is a block diagram of an example of an aftertreatment system coupled to an internal combustion engine.
Figure 1C:
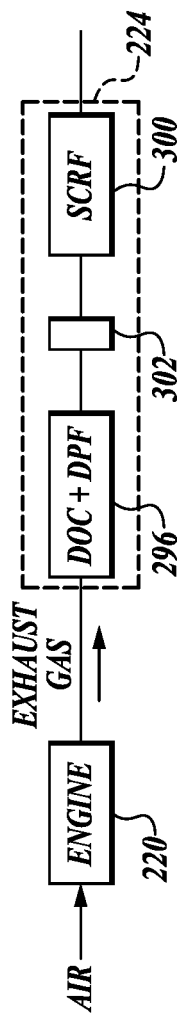
FIG. 1C is a block diagram of an example of an aftertreatment system coupled to an internal combustion engine.

In some embodiments, referring to FIG. 1A, the intra-crystalline binary catalyst-based SCR catalyst can be used in a diesel particulate filter in a SCR system 104, such as a wall-flow filter, and particularly the monolithic core of the wall-flow filter. In some embodiments, the intra-crystalline binary catalyst-based SCR catalyst can lead to more compact exhaust aftertreatment systems. For example, referring to FIG. 1B, an exhaust aftertreatment system 124 includes a diesel oxidation catalytic system 196 upstream of a diesel exhaust fluid doser 202. A selective catalytic reduction on-filter (SCRF) 200 is downstream of the diesel exhaust fluid doser 202, and SCRF 200 is followed by a selective catalytic reduction system 204. The SCRF includes a diesel particulate filter (DPF) with a catalytic substrate having an intra-crystalline binary catalyst-based SCR catalyst coated thereon, thereby providing a compact SCRF that combines the functions of both a DPF and a selective catalytic reduction system. In some embodiments, referring to FIG. 1C, an exhaust aftertreatment system 224 includes a combined diesel oxidation catalytic system ("DOC") and a diesel particulate filter 296 upstream of a diesel exhaust fluid doser 302. Downstream of the diesel exhaust fluid doser 302 is SCRF 300, which includes a DPF with a catalytic core having an intra-crystalline binary catalyst-based SCR catalyst loaded thereon. Exhaust aftertreatment system 224 has a DPF both upstream and downstream of the mixer and therefore increases the filter capacity. As shown in FIG. 1C, exhaust aftertreatment system 224 is more compact than the exhaust aftertreatment system 124 shown in FIG. 1B.

Figure 1D:
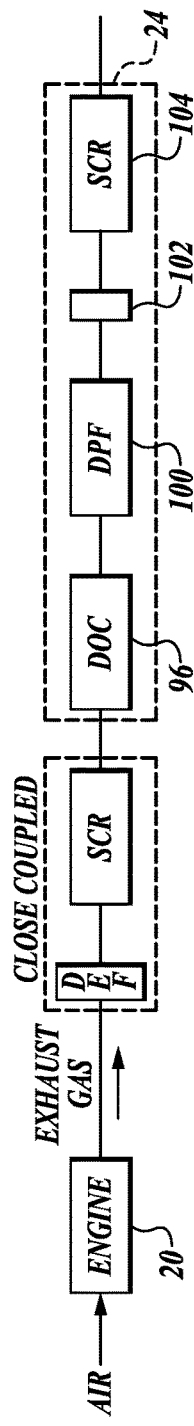
FIG. 1D is a block diagram of an example of an aftertreatment system coupled to an internal combustion engine.
Figure 1E:
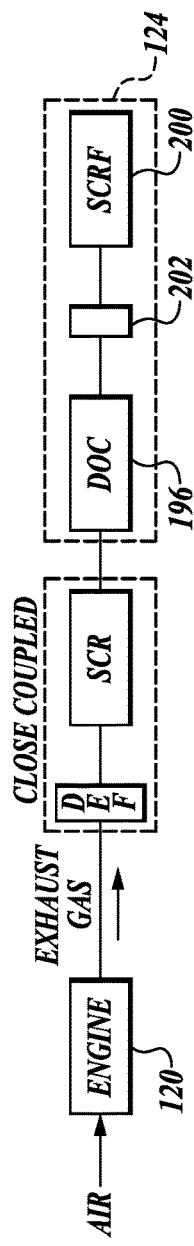
FIG. 1E is a block diagram of an example of an aftertreatment system coupled to an internal combustion engine.
Figure 1F:
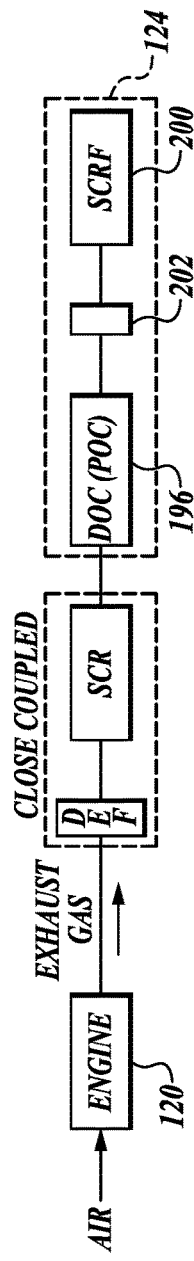
FIG. 1F is a block diagram of an example an aftertreatment system close coupled to an internal combustion engine with a DOC (POC) upstream of a SCRF.

In certain embodiments, a "close-coupled SCR" with DEF doser may be located as close to the engine as possible, to obtain optimal reaction temperature despite reduced exhaust temperatures due to the use of an EGR. Examples of close-coupled SCR configurations are shown in FIGS. 1D and 1E. These close-coupled SCR configurations employ dual DEF dosers, with a DEF doser upstream of each SCR in the EAS, forming a more complex system configuration compared to current EASs, which generally have one DEF doser. EAS including a close-coupled intra-crystalline binary catalyst-based POC upstream of a SCRF is shown in FIG. 1F.

In some embodiments, a intra-crystalline binary catalyst-based AMOX catalyst can replace conventional catalyst compositions, which typically include a Pt/Pd catalyst washcoat on a flow through substrate, covered by a second Cu or Fe-loaded zeolite SCR washcoat catalyst layer. The AMOX catalyst is configured to utilize ammonia slip from SCR for $NO_x$ reduction, while decreasing the likelihood of $NH_3$ slip into the environment. Preferred embodiment of the intra-crystalline binary catalyst-based AMOX catalyst include, for example, a Cu and/or Fe-loaded zeolite primary catalyst with one or more metal oxide secondary catalysts including $CeO_2:ZrO_2$ (i.e., a mixture of $CeO_2$ and $ZrO_2$, preferably between 40 wt % to 60 wt % Ce, $Y_2O_3:CeO_2$ (i.e., a mixture of $Y_2O_3$ and $CeO_2$), $BaZrO_3$, $Zr_{0.9}Ca_{0.1}O_2$, $Zr_{0.8}Sr_{0.2}CoO_3$, $Zr_{0.5}Ba_{0.2}Mn_{0.3}O_4$, $Ba_{0.3}Zr_{0.7}O_x$ where x is an amount of O that counterbalances the Zr and Ba cations of the composition, $Zr_{0.5}Ba_{0.5}CrO_3$, $Zr_{0.5}Ba_{0.5}CoO_x$ (including higher oxidation states of cobalt oxide, where x is an amount of O that counterbalances Zr, Ba, and Co cations of the composition), Zr oxides and/or $TiO_2:CeO_2$ (i.e., a mixture of $TiO_2$ and $CeO_2$), $ZrO_2$, $Y_2O_3:ZrO_2$, $ZrV_2O_7$, $Zr_{0.3}Ba_{0.1}V_{0.6}O_x$ where x is an amount of O that counterbalances the Zr, Ba, and V cations of the composition, $TiO_2:ZrV_2O_7$, $Zr_{0.7}Ti_{0.3}VO_x$ where x is an amount of O that counterbalances the Zr, Ti, and V cations of the composition, and/or $Ce_{0.6}Zr_{0.4}O_4$. The intra-crystalline binary catalyst-based AMOX catalyst can be further modified with $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, and/or $Nb^{5+}$.

In certain embodiments, the (metal) zeolite primary catalyst of the intra-crystalline binary catalyst-based AMOX catalyst can include an aluminosilicate zeolite. The aluminosilicate zeolite can includes a cation such as $Cu^{2+}$ and/or $Fe^{3+}$. The metal oxide secondary catalyst can include $CeO_2:ZrO_2$, $Y_2O_3:CeO_2$, $BaZrO_3$, $Zr_{0.8}Sr_{0.2}CoO_3$, $CeO_2—Mn_3O_4$, Ce/Co/Zr oxides, $Zr_{0.9}Ca_{0.1}O_x$ where x is an amount of O that counterbalances the Zr and Ca cations of the composition, $Zr_{0.5}Ba_{0.5}Mn_3O_4$, $Ba_{0.3}Zr_{0.7}O_x$ where x is an amount of O that counterbalances Zr and Ba cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides and/or $TiO_2:CeO_2$ (i.e., a mixture of $TiO_2$ and $CeO_2$), $ZrO_2$, $Y_2O_3:ZrO_2$, $ZrV_2O_7$, $Zr_{0.3}Ba_{0.1}V_{0.6}O_{4-7}$, $TiO_2:ZrV_2O_7$, $Zr_{0.7}Ti_{0.3}VO_x$ where x is an amount of O that counterbalances the Zr, Ti, and V cations of the composition, and/or $Ce_{0.6}Zr_{0.4}O_4$. The intra-crystalline binary catalyst-based AMOX catalyst can be further modified with $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, and/or $Nb^{5+}$.

The intra-crystalline binary catalyst-based ammonium oxidation catalyst can also include a second metal oxide different from the first metal oxide that can include $ZrO_2$, $Y_2O_3:ZrO_2$, $ZrV_2O_7$, $Zr_{(1-x)}Ba_x$ oxide (where x is between 3 and 4), $BaZrO_3$, $Zr_{0.8}Sr_{0.2}CoO_3$, $CeO_2—Mn_3O_4$, Ce/Co/Zr oxides, $BaZrO_3$, $Zr_{0.9}Ca_{0.1}O_2$, $Zr_{0.5}Ba_{0.5}Mn_3O_4$, $Ba_{0.3}Zr_{0.7}O_x$ where x is an amount of O that counterbalances the Ba and Zr cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides and/or $TiO_2:CeO_2$ (i.e., a mixture of $TiO_2$ and $CeO_2$), $ZrO_2$, $Y_2O_3:ZrO_2$, $ZrV_2O_7$, $Zr_{0.3}Ba_{0.1}V_{0.6}O_{3-7}$, $TiO_2:ZrV_2O_7$, $Zr_{0.7}Ti_{0.3}VO_x$ where x is an amount of O that counterbalances the Zr, Ti, and V cations of the composition, $CeO_2:ZrO_2$, and/or $Ce_{0.6}Zr_{0.4}O_4$.

Figure 1G:
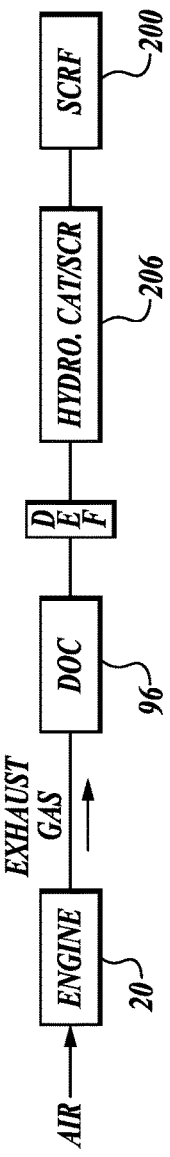
FIG. 1G is a block diagram of an example of an embodiment of an aftertreatment system of the present disclosure.

In some embodiments, an intra-crystalline binary catalyst-based urea hydrolysis catalyst has the same composition as an intra-crystalline binary catalyst-based SCR catalyst, or has a reversed ratio of zeolite-to-metal oxide, for example, when the outer surfaces of the intra-crystalline binary catalyst is also hybridized with metal oxide nanoparticles in a combined i-CBC/HBC configuration (e.g., FIG. 2D). In certain embodiments, the urea hydrolysis catalyst is applied to the surface of an impact static mixer and has a $NO_x$ conversion efficiency of 10% or more (e.g., 25% or more, 40% or more, 55% or more, or 70% or more) and/or 80% or less (e.g., 70% or less, 55% or less, 40% or less, or 25% or less). In some embodiments, referring to FIG. 1G, an intra-crystalline binary catalyst is coated onto an electrically-heated metal flow-through substrate 206 to simultaneously serve as a SCR catalyst and a urea hydrolysis catalyst ("hydro.cat/SCR"). The DEF can be sprayed directly into the catalysts to aid $NH_3$ production and $NO_x$ conversion in the first 400 seconds of cold start.

Hydrolysis Catalyst Washcoat Procedure:

A washcoat slurry including the following can be used to coat a metallic mixer device, which can first be surface roughened by abrasion, degreased with isopropanol and washed with deionized water: intra-crystalline binary catalyst, deionized water; optionally lactic acid; poly(ethylene glycol-ran-propylene glycol) (e.g., having a molecular weight $M_n$ of about 2,500); poly(ethylene oxide) (e.g., having a molecular weight $M_v$ of about 300,000). Following mixing or milling (such as milling using a roller mill apparatus), the washcoat slurry can be cooled to room temperature and applied to a substrate, such as a metallic mixer. After drying for a period of 8-12 hours in air, the coated mixer can be dried in an air oven at about 100-120° C. A second coating can be optionally applied and the coated mixer can be calcined (e.g., for 1 hr at about 450-650° C.). Relative durability of the coating can be determined by weighing before and after applying a blast of $N_2$ at 70 psig.

In some embodiments, the DEF is sprayed onto the coated mixer at a temperature of 150° C. to 500° C. for the $NO_x$ reduction of diesel engine exhaust. It is believed that the primary function of the urea hydrolysis catalyst is the hydrolytic breakdown of urea, HNCO and other urea byproducts as rapidly as possible to facilitate $NH_3$ production; and that $NO_x$ reduction is a secondary function that can contribute to addressing overall $NO_x$ reduction of the EAS. In some embodiments, the urea hydrolysis catalyst can bind and oxidize SCR catalyst poisons, such as hydrocarbons, sulfur, phosphorus, or a combination thereof. In some embodiments, the urea hydrolysis catalyst can be regenerated. In some embodiments, the urea hydrolysis catalyst is a sacrificial catalyst that can irreversibly bind SCR catalyst poisons.

4-Way Catalyst

In some embodiments, a given intra-crystalline binary catalyst of the present disclosure replaces the DOC, DPF catalyst, SCR catalyst, optionally used urea hydrolysis catalyst, and AMOX catalyst that are located in separate compartments in an EAS. Instead, the intra-crystalline binary catalyst compositions of the present disclosure can be located in a single compartment and perform the functions of the DOC, DPF, SCR, optionally used urea hydrolysis catalyst, and AMOX concurrently, as a 4-way catalyst. A 4-way catalyst is defined as a single catalyst packaging based upon an intra-crystalline binary catalyst, with the capability of addressing the four main functions of an EAS: i.e., the functions of the DOC, DPF, SCR, and AMOX catalysts. In some embodiments, the 4-way catalyst also performs the functions of the urea hydrolysis catalyst. The advantages associated with the 4-way catalyst include, for example, the 4-way catalyst can provide compact, lightweight and relatively low cost EAS; can streamline product offering for a global market; can lower manufacturing cost; and can lower cost of ownership for the customer.

In some embodiments, the EAS has one catalyst, a 4-way catalyst, which is based upon the intra-crystalline binary catalyst platform technology, with specific regions of the 4-way catalyst modified to emphasize the specific functionalities: DOC or POC, SCR on DPF filter (SCRF) with a hydrolysis catalyst coated DEF mixer, and optionally SCR with an AMOX, as required. The precise dimensions and relative proportions of the different functionalities in the 4-way catalyst can be tailored to the specific engine exhaust conditions (e.g., engine out $NO_x$ levels).

In some embodiments, the intra-crystalline binary catalyst-based 4-way catalyst is copper-loaded chabazite containing zirconium vanadate and doped with $Pt^{2+}$ and $Pd^{2+}$; and/or copper-loaded chabazite containing ceria zirconia and doped with $Pt^{2+}$ and $Pd^{2+}$. In some embodiments, the intra-crystalline binary catalyst-based 4-way catalyst is copper-loaded chabazite containing zirconium vanadate and doped with $Pt^{2+}$ and $Pd^{2+}$; and/or copper-loaded chabazite containing ceria zirconia and doped with $Pt^{2+}$ and $Pd^{2+}$.

As an example, a representative 4-way catalyst composition for heavy duty truck application is made as follows:

a) DOC including i-CBC with pure $ZrO_2$ intra-crystalline nanoparticle and between 10-30 wt % of (Ce doped $ZrO_2$) on the outside surface (i.e., a combined i-CBC/HBC, FIG. 2D), with low PGM applied primarily to the extra-crystalline metal oxide nanoparticles. Alternatively, the extra-crystalline nanoparticles can include a highly oxidative mixed oxide such as La—Sr—Fe oxide.

b) Combined SCR/urea hydrolysis catalyst including an electrically headed metallic low-through substrate coated with a i-CBC with pure $ZrO_2$ intra-crystalline nanoparticle and between 5-10 wt % (Y doped $ZrO_2$) on the outside surface (i.e., a combined i-CBC/HBC, FIG. 2D).

c) SCR-on-DPF and SCR on Flow-through Substrate catalysts including an i-CBC with pure $ZrO_2$ intra-crystalline nanoparticle and between 5-10 wt % (Y doped $ZrO_2$) on the outside surface (i.e., a combined i-CBC/HBC, FIG. 2D). Alternatively, a simple i-CBC containing undoped $ZrO_2$, with no extra-crystalline nanoparticles.

d) AMOX including a single layer containing a combined i-CBC/HBC (e.g., FIG. 2D) including of intra-crystalline (Y doped $ZrO_2$) nanoparticles, and extra-crystalline (Ba and Fe doped $ZrO_2$); which may optionally be activated with PGM (e.g., Pd/Rh, which produced 30% less $N_2O$ relative to Pt).

Intra-Crystalline Catalyst Synthesis

The intra-crystalline binary catalyst composition that is used for the metal cation-loading can be made by providing a reaction mixture of zeolite precursors (e.g., silica, alumina), with an organic templating agent. The reaction mixture for making the intra-crystalline binary catalyst can further include one or more seed catalysts, such as a hybrid binary catalyst described in U.S. application Ser. Nos. 15/612,815 and 15/612,833, filed Jun. 2, 2017, and precursors to the metal oxide.

A general example of the synthesis of intra-crystalline catalyst compositions is as follows:

1) Dissolve an amount of base, such as sodium hydroxide, in deionized water. Rapidly add a solution of a metal oxide precursor with vigorous stirring. The metal oxide nanoparticles can form instantly.
2) A templating agent can be added, followed by the reagents for the zeolite (e.g., alumina and fumed silica.
3) The contents were well mixed and transferred to a Teflon lined high pressure reactor, and incubated at 160° C. for the prescribed reaction time of between 168 to 336 hours.

A HBC can be added as a seeding agent. For example, the seeding HBC can include HBC containing Zr/Mo, Zr/Ce, Zr/Cr, Zr/W, Ce/La, Zr/Ba/La, and/or Zr/La.

In some examples, the incubation can occur at a temperature of 150° C. or more (e.g., 160° C. or more, or 165° C. or more) and/or 170° C. or less (e.g., 165° C. or less, or 160° C. or less) for a duration of 6 days or more (e.g., 10 days or more, 14 days or more, or 16 days or more) and/or 20 days or less (e.g., 16 days or less, 14 days or less, or 10 days or less) (each day is 24 hours). The synthesized intra-crystalline binary catalyst can then be isolated from the reaction mixture by filtration. The isolated intra-crystalline binary catalyst can be optionally air-dried, and calcined in air at 550° C. or more (e.g., 575° C. or more, or 600° C. or more) to 620° C. or less (e.g., 600° C. or less, or 575° C. or less) for a duration of 3 hours or more and/or 5 hours or less (e.g., a duration of about 4 hours). After calcining, the proton form of the intra-crystalline binary catalyst can be obtained by conducting an ammonium-ion exchange procedure, followed by calcining. The proton form of the intra-crystalline binary catalyst can be loaded with a metal cation by treating the zeolite with a solution containing the metal cation precursor (e.g., in the form of a metal salt) in the presence of a basic ammonia solution. Examples of metal cation precursor salts include copper nitrate, copper sulfate, ferric nitrate, tetraaminepalladium nitrate, tetraamineplatinum nitrate, rhodium nitrate hydrate, and any combination thereof.

The zeolite precursors can include, for example, silica ($SiO_2$), alumina ($Al_2O_3$), fumed silica, fumed alumina, silica gel, Rh on alumina, and/or ammonium hexafluorosilica. The reaction mixture can include a Si/Al ratio of 2 or more (e.g., 5 or more, 8 or more, 11 or more, 14 or more, or 16 or more) and/or 20 or less (e.g., 16 or less, 14 or less, 11 or less, 8 or less, or 5 or less). In some embodiments, the zeolite precursor includes silica and alumina at a weight ratio of 10:3 or more (e.g., 20:3 or more, 40:3 or more, 60:3 or more, or 80:3 or more) and/or 100:3 or less (e.g., 80:3 or less, 60:3 or less, 40:3 or less, or 20:3 or less). In some embodiments, the silica and alumina weight ratio is 50:5. The concentration of Si in the reaction mixture can be 20 wt % or more and/or 40 wt % or less (e.g., from 20 wt % to 40 wt %). The concentration of Al in the reaction mixture can be 3 wt % or more and/or 40 wt % or less (e.g., from 3 wt % to 40 wt %).

The reaction mixture can further include a solvent, such as water.

The organic templating agent includes, for example, trimethyladamantylammonium hydroxide, trimethyl-1-adamantylammonium iodide, copper tetraethylenepentamine, tricyclodecane, copper diethylenetriamine, N1-butyl-N4-docosyl-N1,N1,N4,N4-tetramethylbutane-1,4-diaminium dibromide, and/or 3-azoniabicyclo[3.2.1]octane. The organic templating agent can be present in the reaction mixture at a concentration of 10% or more and/or 30% or less.

The seed catalyst can be, for example, a hybrid binary catalyst having the same elements as the desired intra-crystalline binary catalyst composition. The seed catalyst can be present in the reaction mixture at a concentration of 0.5 wt % or more (e.g., 1 wt % or more, 1.5% wt % or more, 5 wt % or more, 10 wt % or more, 15 wt % or more, 20 wt % or more, 30 wt % or more) and/or 40 wt % or less (e.g., 30 wt % or less, 20 wt % or less, 15 wt % or less, 10 wt % or less, 5 wt % or less, 1.5 wt % or less, or 1 wt % or less). The metal oxide precursors can include, for example zirconium oxychloride octahydrate, zirconium oxynitrate hydrate, yttrium chloride, barium nitrate, ferric nitrate, hexammine cobalt (III) chloride, and/or hexammine cobalt (III) chloride. The metal oxide precursors can be present in the reaction mixture at a concentration of 1% or more (e.g., 3 wt % or more, 5% wt % or more, 7.5 wt % or more) and/or 10% or less (e.g., 7.5 wt % or less, 5 wt % or less, or 3 wt % or less).

In some embodiments, formation of zeolite (e.g., SSZ-13) in a reaction mixture for making the intra-crystalline binary catalyst includes an organic templating agent to guide the correct assembly of the Si and Al components of zeolite (e.g., chabazite) framework. An example templating agent is trimethyladamantylammonium hydroxide (TMA). To provide a more rapid reaction, the temperature for the synthesis can be raised. However, at elevated reaction temperatures (e.g., above about 160° C.) in zeolite synthesis, the templating agent can break down, leading to growth of competing denser zeolite phases that are thermodynamically more stable than the desired zeolite phase at higher temperatures. For example, in the synthesis of SSZ-13, formation of denser analcime or quartz can occur at elevated temperatures. An alternative option to elevated temperature to shorten the synthesis time is to add seed crystals of an existing zeolite. Addition of seed crystals can speed up crystallization and/or direct the zeolite crystal growth to a particular structure. Therefore, in some embodiments, the synthesis of the intra-crystalline binary catalyst includes seeding a reaction mixture with a hybrid binary catalyst (e.g., a SSZ-13 based hybrid binary catalyst) to provide preformed catalyst nanoparticles that allow for favorable kinetics for zeolite (e.g., chabazite) structure formation.

To provide a proton form of a silica-rich zeolite component of the intra-crystalline catalyst, such as the SSZ-13-based zeolite, a sodium form of the zeolite is first ion exchanged to the ammonium form. In an exemplary synthetic procedure, 1 gram of the intra-crystalline catalyst is suspended in 100 ml of 1 M $NH_4NO_3$ solution. The solution is subsequently stirred at 80° C. for 2 hours after which the solid product is recovered by filtration and washed with copious amounts of deionized water. After drying the product, the ammonium ($NH_4^+$) exchange procedure is repeated two or three more times, washed with deionized water and air dried to 8-12 hours. The $NH_4$-intra-crystalline catalyst converts to the H-intra-crystalline catalyst by calcination with a temperature ramp of 2° C./min to 600° C. in air, which is then held constant for 4 hours.

Metal Cation Loading Procedure

To convert the proton form of the zeolite material to the copper-loaded form, the vastly accelerated ammonia-facilitated cation loading steps can be carried out. The ammonia-facilitated cation loading steps are described in concurrently filed and copending U.S. application Ser. No. 16/376,980, entitled "Ammonia Facilitated Cation Loading of Zeolite Catalysts," the disclosure of which is herein incorporated in its entirety.

Briefly, the metal cation can be loaded into the catalytic composition using the following procedure.

1. A metal cation salt (e.g., copper sulfate) is dissolved in deionized (DI) water, together with the intra-crystalline catalyst, in the appropriate proportions.

2. Heat is applied with vigorous stirring to achieve a predetermined temperature (e.g., 80° C.);

3. At the predetermined reaction temperature, a quantity of aqueous ammonia (e.g. a 28% $NH_3$ aqueous solution) is added to the reaction mixture. Metal cation loading (e.g., copper loading) occurs instantaneously, while the relatively high basic $NH_3$ concentration maintains the metal cation (e.g., $Cu^{2+}$) in solution and decreases the likelihood of CuO crystallite formation. Optionally, continued vigorous stirring and applied heat for a predetermined number of minutes can allow for maximum metal cation loading under the prevailing conditions.

4. The product is cooled in an ice bath, filtered, followed by extensive washing with DI water. This optionally includes washing with a quantity of acidified DI water to tailor the amounts of loaded metal cation (e.g., $Cu^{2+}$) to the optimal desired ion exchange capacity.

5. The metal cation-loaded catalyst is dried at room temperature (RT) for at least 8-12 hours.

6. Calcining the metal cation-loaded catalyst (e.g., for 4 hours at 600° C.).

For the metal cation loading reaction, the metal cation precursor can include, for example, copper sulfate, copper nitrate, and/or ferric nitrate. The metal cation precursor can be present in the ion exchange reaction mixture at a concentration of 0.02 M or more (e.g., 0.1 M or more, 0.3 M or more, 0.5 M or more, or 0.75 M or more) and/or 1M or less (e.g., 0.75 M or less, 0.5 M or less, 0.3 M or less, or 0.1 M or less).

The obtained catalyst compositions can be analyzed by inductively coupled plasma (ICP) spectroscopy to determine elemental composition, X-Ray diffraction (XRD) for crystal structure determination, BET for pore size and surface area determination, and thermogravimetric analysis (TGA) for determining effectiveness of the catalyst in DEF thermolysis, as known to a person of skill in the art. Emissions control capabilities can be determined by a synthetic gas bench (SGB) procedure for 1"×3" core samples, and by on-engine testing behind a 13 L (class 8) diesel engine on a dynamometer.

Without wishing to be bound by theory, it is believed that for the relationship between copper exchange capacity and NOx conversion efficiency for (Si/Al=12) CuSSZ-13: about 30% ion exchange (IE) capacity, or ~2.2 wt % Cu is conventionally considered to be optimal to minimize the negative impact of CuO crystal formation with aging.

EXAMPLES

Nomenclature
Zeolites
  SSZ-13, or SSZ13: Chabazite
  ZSM-5
  β: beta zeolite
Metal Oxides
  Z: Zirconium dioxide (ZrO2)
  ZB: Barium zirconate
  ZV: Zirconium vanadate (or related compounds)
  B: Barium oxide
  Co: Cobalt (oxide)
  Mn: Manganese (oxide)
  CZ: Ceria-zirconia (also shown as ZCe)
  Cr: Chromium (oxide)

The following examples are provided to illustrate, not limit, the disclosure.

Example 1 describes the effect of alumina content on intra-crystalline catalyst properties, Example 2 describes the effect of different hybrid binary catalyst seeding on intra-crystalline catalyst lattice structure, Example 3 describes the effect of reaction time on intra-crystalline binary catalyst framework structure and SSZ-13 characteristics, Example 4 describes the impact of intra-crystalline binary catalyst on $NO_x$ conversion efficiency and ammonia storage, Example 5 describes the effect of template composition on purity of SSZ-13 framework structure in intra-crystalline binary catalysts, Example 6 describes an example of a 50% urea decomposition catalyst, and Example 7 describes a passive soot oxidation in SCR-on-DPF application.

Example 1. Effect of Alumina Content on Intra-Crystalline Catalyst Properties Synthesis of CuSSZ-13 based intra-crystalline binary catalyst is accomplished by seeding an unstirred, Teflon lined reactor with a hybrid binary catalyst synthesized according to U.S. application Ser. Nos. 15/612,815 and 15/612,833, filed Jun. 2, 2017. ACS Materials supplied SSZ-13 (Si/Al=12.5) zeolite. Sigma-Aldrich supplied all other reagents, unless otherwise stated. In the standard procedure, the reactor was charged with the following reagents to conduct synthesis for 168 hrs at 160° C.: 5 g of copper loaded hybrid binary catalyst containing nanoparticles of yttria stabilized $ZrO_2$); 50 g fumed silica; 12.5 g TMA (Sachem Inc); 22.5 g NaOH; 150 g DI water; and varying amounts of alumina (0, 1.75, 2.5, 5, 7.5, and 10 g). The product was filtered, washed with 2 liters DI water, followed by 400 mL pH=3 acidified DI water, and then finally 2 Liters DI water. The catalyst was first dried at room temperature for at least 8-12 hours, and then calcined for 4 hours at 600° C.

Direct copper exchange of the Na-form produced in the reactor was conducted by heating a mixture of 25 g of catalyst, 5 g anhydrous $CuSO_4$ and 365 g DI water to 80° C., then rapidly adding 155 mL 28% $NH_3$ solution. The recovered product was filtered; washed with 2 liters DI water; followed by 400 mL pH=3 acidified DI water; and then finally a 2 liters DI water wash. First the catalyst was dried at room temperature for at least 8-12 hours, and then calcined for 4 hours at 600° C.

Figure 3:
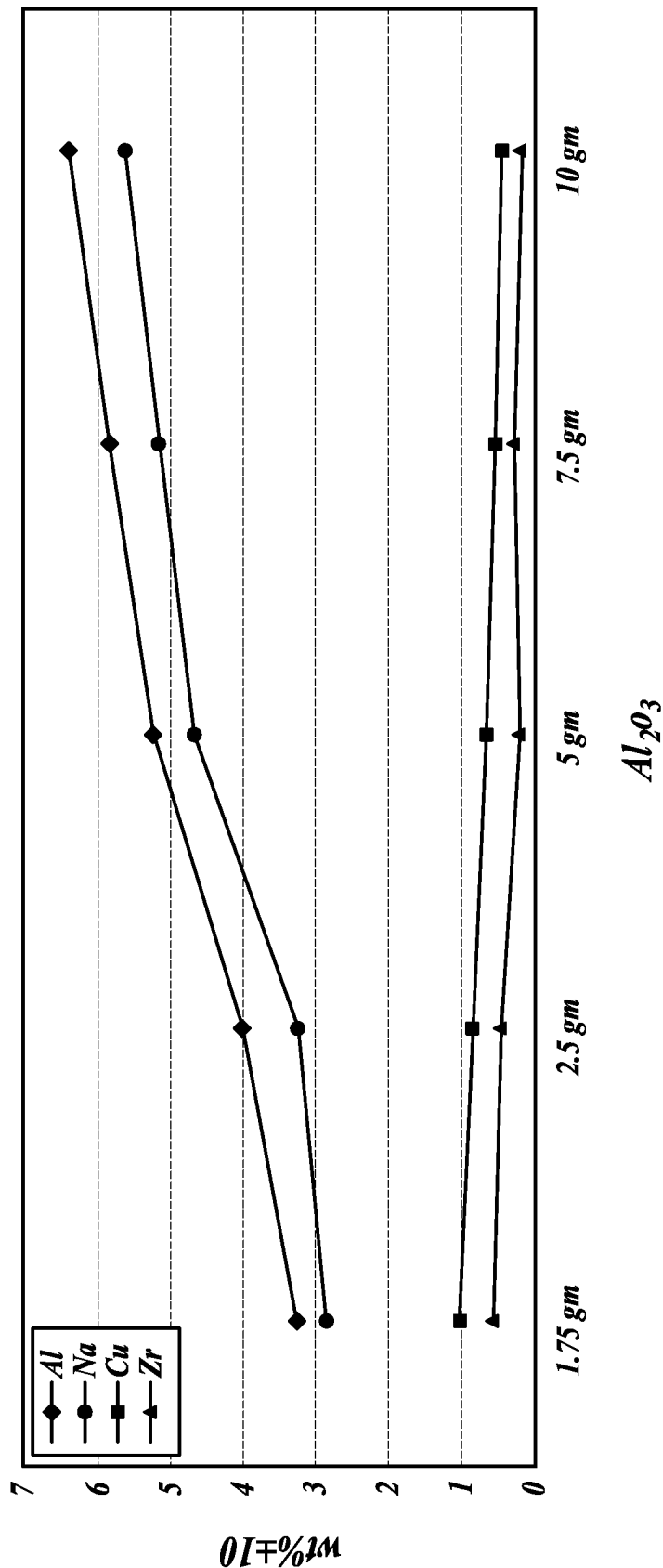
FIG. 3 is a graph showing the effect of $Al_2O_3$ in a reaction mixture on final intra-crystalline catalyst composition for embodiments of intra-crystalline binary catalysts of the present disclosure.

FIG. 3 and Table 1 shows the effect of varying the amount of $Al_2O_3$ on the final composition on the composition of intra-crystalline binary catalyst, as determined by ICP analysis. Increase in the $Al^{3+}$ and ion exchange bound $Na^+$ content, resulted in a corresponding decrease in the $Zr^{4+}$ and loaded $Cu^{2+}$ metal nanoparticle content. This is a strong indication that $Al^{3+}$ and $Zr^{4+}$ (in the nanoparticles) are competing for the limited available covalent $SiO_2$ bonding locations in the SSZ-13 crystal lattice framework.

TABLE 1

ICP Analysis of intra-crystalline catalyst where $Al_2O_3$ content in the reactor is the primary variable.

| Catalyst ID | Reactor ($SiO_2/Al_2O_3$) | Key Crystal Component (g) | Prime Variable [$Al_2O_3$] (g) | Weight % (±10%) | | | | | | |
|---|---|---|---|---|---|---|---|---|---|---|
| | | | | Al | Zr | Y | Na | Cu | Si | Si/Al |
| 1.1 | 28.6 | 5 | 1.75 | 3.2 | 0.6 | — | 2.9 | 1 | 29.6 | 9.3 |
| 1.2 | 20 | 5 | 2.5 | 4 | 0.5 | — | 3.3 | 0.9 | 28.8 | 7.2 |
| 1.3 | 10 | 5 | 5 | 5.2 | 0.2 | — | 4.7 | 0.7 | 26.8 | 5.2 |
| 1.4 | 25 | 5 | 2 | 3.6 | 0.4 | 0.1 | 0.9 | 0 | 31.8 | 8.8 |
| 1.5 | n/a | 5 | 0 | 1.6 | 0.7 | 0.3 | 1.8 | 0 | 33.3 | 20.8 |
| 1.6 | 10 | 0 | 5 | 5.8 | — | — | 4.2 | — | 24.9 | 4.3 |
| 1.7 | 6.7 | 5 | 7.5 | 5.8 | 0.3 | — | 5.2 | 0.5 | 25.5 | 4.5 |
| 1.8 | 5 | 5 | 10 | 6.4 | 0.2 | — | 5.6 | 0.4 | 23.7 | 3.7 |

Key Crystal Component: Hybrid Binary Crystal Seed.

Figure 4:
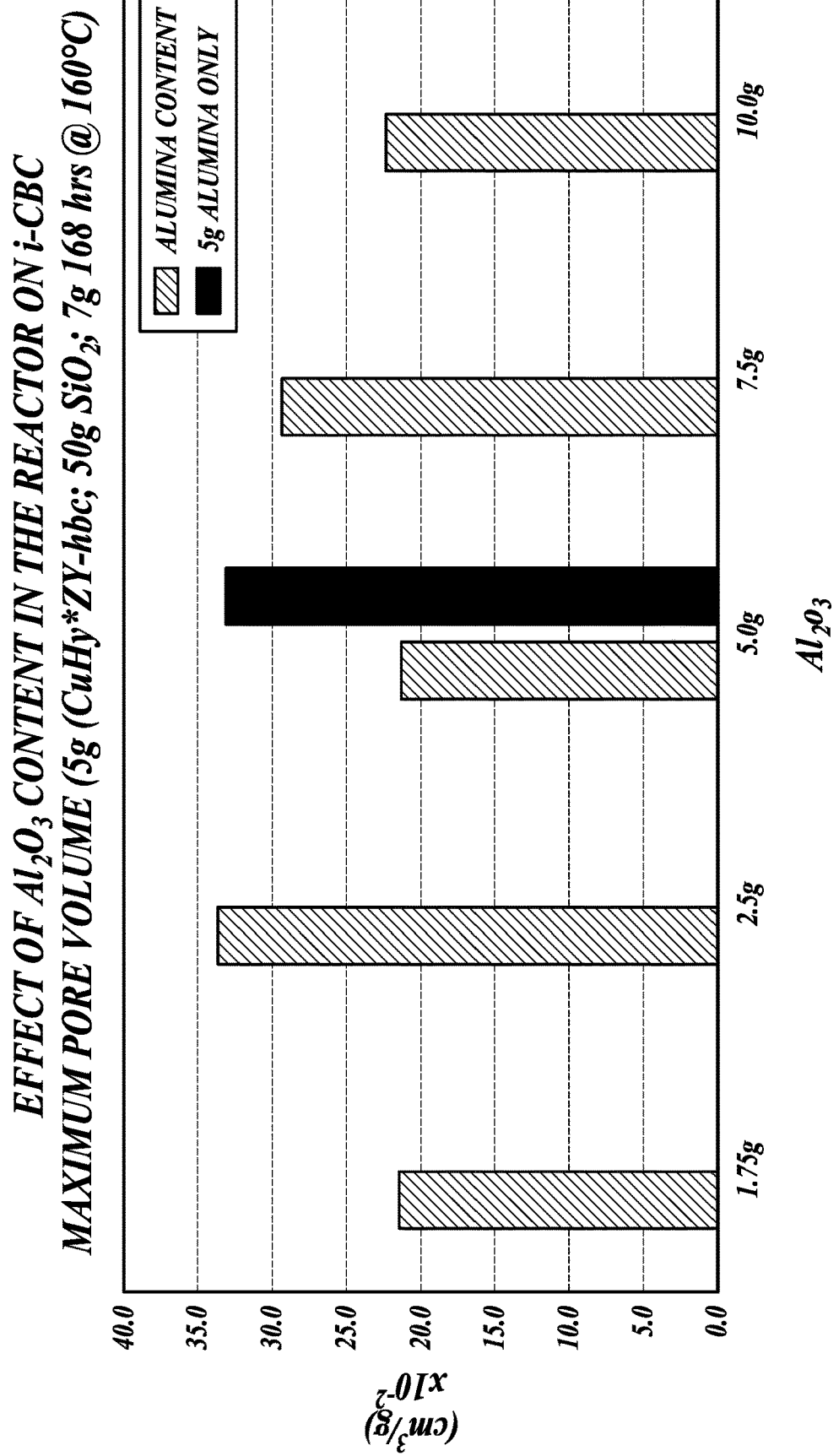
FIG. 4 is a bar graph showing the effect of $Al_2O_3$ content in a reaction mixture on the pore volume of embodiments of intra-crystalline binary catalysts of the present disclosure.

The BET data depicted in FIG. 4 shows that, with only alumina in the reactor and no nanoparticles from seeding hybrid binary catalyst, all of the available binding sites with $SiO_2$ in the SSZ-13 framework are occupied by $Al^{3+}$, the structure is highly mesoporous (at >0.33 cm³/g). This SSZ-13 control achieved a Si/Al ratio of 4.3, which was comparable to the predicted Si/Al=5 from the reagent composition in the reactor. This is in stark contrast with the SSZ-13 (having Si/Al=12) obtained from ACS Materials, where afar lower levels of mesoporosity (i.e. ~0.2 cm³/g) is typical. In this example, there is 35.700 higher level of mesoporosity exhibited by the SSZ-13 control compared to the corresponding intra-crystalline catalyst with (Si/Al=5.2). This is a strong indication that the intra-crystalline catalyst can provide a more robust and durable framework at (Si/Al≤12).

Figure 5:
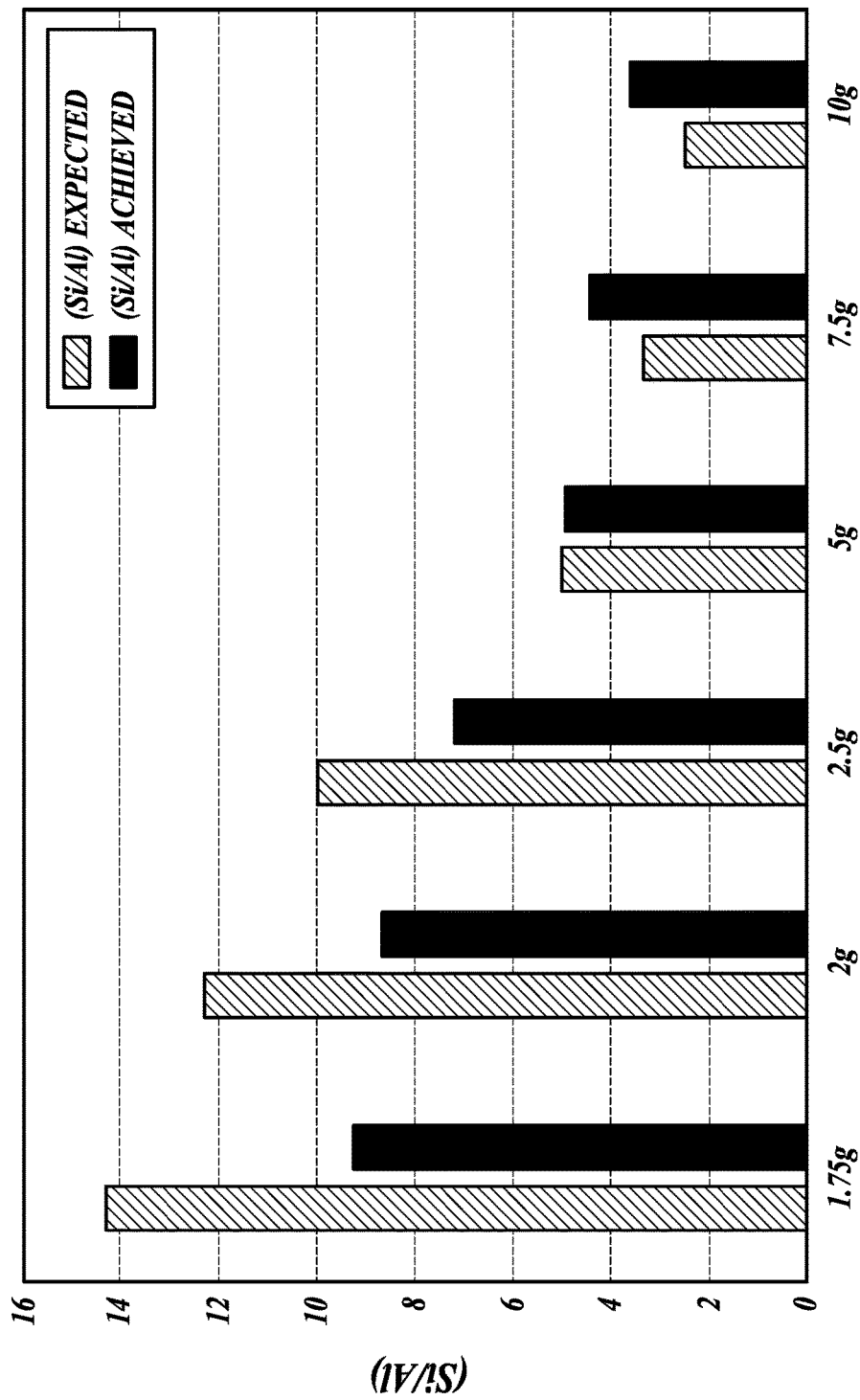
FIG. 5 is a bar graph showing the expected vs achieved Si/Al ratio with increased $Al_2O_3$ in a reaction mixture for embodiments of intra-crystalline binary catalysts of the present disclosure.

Furthermore, the data in FIG. 5 illustrates that reactor compositions with equal amounts of alumina and seeding hybrid binary catalyst are optimal for controlling and predicting the (Si/Al) achieved in the intra-crystalline catalyst produced.

Example 2: Effect of Different Hybrid Binary Catalyst Seeding on Intra-Crystalline Catalyst Lattice Structure Two different sets of reactor compositions modified for intra-crystalline catalyst synthesis were carried out, based upon the reaction conditions in Example 1:
  i. 2 g $Al_2O_3$, with CuHy*ZY-HBC seeding varied (0.0, 1.75, 2.5, 5.0, 7.5, 10.0, 15.0 g). CuHy*ZY-HBC is composed of Cu-loaded SSZ-13 with extra-capillary hybridized metal oxide composed of yttrium-doped ZrO.
  ii. Four different reactor compositions used are in Table 2, with reaction for 168 hrs at 160° C. The copper exchange procedure was the same as that outlined in Example 1.

SiC DPF core samples (1"×3") supplied by Dinex was coated with washcoat composed of selected catalysts and tested by the SGB for $NO_x$ conversion efficiency protocol. The following synthetic gas stream was used: 500 ppm $NO_x$ ($NO_2/NO_x$=0.0, 0.5, and 0.75); $O_2$ 8.7%; $H_2O$ 7.8% ($O_2$/$H_2O$ ratio of 1.1); ammonia to $NO_x$=1.2; 500 ppm $NH_3$, all at a space velocity (SV) of 100 $khr^{-1}$. For $NH_3$ storage the gas stream comprised 500 ppm $NH_3$ with 8% $H_2O$ at space velocity (SV) of 100 $khr^{-1}$, and the temperature ramped up to 480° C. while monitoring the amount of ammonia desorbed.

TABLE 2

Use of different types and quantity of hybrid binary catalyst-zeolite and metal oxide seeding

| Catalyst | Seeding Zeolite | Metal Oxide | Fumed $SiO_2$ (g) | $AL_2O_3$ (g) | TMA (g) | NaOH (g) | DI $H_2O$ (g) |
|---|---|---|---|---|---|---|---|
| i-CBC-1 | CuHy*ZY (10 g) | — | 100 | 10 | 25 | 45 | 200 |
| i-CBC-2 | CuHy*ZY (25 g) | — | 125 | 12.5 | 25 | 45 | 200 |
| i-CBC-3 | SSZ-13 (130 g) | CuZrY (2.5) | — | — | 25 | 45 | 200 |
| i-CBC-4 | CuZSM-5/ZBCoFe (18.8 g) | — | 125 | 12.5 | 25 | 45 | 200 | i-CBC: intra-crystalline binary catalyst.

Figure 6:
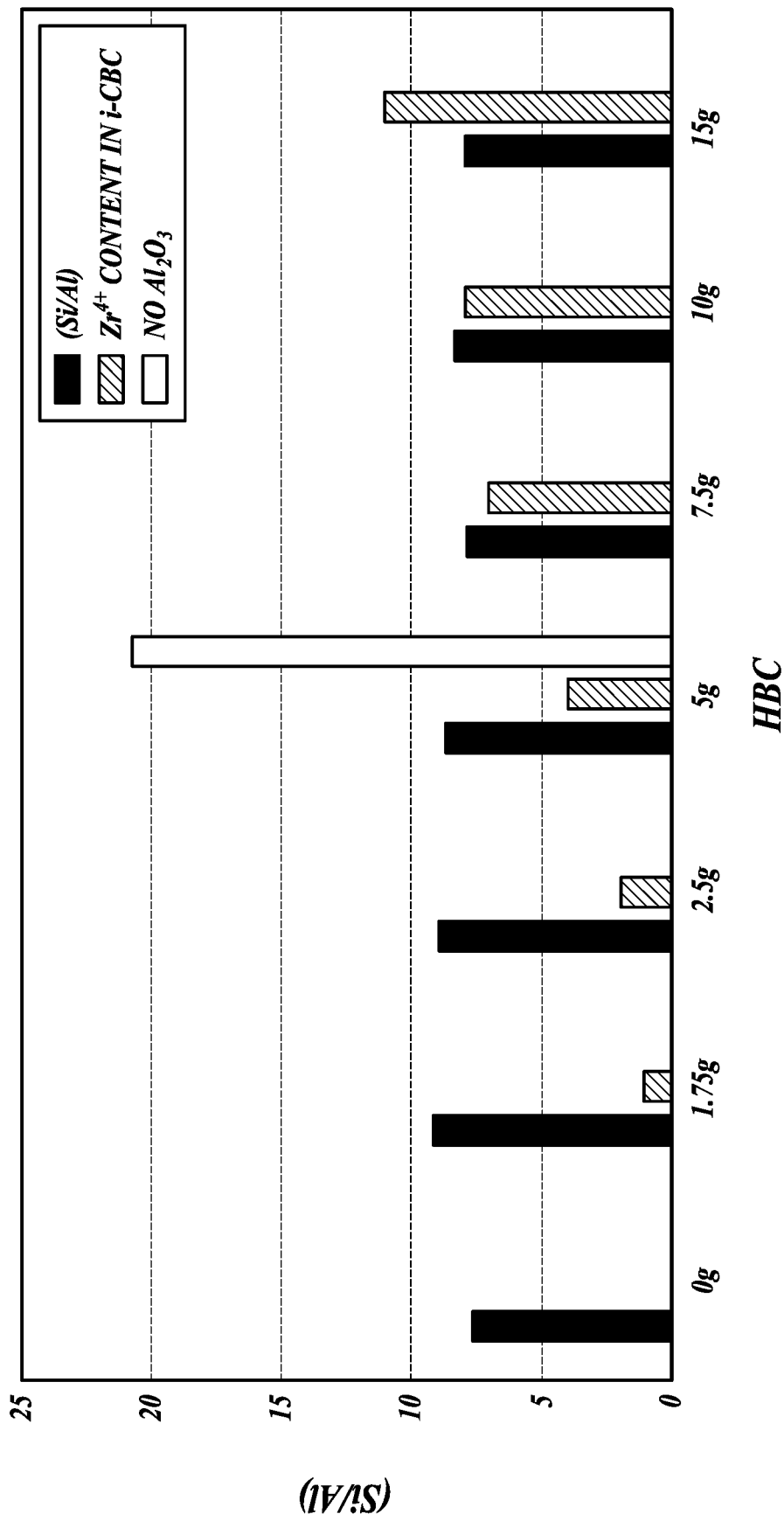
FIG. 6 is a bar graph showing the effect of CuHy*ZY-HBC ("HBC-1"), corresponding to a Cu-loaded SSZ-13 with extra-crystalline hybridized zirconia oxide (Z) and yttria oxide (Y) nanoparticles, in a reaction mixture on Si/Al ratio for embodiments of intra-crystalline binary catalysts of the present disclosure.
Figure 7:
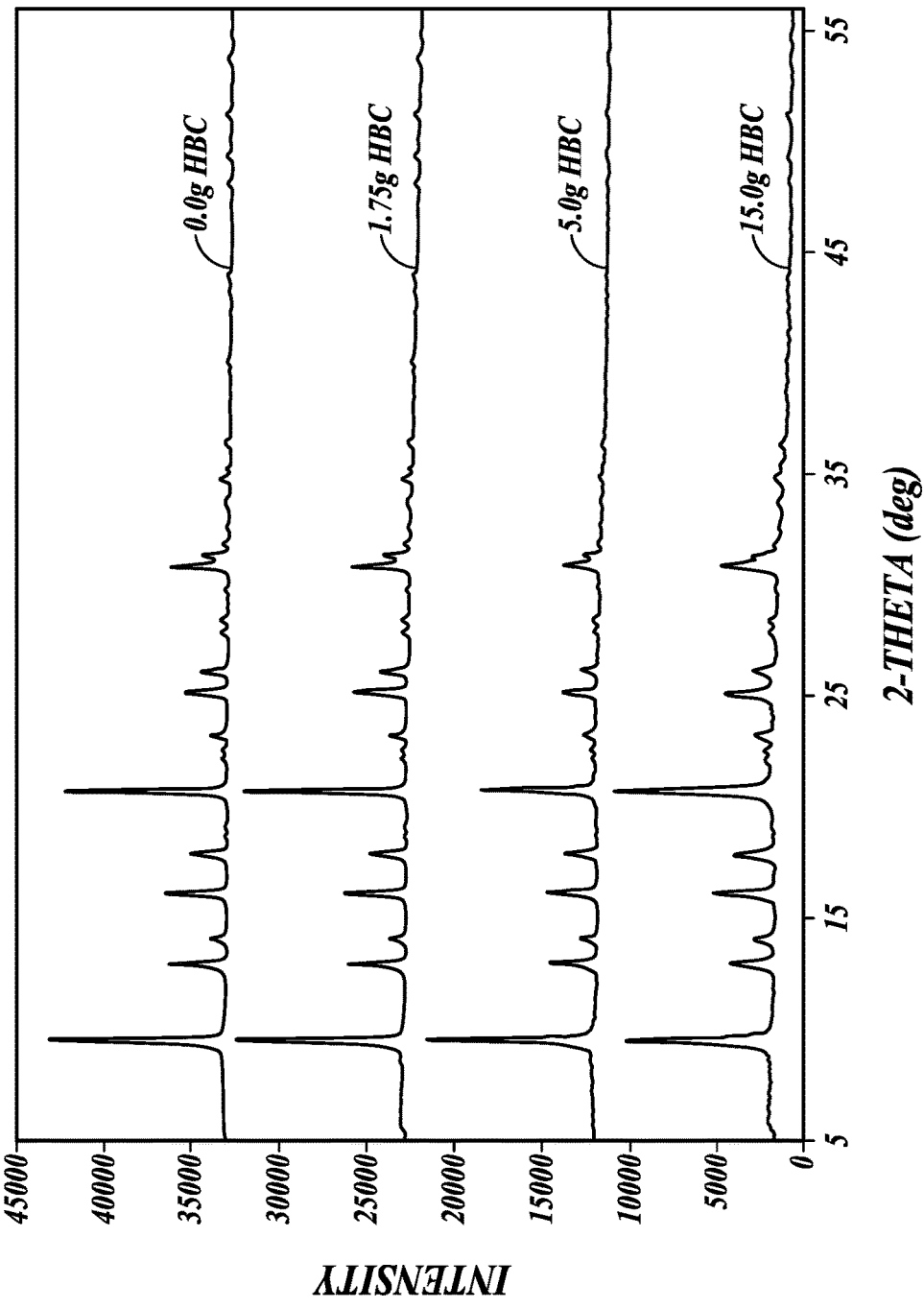
FIG. 7 shows X-ray diffraction patterns of embodiments of intra-crystalline binary catalysts of the present disclosure, synthesized using different CuHy*ZY-HBC ("HBC-1") amounts in the reaction mixture.

Shown in FIG. 6 is the effect of increasing amounts of CuHy*ZY-hybrid binary catalyst seeded into reactors containing 2 g $Al_2O_3$ and 50 g $SiO_2$. It was apparent that the presence of the seeded hybrid binary catalyst in the reactor did not dramatically affect the final (Si/Al) ratio of intra-crystalline catalyst produced, as $Zr^{4+}$ from the metal oxide nanoparticles increases. In spite of the increased nanoparticle content, there was confirmation of SSZ-13 crystal lattice framework of the intra-crystalline catalyst products by XRD analysis (in FIG. 7). In addition, FIG. 6 and Table 3 illustrate that as hybrid binary catalyst seeding increased, there was a small yet consistent decrease in (Si/Al), as $Al^{3+}$ content also increased. In addition, the sample comprised of hybrid binary catalyst but zero grams of $Al_2O_3$ had (Si/Al>20); with Al only contributed by the SSZ-13 of the seeded hybrid binary catalyst. By XRD analysis was determined to be amorphous, suggesting that a moderate amount of hybrid binary catalyst seeding should be employed to balance the complex interactions that were in play. For this reason, a 5 g hybrid binary catalyst seeding is a preferred composition.

TABLE 3

ICP Characterization of intra-crystalline catalyst produced by seeding different quantities of CuHy*ZY in the Reactor

| Catalyst | Reactor Parameters | | Key Framework Component | Weight % (±10%) | | | | | | Si/Al |
|---|---|---|---|---|---|---|---|---|---|---|
| ID | (SiO$_2$/Al$_2$O$_3$) | HBC Content [CuHy*ZY] (g) | [Al$_2$O$_3$] (g) | Al | Zr | Y | Na | Cu | Si | |
| 2 | 25 | 0 | 2 | 4.3 | — | — | 0 | — | 33 | 7.7 |
| 2.1 | 25 | 1.75 | 2 | 3.6 | 0.1 | 0.1 | 0.3 | — | 33.2 | 9.2 |
| 2.2 | 25 | 2.5 | 2 | 3.7 | 0.2 | 0.1 | 0.5 | — | 33.3 | 9 |
| 2.3 | 25 | 5 | 2 | 3.6 | 0.4 | 0.1 | 0.9 | 0 | 31.8 | 8.8 |
| 2.4 | n/a | 5 | 0 | 1.6 | 0.7 | 0.3 | 1.8 | 0 | 33.3 | 20.8 |
| 2.5 | 25 | 7.5 | 2 | 4 | 0.7 | 0.2 | 0.7 | 0 | 31.7 | 19.8 |
| 2.6 | 25 | 10 | 2 | 3.8 | 0.8 | 0.3 | 1.1 | 0 | 32 | 8.4 |
| 2.7 | 25 | 15 | 2 | 4 | 1.1 | 0.4 | 1 | 0 | 32 | 8 |

HBC: hybridized binary catalyst.

Table 4 contains data derived from increasing the amount of CuHy*ZY-HBC used in seeding from a ratio of (10 HBC:10 Al$_2$O$_3$:100 SiO$_2$) to (25 HBC:10 Al$_2$O$_3$:100 SiO$_2$) for intra-crystalline catalyst. It was apparent from the data that i-CBC-2AsSyn (intra-crystalline binary catalyst-2 As Synthesized) and i-CBC-2Cu had a different pore structure than that for the lower hybrid binary catalyst (HBC) containing i-CBC-1AsSyn and i-CBC-1Cu. Likewise, the i-CBC-3 (seeded with a metal oxide with no zeolite), and i-CBC-4 (seeded with HBC based upon ZSM-5 zeolite), were quite different from the i-CBC-1 compositions.

TABLE 4

Effect of hybrid binary catalyst and metal oxide seeding BET surface area and pore structure

| Catalyst | BET Surface Area (m$^2$/g) | HK Median Pore Width (Å) | HK Maximum Pore Volume (cm$^3$/g) |
|---|---|---|---|
| i-CBC-1 AsSyn | 271 | 5.0 | 0.1068 |
| i-CBC-1Cu | 540 | 5.5 | 0.2121 |
| i-CBC-2 AsSyn | 301 | 13.6 | 0.1266 |
| i-CBC-2Cu | 596 | 7.7 | 0.2482 |
| i-CBC-3 AsSyn | 127 | 5.2 | 0.0500 |
| i-CBC-4 AsSyn | 113 | 7.7 | 0.0442 |
| i-CBC-4Cu | 445 | 5.4 | 0.1754 |

HK: Pore volume and median pore diameters for the catalysts were calculated using Howarth-Kowazoe ("HK") method.

Figure 8:
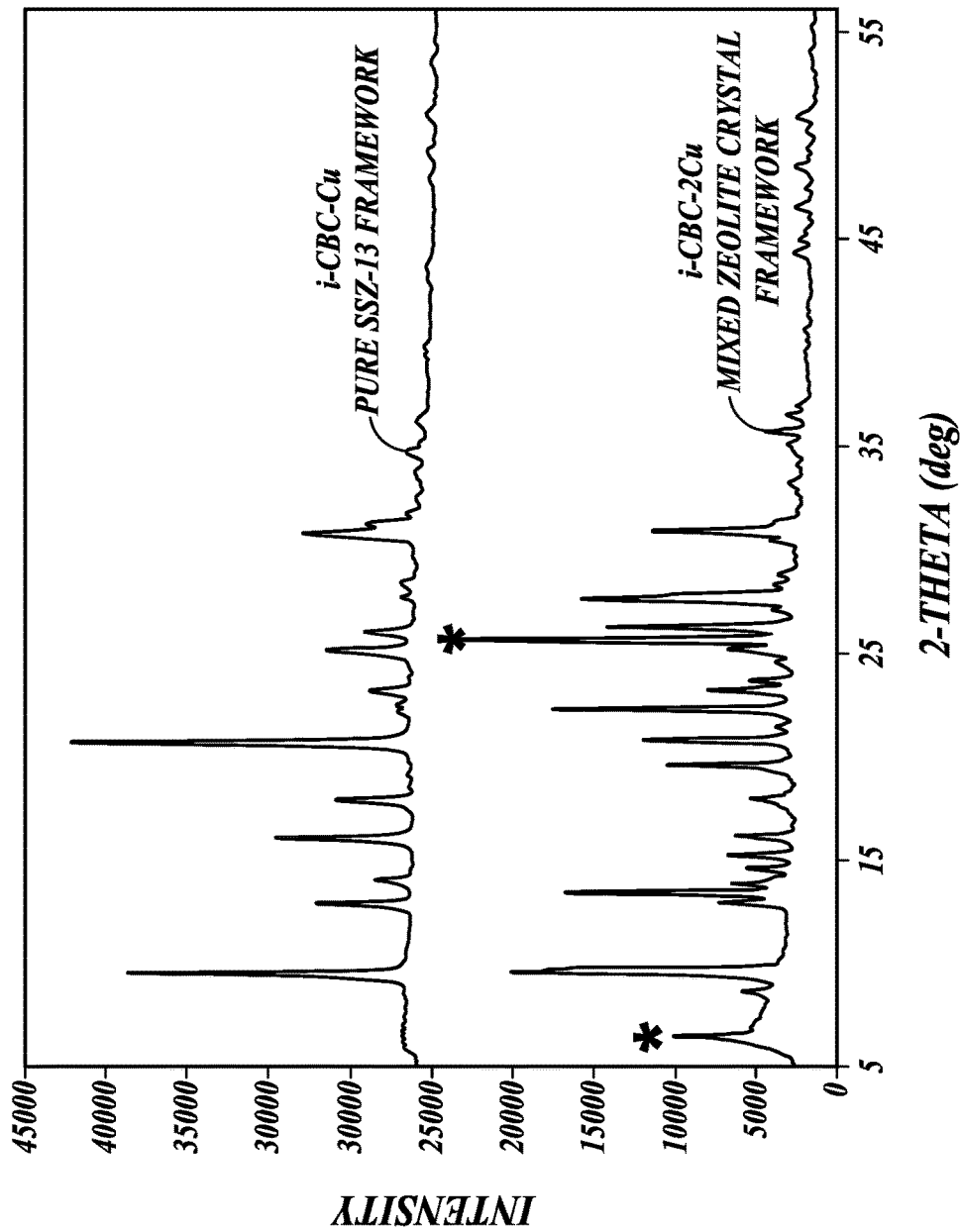
FIG. 8 shows X-ray diffraction patterns of embodiments of intra-crystalline binary catalysts of the present disclosure, synthesized using different CuHy*ZY-HBC ("HBC-1") amounts in the reaction mixture.

These inferences were supported by the XRD analysis. FIG. 8 contains XRD profiles that confirm that i-CBC-1Cu was composed of pure SSZ-13 framework, while i-CBC-2Cu shows clear evidence of a mixed zeolite framework structure. The stars * in FIG. 8 depict characteristic peaks for: ZSM-5 at 2-Theta=7.935, and in the region of 26 (2-Theta) for Analcime or even Quartz. Therefore, it was reasonable to conclude that seeding the reactor with quantities of hybrid binary catalyst that significantly exceeds the quantity of Al$_2$O$_3$, has the potential for producing undesirable mixed framework zeolite.

Figure 9:
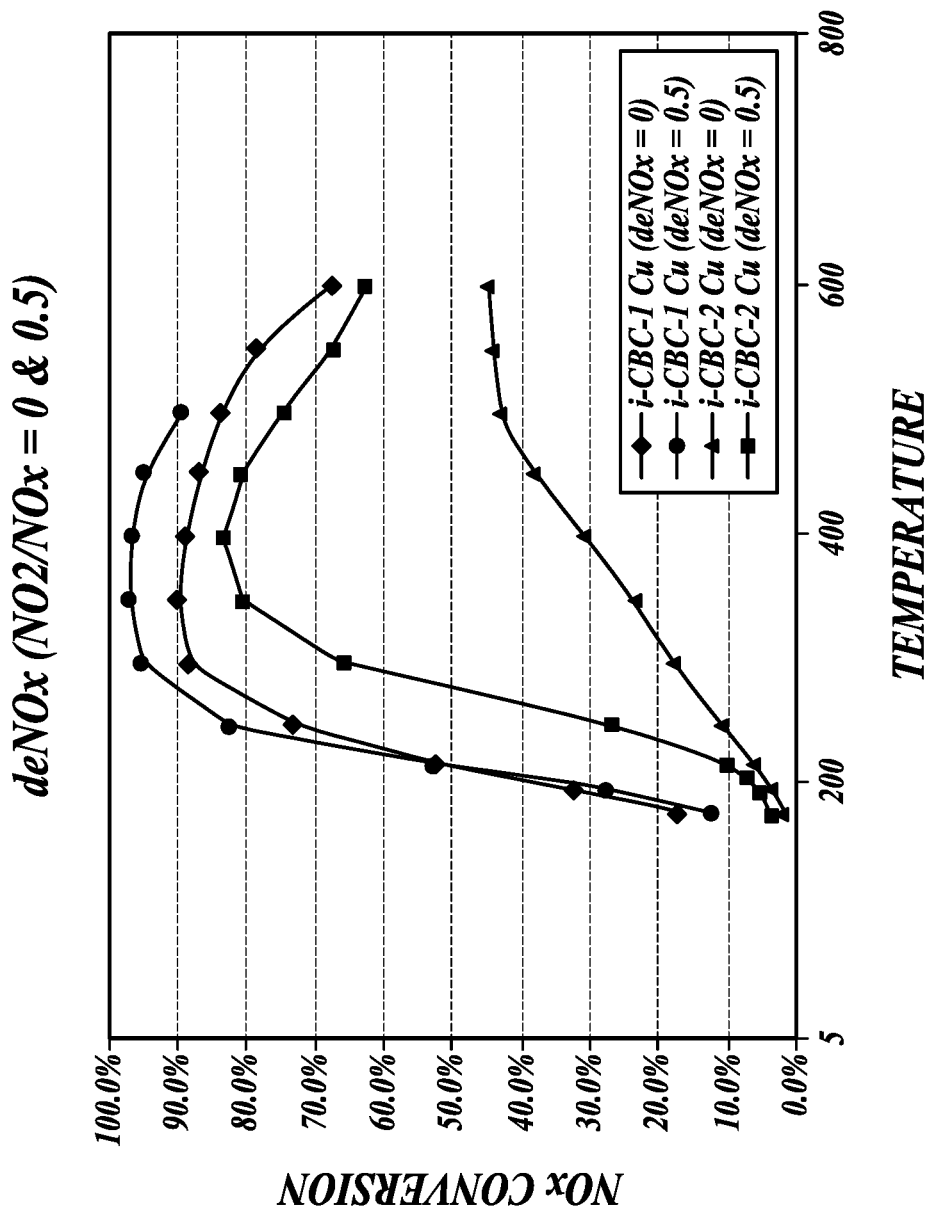
FIG. 9 is graph showing the comparative $NO_x$ conversion efficiency for embodiments of intra-crystalline binary catalysts of the present disclosure.
Figure 10:
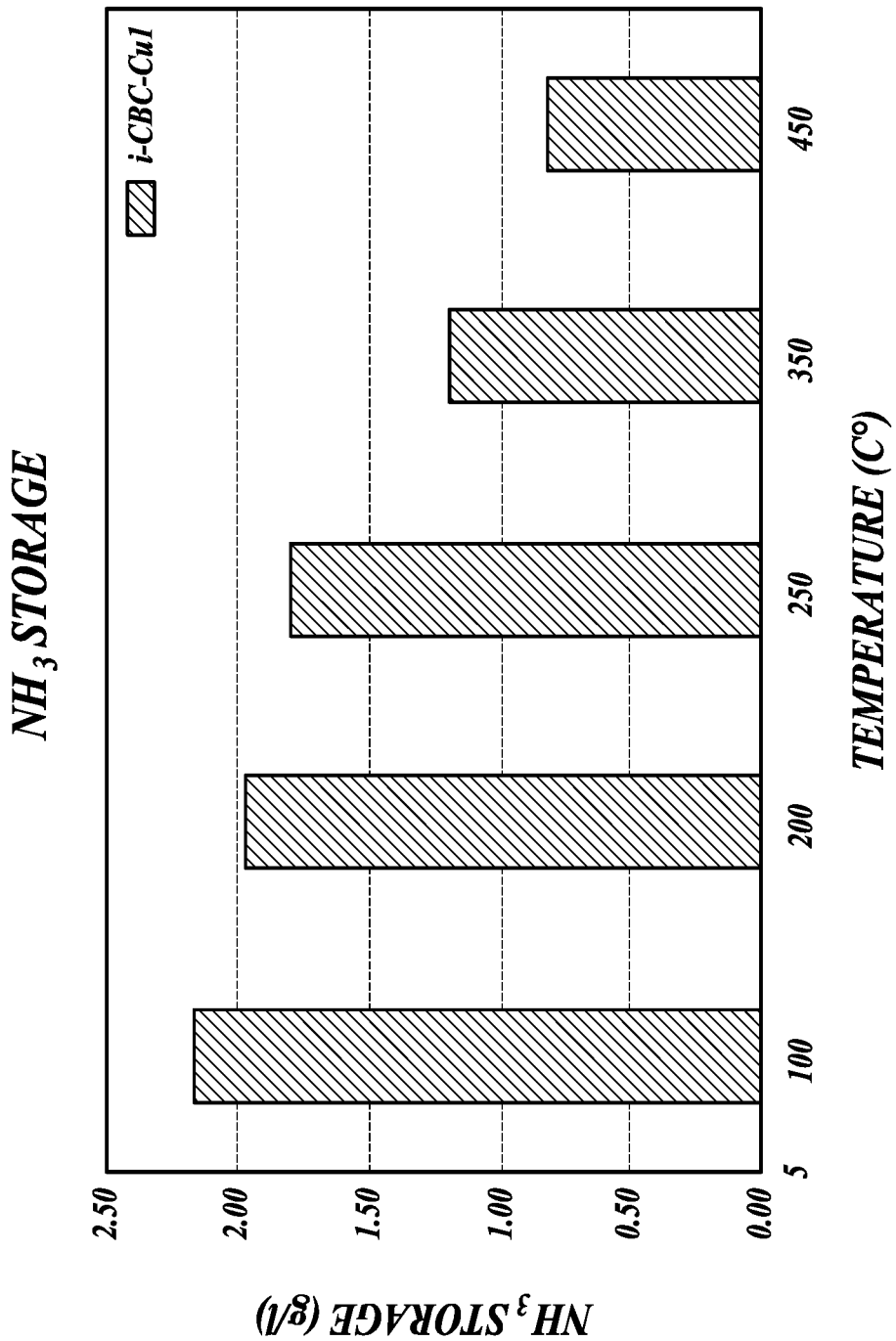
FIG. 10 is a bar graph showing ammonia storage for embodiments of intra-crystalline binary catalysts of the present disclosure.

The differences in intra-crystalline framework structure of i-CBC-1Cu and i-CBC-2Cu were evident when comparing NO$_x$ conversion efficiency in a SCRF configuration (FIG. 9). Ammonia storage for i-CBC-1Cu (FIG. 10) exceeded that from a high performance conventional CuSSZ-13 SCRF catalyst. The leading commercial SCRF used on passenger cars have ammonia storage of only 1.5/L at 100° C. compared to 2.2 g/L for i-CBC-1Cu. Therefore, the pure SSZ-13 framework based i-CBC-1Cu catalyst exhibit the superior emissions control properties.

Figure 11:
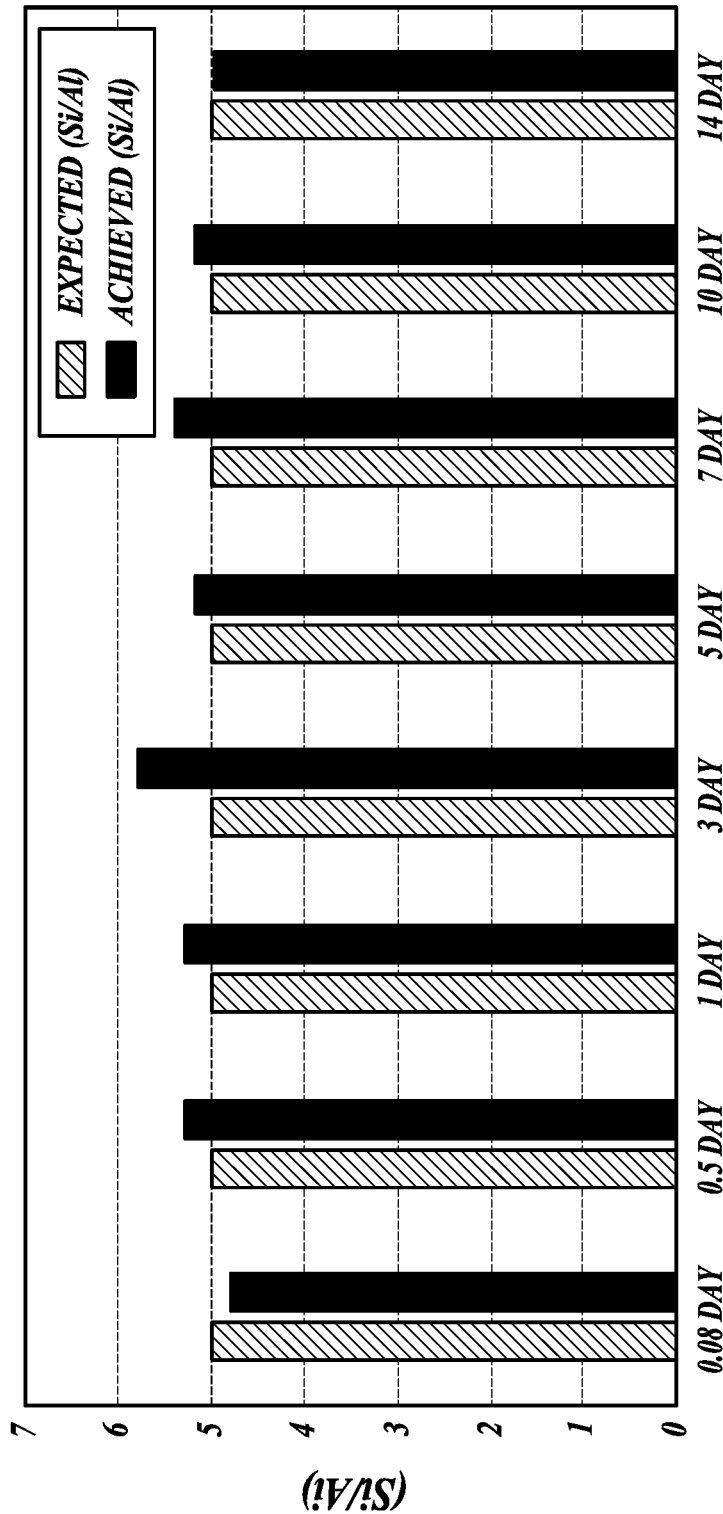
FIG. 11 is a bar graph showing the effect of reaction time on Si/Al ratio for the synthesis of embodiments of intra-crystalline binary catalysts of the present disclosure.

Example 3: Effect of Reaction Time on Intra-Crystalline Binary Catalyst Framework Structure and SSZ-13 Characteristics The reactor compositions in Example 1 were subjected to varying reaction times (0.08, 0.5, 1, 3, 5, 7, 10, 14, 20 days):
i. 5 g Al$_2$O$_3$; 50 g SiO$_2$
ii. 5 g CuHy*ZY HBC; 5 g Al$_2$O$_3$; 50 g SiO$_2$
iii. 2.5 g CuHy*ZY HBC; 5 g Al$_2$O$_3$; 50 g SiO$_2$ Reactor conditions in procedure (a) resulted in data presented in FIG. 11. The data showed that within 2 hours (0.08 day) of starting the reaction at 160° C., the SSZ-13 framework forms, according to (Si/Al) values from ICP. Therefore, the Si/Al ratio achieved in the intra-crystalline binary catalyst product is comparable to the Si/Al reagent ratio in the reactor and remained stable within two hours of reaction time. This implied that prolonged reaction times of up to 20 days involved reorganization of the structure to obtain the optimal tradeoff between emissions control properties and catalyst durability.

Figure 12:
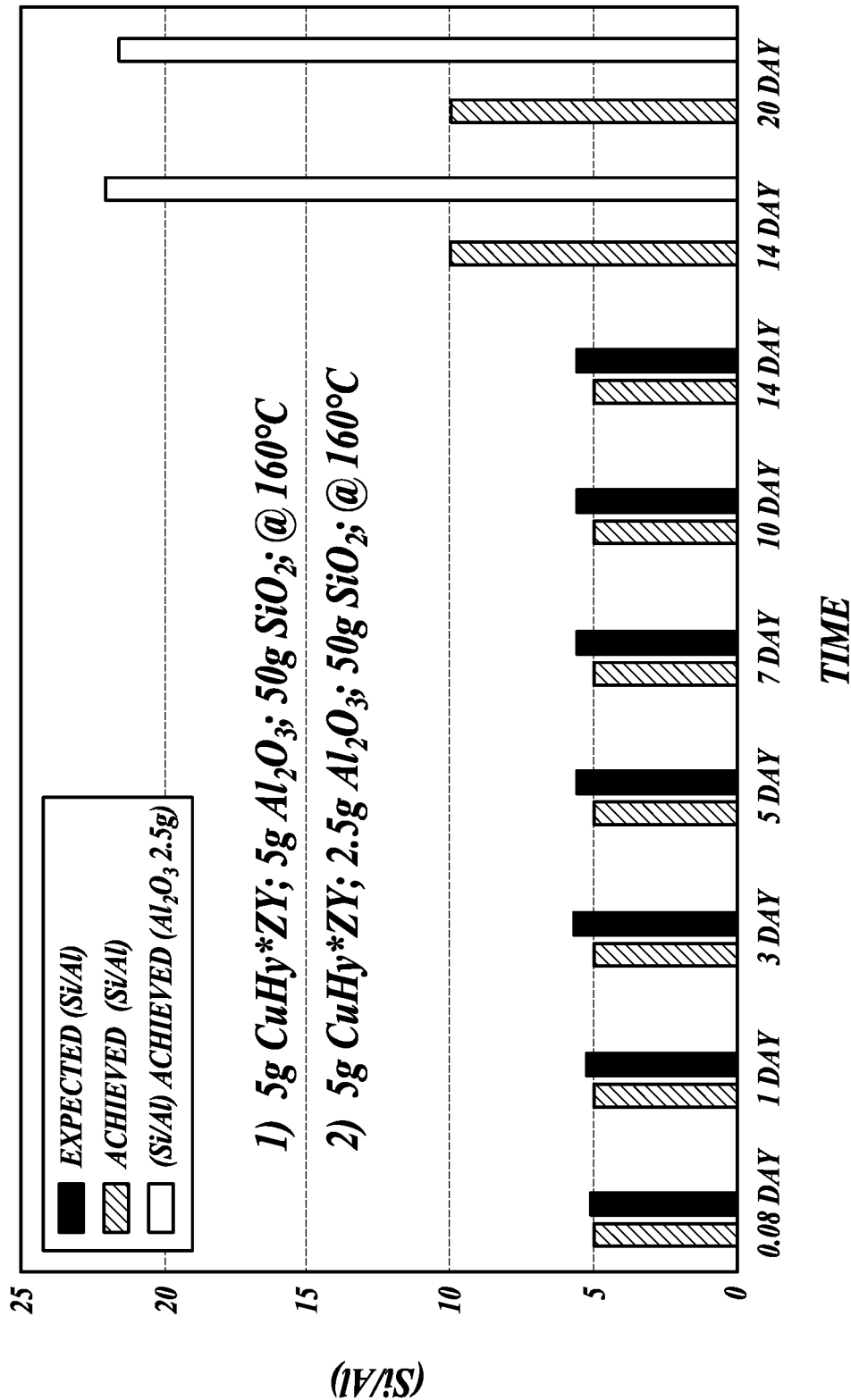
FIG. 12 is a bar graph showing the effect of reaction time on Si/Al ratio for embodiments of intra-crystalline binary catalysts of the present disclosure having different $Al_2O_3$ content.

Depicted in FIG. 12 are results from reaction procedures (b) and (c), which confirmed the previous inference that within 0.08 day of reaction time, the catalytically functional SSZ-13 framework was formed. Likewise, the Si/Al value achieved in intra-crystalline binary catalyst product and the expected Si/Al value remained unchanged for the duration of the experiment. In addition, with 2.5 g Al$_2$O$_3$ content in the reactor instead of 5 g, there was no longer alignment between Si/Al ratio that was achieved and the expected Si/Al ratio. This suggested that optimal control of intra-crystalline binary catalyst product occurs when an equal amount of Al$_2$O$_3$ and hybrid binary catalyst are in the reactor.

Example 4: Impact of Intra-Crystalline Binary Catalyst on NO$_x$ Conversion Efficiency and Ammonia Storage SiC DPF core samples (1"×3") supplied by Dinex was coated with washcoat composed of intra-crystalline binary catalysts and tested by the SGB for NO$_x$ conversion efficiency protocol. The following is the synthetic gas stream used: 500 ppm NO$_x$ (NO$_2$/NO$_x$=0.0, 0.5, and 0.75); O$_2$ 8.7%;

H$_2$O 7.8% (O$_2$/H$_2$O ratio of 1.1); ammonia to NO$_x$=1.2; 500 ppm NH$_3$, all at a SV of 100 khr$^{-1}$. For NH$_3$ storage the gas stream comprised 500 ppm NH$_3$ with 8% H$_2$O at space velocity (SV) 100 khr$^{-1}$, and the temperature ramped up to 480° C. while monitoring the amount of ammonia desorbed.

Figure 13A:
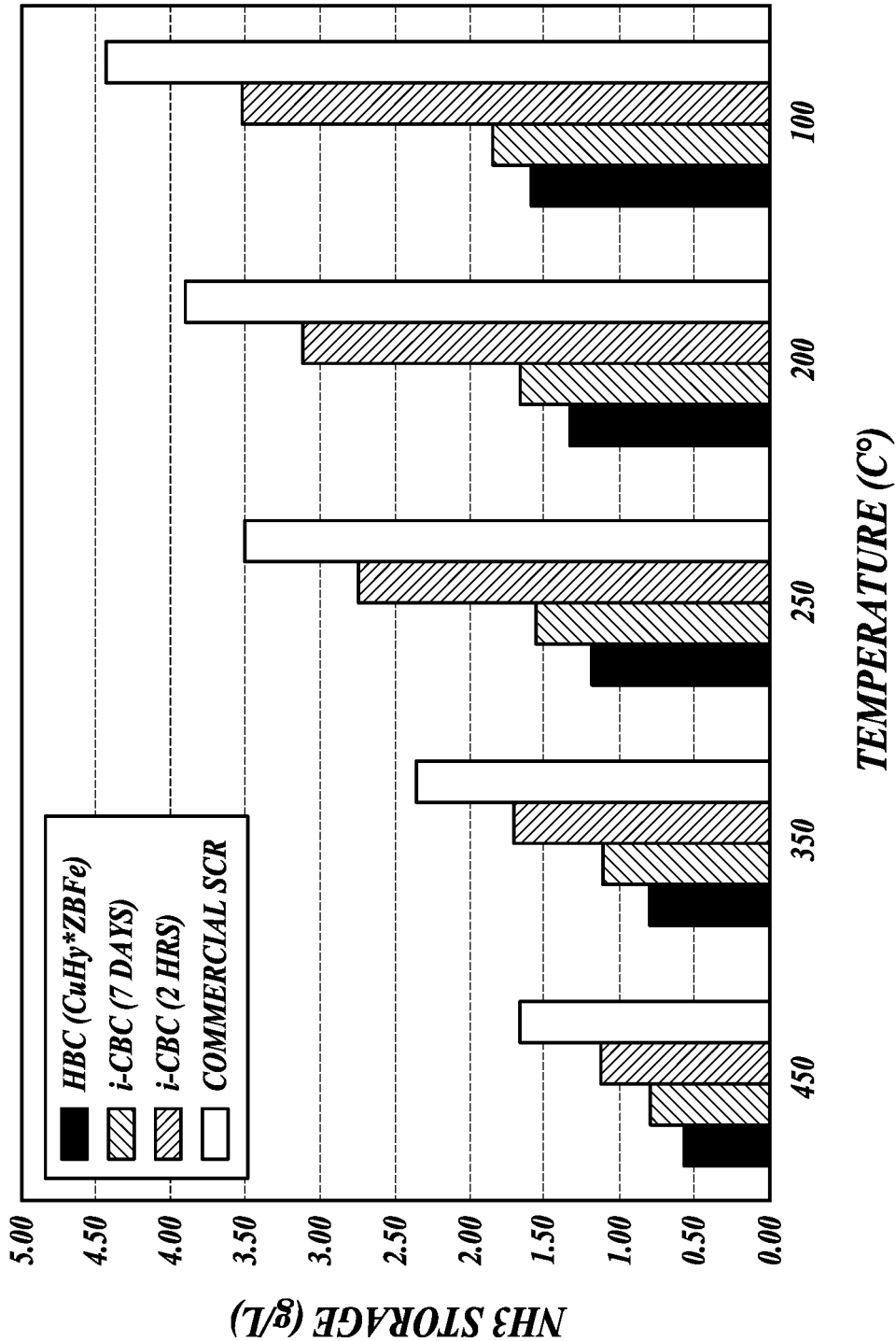
FIG. 13A is a bar graph showing comparative ammonia storage for embodiments of intra-crystalline binary catalysts of the present disclosure, a hybrid binary catalyst, and a commercial SCR catalyst at different temperatures.
Figure 13B:
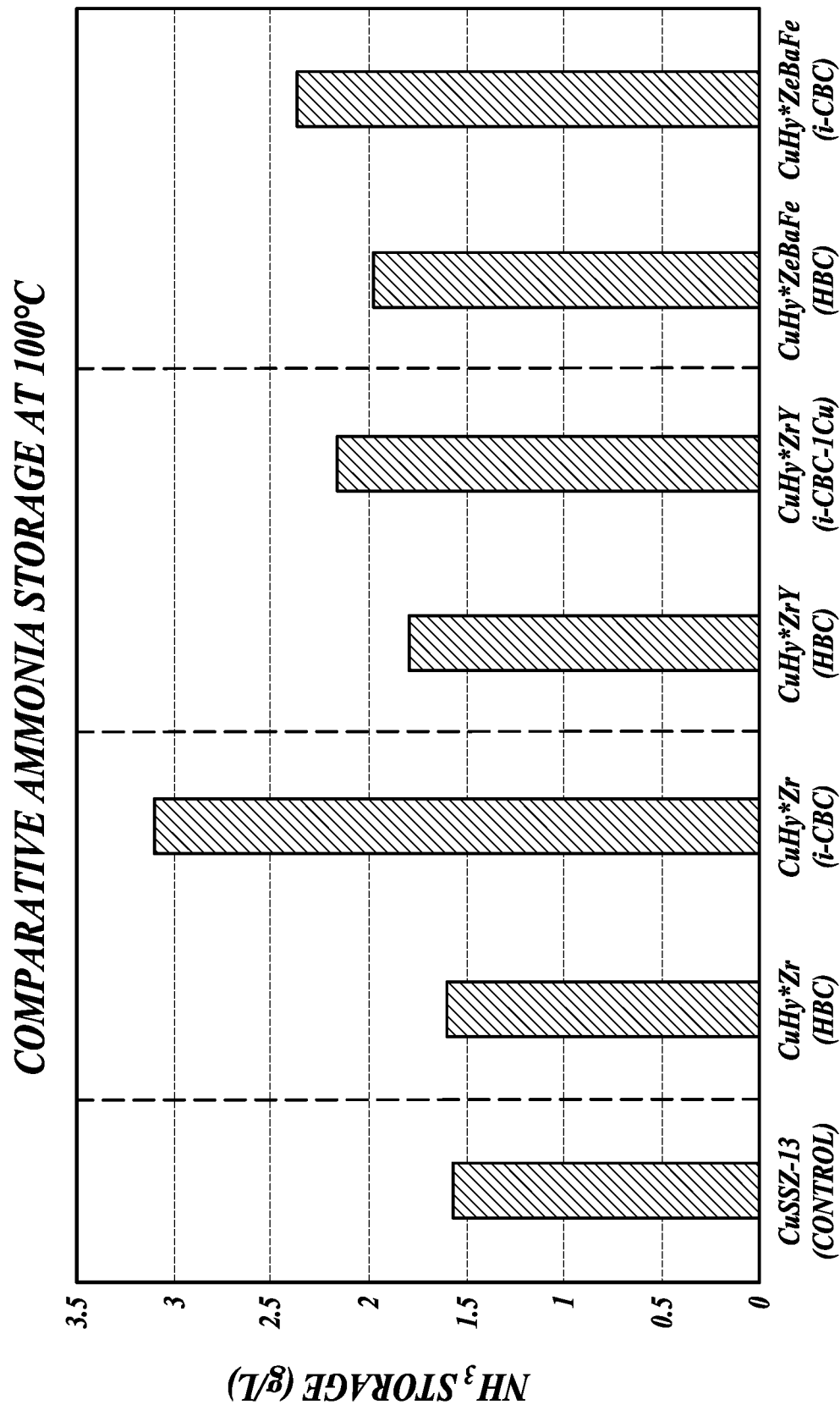
FIG. 13B is a bar graph showing comparative ammonia storage for embodiments of intra-crystalline binary catalysts of the present disclosure, hybrid binary catalysts, and a CuSSZ-13 control.

FIG. 13 shows increasing ammonia storage for catalysts as follows:
i. CuSSZ-13 control in a SCRF format.
ii. CuHy*Zr-HBC, with pure ZrO$_2$ extra-crystalline nanoparticles, compared with the CuSSZ-13 containing intra-crystalline nanoparticles in a SCRF format.
iii. CuHy*ZY-HBC, with extra-crystalline metal oxide nanoparticle hybridized to CuSSZ-13, compared with Intra-crystalline binary catalysts based on CuHy*ZY-HBC in a SCRF format.
iv. HBC (CuHy*ZBFe)—SCRF comprised of CuSSZ-13 with extra-crystalline nanoparticles hybridized, composed of ZrO$_2$ doped with both barium and ferric oxides, which is compared with i-CBC containing intra-crystalline nanoparticles hybridized, composed of ZrO$_2$ doped with both barium and ferric oxides.
v. Intra-crystalline binary catalyst based on CuHy*ZY-HBC produced with 0.08 day (2-hrs) reaction time –SCRF.
vi. Commercial SCR, which typically has ≥2 times the catalyst loading per unit volume of the flow-through substrate.

These data illustrate that intra-crystalline binary catalysts generally produce catalysts with higher ammonia storage, compared with hybrid binary catalysts. However, it is very surprising to observe that with only (0.08-day) reaction time, the ammonia storage level far exceeds that for the (7-day) intra-crystalline binary catalyst. Indeed, the (0.08-day) intra-crystalline binary catalyst ammonia storage is particularly impressive compared with the commercial SCR, because an SCR typically has values about twice that of a SCRF. A high ammonia storage is an important property to facilitate needed changes in aftertreatment controls to minimize incidents of over dosing with urea containing diesel exhaust fluid (DEF), and all the negative impacts thereof (e.g., premature low temperature SCR aging).

Figure 14:
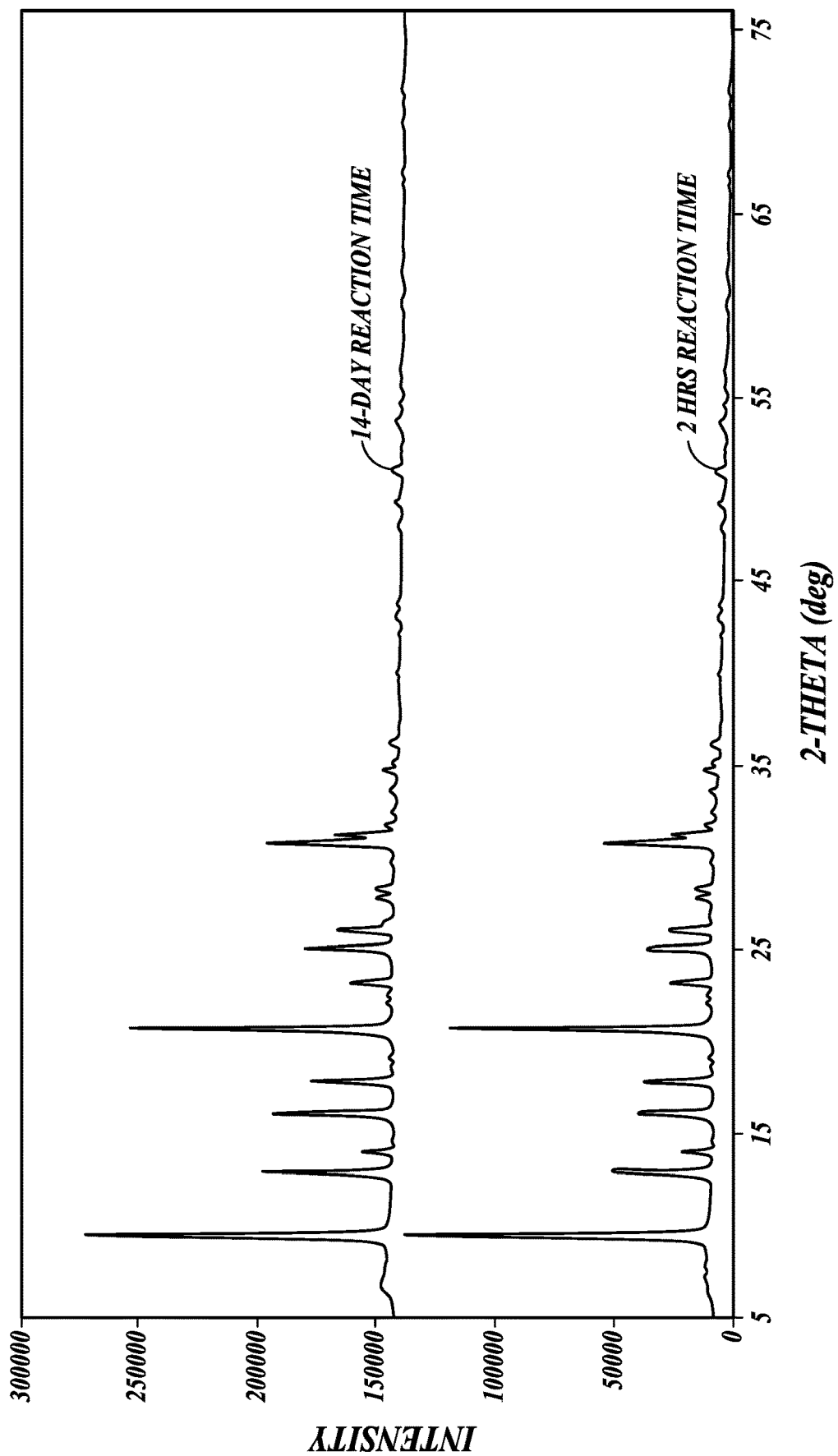
FIG. 14 shows X-ray diffraction patterns of embodiments of intra-crystalline binary catalysts of the present disclosure synthesized using different reaction times.

Confirmation of the SSZ-13 framework for (0.08-day, 2-hr) intra-crystalline binary catalyst is shown in FIG. 14, where its XRD profile is identical to a (14-day) intra-crystalline binary catalyst of the same composition.

Example 5: Effect of Template Composition on Purity of SSZ-13 Framework Structure in Intra-Crystalline Binary Catalyst Alteration of the quantity of template (TMA) in the reactor composition in Example 1 involved comparing:
i. A relatively low TMA quantity (5 g), with
ii. The standard (or rather high) quantity of 12.5 g TMA.

Figure 15:
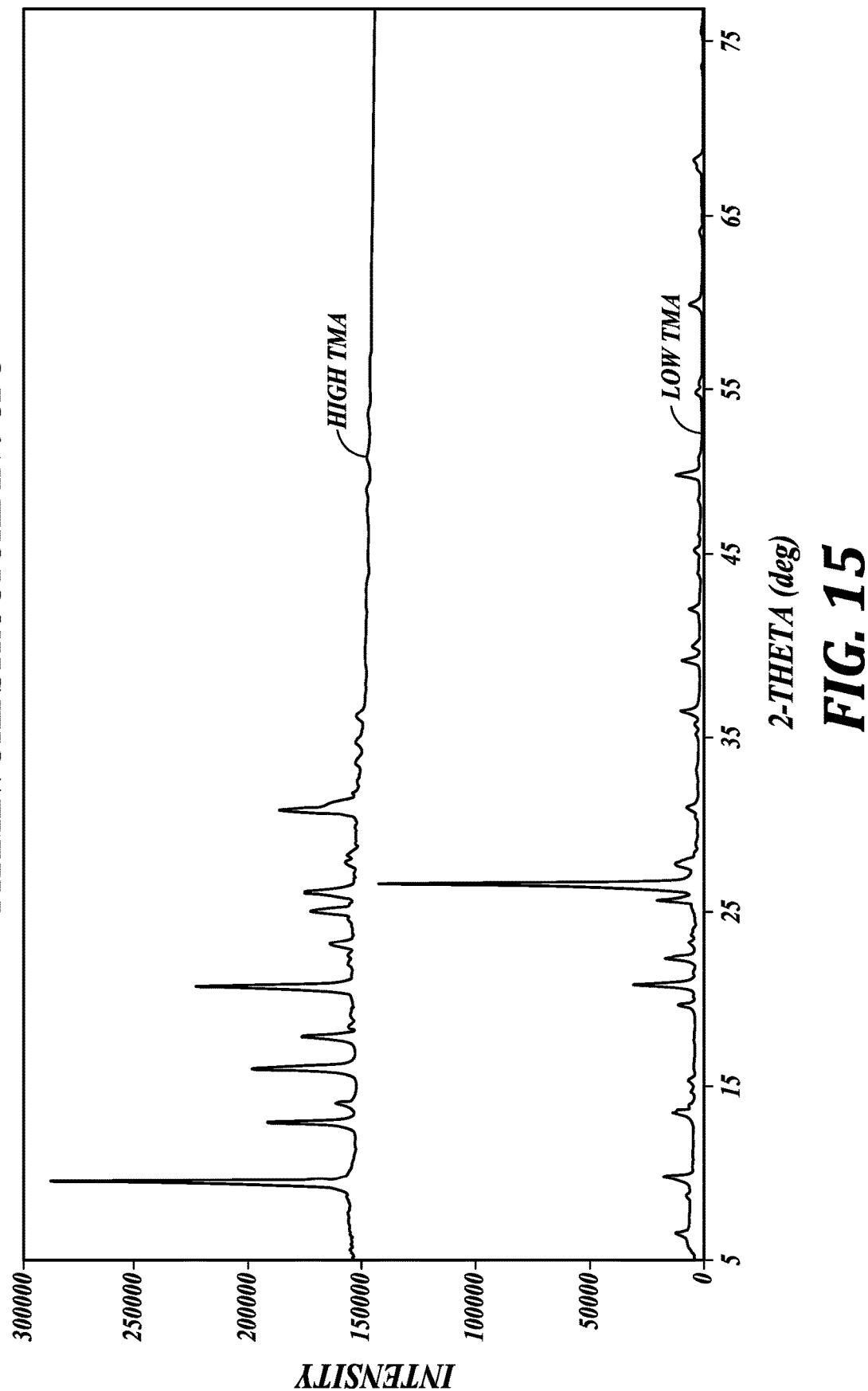
FIG. 15 shows X-ray diffraction patterns of embodiments of intra-crystalline binary catalysts of the present disclosure synthesized using different amounts of organic templating agent.

The comparative XRD profiles of catalysts prepared by these low and high TMA compositions in the reactor are in FIG. 15. The results show that low TMA failed to produce the pure SSZ-13 zeolite framework achieved with high TMA. Furthermore, the zeolite structure resulting from the use of low TMA was that of analcime and/or quartz. Therefore, these data confirm that the preferred reactor composition consisted of relatively high quantities of TMA, in the range of (10 HBC: 10 Al$_2$O$_3$: 100 SiO$_2$: 45 TMA).

Example 6: 50% Urea Decomposition Catalyst

TGA testing procedure evaluated the relative catalytic properties of intra-crystalline binary catalyst in the thermal decomposition (i.e., thermolysis) of 50% urea solution (as an alternative to diesel exhaust fluid, DEF). The protocol included N$_2$ purge gas and 10° C./min thermal ramp from room temperature to 600° C., then switch to air purge gas between 600-800° C. The study involved placing 14 (±1) mg of catalyst into an alumina TGA pan, followed by 40 (±1) mg of a 50% urea solution. FTIR analysis characterized the compounds released during the thermal decomposition, with particular attention paid to the temperature at which peaks for NH$_3$ (966 cm$^{-1}$), CO$_2$ (2360 cm$^{-1}$), and nitrile (2360 cm$^{-1}$) were detected.

Figure 16:
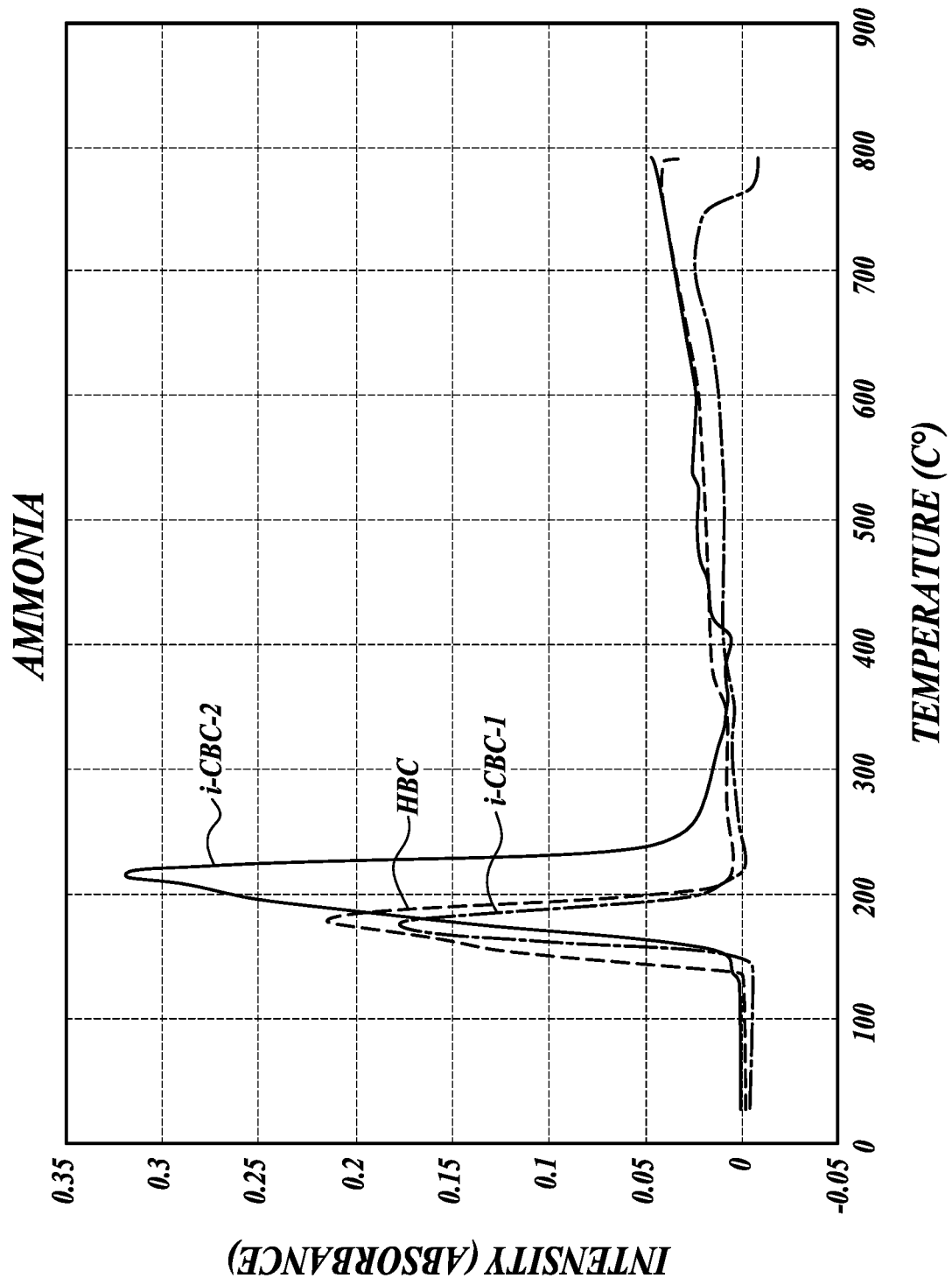
FIG. 16 is a graph showing comparative $NH_3$ release temperature for embodiments of intra-crystalline binary catalysts of the present disclosure, as determined using thermogravimetric analysis (TGA) and Fourier-transform infrared (FTIR) spectroscopy.

FIG. 16 illustrates the relative ability of hybrid binary catalyst (CuHy*ZBFe) and two different forms of intra-crystalline binary catalyst (i-CBC) (based on CuHy*ZY-HBC) to decompose urea to produce ammonia gas. The hybrid binary catalyst and i-CBC-1 released NH$_3$ at essentially identical (relatively low) temperature. By contrast, i-CBC-2 released NH$_3$ at a temperature that was ~30° C. higher. The higher ammonia release temperature is very disadvantageous for achieving ultra-low NO$_x$ emissions standards. Furthermore, a catalyst that has more effective urea decomposition at low temperatures is likely to be more resistant to low temperature catalyst aging. This is especially important as more efficient ammonia decomposition at low temperatures for NO$_x$ conversion helps to facilitate reduction in the quantity of DEF utilized; and hence reduces costs and the potential for low temperature SCR aging.

The results in FIG. 16 were consistent with the NO$_x$ conversion and NH$_3$ storage data reported in Example 3, and is additional data to suggest that other crystal phases contaminating the SSZ-13 framework in intra-crystalline binary catalyst result in very inferior emissions control properties.

Example 7: Passive Soot Oxidation in SCR-On-DPF Application

A 13 L model year 2015 PACCAR MX-13 engine operated at 1,100 rpm, with a slipstream modified aftertreatment system to enable the DEF/engine exhaust mixture flow to 1.4 L (passenger-car size) SCRF was loaded with 4-5 g/l of soot. The engine was operated at 1,100 rpm in a steady state mode, with 3 hrs at each temperature; during which an additional ~0.5 gm soot was delivered from the engine. Increments of 25° C. in the 200-350° C. range were measured. Combined NO$_x$ conversion efficiency and passive soot oxidation (by weight loss) was determined. Also measured was the changing slope of backpressure and the delta in the oxygen exiting the catalyst vs that entering.

Figure 17:
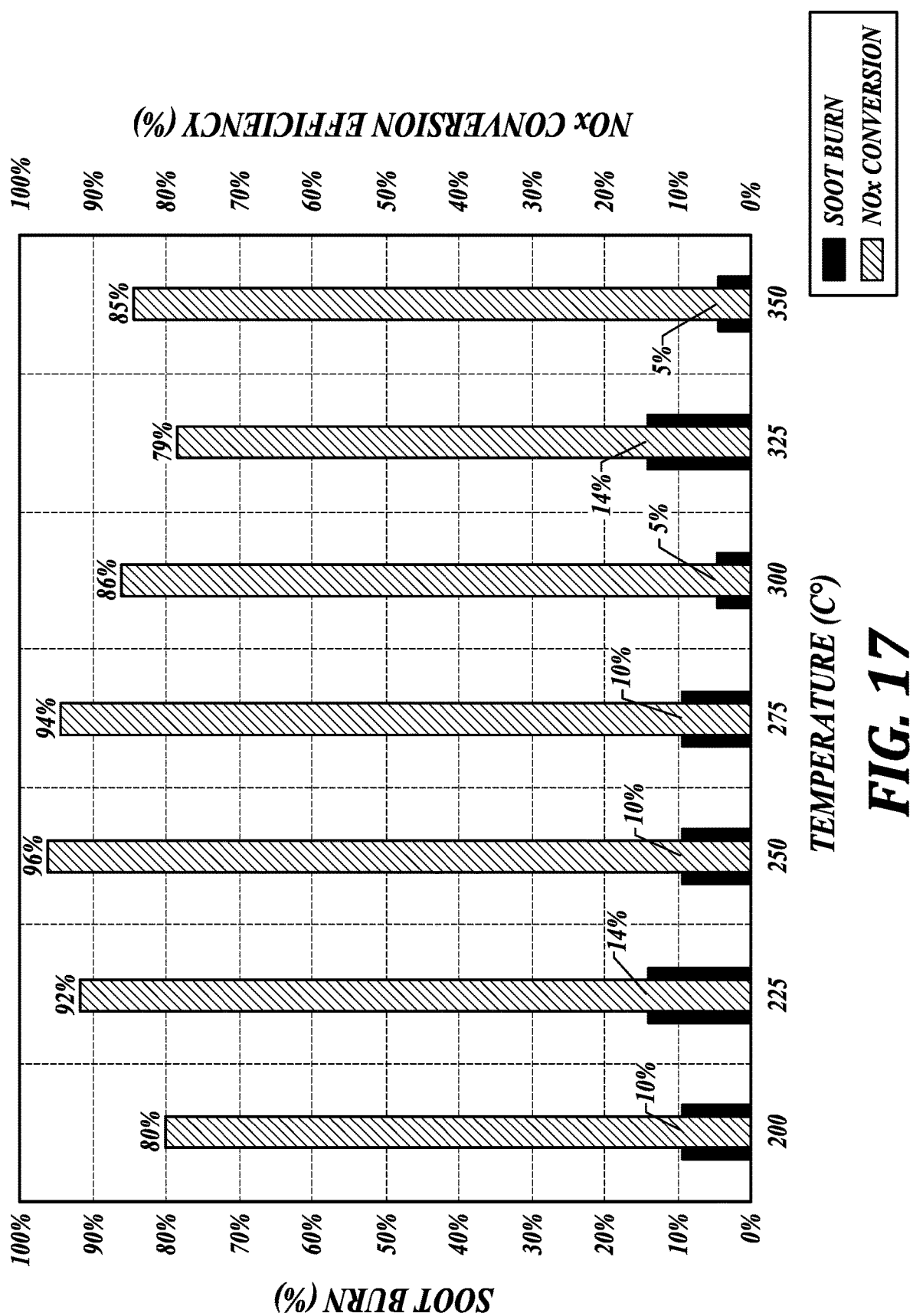
FIG. 17 is a bar graph showing passive soot oxidation and $NO_x$ conversion of an embodiment of intra-crystalline binary catalysts of the present disclosure in a 1.4 L SCRF on engine testing.

Referring to FIG. 17, results show that i-CBC-1Cu from Example 2 exhibited 80% NO$_x$ conversion efficiency at 200° C., while simultaneous passive soot oxidation of 10% weight loss of preloaded soot, and a net production of oxygen from the SCRF. Over the duration of the 200-350° C. temperature tested, there was 68% soot burnt; which is comparable to a diesel particulate filter (DPF, with platinum/palladium catalyst). Additionally, the test showed an initial ΔP of 3.4 kPa, low NH$_3$ Slip low N$_2$O-make, consistent with SGB testing of SCR-on-DPF core samples.

While illustrative embodiments have been illustrated and described, it will be appreciated that various changes can be made therein without departing from the spirit and scope of the disclosure.

A1. A binary catalyst composition, including:
a zeolite having a crystal lattice including a metal oxide, wherein the metal oxide is covalently bound to elements within the crystal lattice.

A2. The binary catalyst composition of Paragraph A1, wherein the metal oxide is in the form of nanoparticles having a particle dimension of from 0.1 to 50 nm.

A3. The binary catalyst composition of Paragraph A1 or Paragraph A2, wherein the zeolite is an aluminosilicate zeolite.

A4. The binary catalyst composition of Paragraph A3, wherein the aluminosilicate zeolite is selected from SSZ-13 chabazite, other aluminosilicate zeolites having SSZ-type zeolite structures, ZSM-5, and β-zeolite.

A5. The binary catalyst composition of any one of Paragraphs A1 to A4, wherein the zeolite is a chabazite.

A6. The binary catalyst composition of any one of Paragraphs A1 to A5, wherein the zeolite includes a silicon to aluminum ratio (Si/Al) of from 2 to 25.

A7. The binary catalyst composition of any one of Paragraphs A1 to A6, wherein the metal oxide is covalently bound to Si atoms in the zeolite crystal lattice.

A8. The binary catalyst composition of any one of Paragraphs A1 to A6, wherein the metal oxide occupies aluminum sites in the zeolite crystal lattice.

A9. The binary catalyst composition of any one of Paragraphs A1 to A8, wherein the binary catalyst composition has from 0.05 wt % to 5 wt % of metal oxide.

A10. The binary catalyst composition of any one of Paragraphs A1 to A9, wherein the metal oxide is selected from lanthanum oxide, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, ferric oxide, manganese oxide, lanthanum oxide, strontium oxide, cobalt oxide, copper oxide, iron oxide, and any combination thereof.

A11. The binary catalyst composition of any one of Paragraphs A1 to A10, wherein the metal oxide is selected from zirconium oxide, vanadium oxide, cerium oxide, manganese oxide, chromium oxide, cobalt oxide, titanium oxide, tungsten oxide, barium oxide, and any combination thereof.

A12. The binary catalyst composition of any one of Paragraphs A1 to A10, wherein the metal oxide is selected from $CeO_2:ZrO_2$, $Y_2O_3:CeO_2$, $BaZrO_3$, $Zr_{0.8}Sr_{0.2}CoO_3$, $Zr_{0.9}Ca_{0.1}O_x$ where x is an amount of O that counterbalances Zr and Ca, $Zr_{0.5}Ba_{0.5}Mn_3O_4$, $Ba_{0.3}Zr_{0.7}O_x$ where x is an amount of O that counterbalances Ba and Zr, $Zr_{0.5}Ba_{0.5}CrO_3$, $Zr_{0.5}Ba_{0.5}CoO_x$ where x is an amount of O that counterbalances Ba, Zr, and Co, $TiO_2:CeO_2$, $ZrO_2$, $Y_2O_3:ZrO_2$, $ZrV_2O_7$, $Zr_{0.3}Ba_{0.1}V_{0.6}O_x$ where x is an amount of O that counterbalances Zr, Ba, and V, $TiO_2:ZrV_2O_7$, each optionally including a cationic dopant including an oxide of $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, $Nb^{5+}$, and any combination thereof.

A13. The binary catalyst composition of any one of Paragraphs A1 to A12, wherein the catalyst composition further includes a cationic dopant, wherein the cationic dopant is an oxide including $Ca^2$, $Mg^2$, $Sc^{3+}$, $y+Tc^{7+}$, $Ag^+$, $Cd^{2+}$, $In^3$, $Sn^2$, $Hf^{4+}$, $Re^{4+}$, $Os^{4+}$, $Ir^{4+}$, $Ir^{3+}$, $Au^{3+}$, $Tl^{3+}$, $Pr^{3+}$, $Nd^{3+}$, $Cu^{2+}$, $Cu^+$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof.

A14. The binary catalyst composition of Paragraph A13, wherein the cationic dopant is present in the catalyst composition at a concentration of from 0.01 wt % to 7 wt %.

A15. The binary catalyst composition of any one of Paragraphs A1 to A14, wherein the catalyst composition is a diesel particulate filter catalyst, a urea hydrolysis catalyst, a selective NOx reduction catalyst (SCR), or an ammonia slip catalyst (AMOX).

A16. The binary catalyst composition of any one of Paragraphs A1 to A15, wherein when the catalyst composition is incorporated into a diesel particulate filter, the catalyst composition converts NOx at an efficiency of greater than or equal to 80% and oxidizes soot at an efficiency of greater than or equal to 10% at a temperature of less than or equal to 200° C.

A17. The binary catalyst composition of any one of Paragraphs A1 to A16, wherein when the catalyst composition is incorporated into a diesel particulate filter, the catalyst composition produces oxygen gas while reducing emission of CO, NO, $NO_2$, $N_2$, hydrocarbons, sulfur-containing gases, soot, urea, ammonia, or any combination thereof.

A18. The binary catalyst composition of any one of Paragraphs A1 to A17, wherein the catalyst composition has an ammonia storage capacity of 1.5 g/L or more.

A19. The binary catalyst composition of any one of Paragraphs A1 to A18, wherein the catalyst composition has a greater ammonia storage capacity compared to a hybrid binary catalyst of the same elemental composition in the same proportion.

A20. The binary catalyst compositions of any one of Paragraphs A1 to A19, wherein the catalyst composition has a greater soot oxidation efficiency compared to a hybrid binary catalyst of the same elemental composition in the same proportion.

A21. A method of making the binary catalyst composition of Paragraph A1, including:

providing a reaction mixture including an organic zeolite-templating agent, a seed catalyst composition including a plurality of metal oxide nanoparticles hybridized to a zeolite, a zeolite precursor, a base, and optionally a metal oxide precursor;

stirring the mixture, incubating the mixture at a temperature of 150° C. or more;

filtering the mixture to obtain a solid, and calcining the solid to provide the binary catalyst composition.

A22. The method of Paragraph A21, wherein organic zeolite-templating agent includes trimethyladamantylammonium hydroxide, trimethyl-1-adamantylammonium iodide, copper tetraethylenepentamine, tricyclodecane, copper diethylenetriamine, N1-butyl-N4-docosyl-N1,N1,N4,N4-tetramethylbutane-1,4-diaminium dibromide, or 3-azoniabicyclo[3.2.1]octane at a concentration of from 10% to 30% by weight.

A23. The method of Paragraph A21 or A22, wherein the zeolite precursor includes silica ($SiO_2$), alumina ($Al_2O_3$), fumed silica, fumed alumina, silica gel, Rh on alumina, ammonium hexafluorosilica, or any combination thereof.

A24. The method of any one of Paragraphs A19 to A21, wherein the zeolite precursor includes silica and alumina at a weight ratio of 10:3 or more and 100:3 or less.

A25. The method of any one of Paragraphs A19 to A22, wherein the mixture further includes a metal cation precursor.

The embodiments of the disclosure in which an exclusive property or privilege is claimed are defined as follows:

1. A binary catalyst composition; comprising:
   a zeolite having a crystal lattice; and
   a metal oxide covalently bound to elements within the crystal lattice, wherein the metal oxide is selected from lanthanum oxide, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, barium oxide, yttrium oxide, scandium oxide, calcium oxide, manganese oxide, lanthanum oxide, strontium oxide, copper oxide, and any combination thereof.

2. The binary catalyst composition of claim 1, wherein the metal oxide is in the form of nanoparticles having a maximum particle dimension of 5 nm.

3. The binary catalyst composition of claim 1, wherein the zeolite is an aluminosilicate zeolite.

4. The binary catalyst composition of claim 3, wherein the aluminosilicate zeolite is selected from SSZ-13 chabazite, aluminosilicate zeolites having SSZ-type zeolite structures, ZSM-5, and β-zeolite.

5. The binary catalyst composition of claim 1, wherein the zeolite is a chabazite.

6. The binary catalyst composition of claim 1, wherein the zeolite comprises a silicon to aluminum ratio (Si/Al) of from 2 to 25.

7. The binary catalyst composition of claim 3, wherein the metal oxide is covalently bound to Si atoms in the aluminosilicate zeolite crystal lattice and occupies an aluminum site in the aluminosilicate zeolite crystal lattice.

8. The binary catalyst composition of claim 1, wherein the binary catalyst composition has from 0.05 wt % to 5 wt % of metal oxide.

9. The binary catalyst composition of claim 1, wherein the metal oxide is selected from $CeO_2:ZrO_2$, $Y_2O_3:CeO_2$, $BaZrO_3$, $Zr_{0.9}Ca_{0.10}x$ where x is an amount of O that counterbalances Zr and Ca, $Zr_{0.5}Ba_{0.5}Mn_3O_4$, $Ba_{0.3}Zr_{0.70}x$ where x is an amount of O that counterbalances Ba and Zr, $Zr_{0.5}Ba_{0.5}CrO_3$, $TiO_2:CeO_2$, $ZrO_2$, $Y_2O_3:ZrO_2$, $ZrV_2O_7$, $Zr_{0.3}Ba_{0.1}V_{0.6}Ox$ where x is an amount of O that counterbalances Zr, Ba, and V, $TiO_2$: $ZrV_2O_7$, each optionally comprising a cationic dopant comprising an oxide of $Ba^{2+}$, $Pt^{2+}$, $Pd^{2+}$, $Rh^{2+}$, $Ru^{2+}$, $Cu^{2+}$, $Ni^{2+}$, $Fe^{3+}$, $W^{4+}$, $Mo^{4+}$, $La^{3+}$, $Ti^{2+}$, $Sr^{2+}$, $Nb^{5+}$, and any combination thereof.

10. The binary catalyst composition of claim 1, wherein the catalyst composition further comprises a cationic dopant, wherein the cationic dopant is an oxide comprising $Ca^{2+}$, $Mg^{2+}$, $Sc^{3+}$, $Y^{3+}$, $Tc^{7+}$, $Ag^{+}$, $Cd^{2+}$, $In^{3+}$, $Sn^{2+}$, $Hf^{4+}$, $Re^{4+}$, $Os^{4+}$, $Ir^{4+}$, $Ir^{3+}$, $Au^{3+}$, $Tl^{3+}$, $Pr^{3+}$, $Nd^{3+}$, $Cu^{2+}$, $Cu^{+}$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof.

11. The binary catalyst composition of claim 10, wherein the cationic dopant is present in the catalyst composition at a concentration of from 0.01 wt % to 7 wt %.

12. The binary catalyst composition of claim 1, wherein the catalyst composition is a diesel particulate filter catalyst, a urea hydrolysis catalyst, a selective NOx reduction catalyst (SCR), or an ammonia slip catalyst (AMOX).

13. The binary catalyst composition of claim 1, wherein when the catalyst composition is incorporated into a diesel particulate filter, the catalyst composition converts NOx at an efficiency of greater than or equal to 80% and oxidizes soot at an efficiency of greater than or equal to 10%, at a temperature of less than or equal to 200° C.

14. The binary catalyst composition of claim 1, wherein when the catalyst composition is incorporated into a diesel particulate filter, the catalyst composition produces oxygen gas while reducing emission of CO, NO, $NO_2$, $N_2O$, hydrocarbons, sulfur-containing gases, soot, urea, ammonia, or any combination thereof.

15. The binary catalyst composition of claim 1, wherein the catalyst composition has an ammonia storage capacity of 1.5 g/L or more.

16. A binary catalyst composition comprising:
    a zeolite having a crystal lattice; and
    a metal oxide covalently bound to elements within the crystal lattice, the binary catalyst composition produced by a method including:
       providing a reaction mixture comprising an organic zeolite-templating agent, a seed catalyst composition comprising a plurality of metal oxide nanoparticles hybridized to a zeolite, a zeolite precursor, a base, and optionally a metal oxide precursor;
       stirring the reaction mixture,
       incubating the reaction mixture at a temperature of 150° C. or more;
       filtering the reaction mixture to obtain a solid, and
       calcining the solid to provide the binary catalyst composition.

17. The binary catalyst composition of claim 16, wherein the organic zeolite-templating agent comprises trimethyladamantylammonium hydroxide, trimethyl-1-adamantylammonium iodide, copper tetraethylenepentamine, tricyclodecane, copper diethylenetriamine, N1-butyl-N4-docosyl-N1, N1,N4,N4-tetramethylbutane-1,4-diaminium dibromide, and/or 3-azoniabicyclo[3.2.1]octane at a concentration of from 10% to 30% by weight.

18. The binary catalyst composition of claim 16, wherein the zeolite precursor comprises silica, alumina, fumed silica, fumed alumina, silica gel, Rh on alumina, and/or ammonium hexafluorosilica, or any combination thereof.

19. The binary catalyst composition of claim 16, wherein the zeolite precursor comprises silica and alumina at a weight ratio of 10:3 or more and 100:3 or less.

20. The binary catalyst composition of claim 16, wherein the mixture further comprises a metal cation precursor.

21. The binary catalyst composition of claim 16, wherein the metal oxide is selected from lanthanum oxide, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, ferric oxide, manganese oxide, lanthanum oxide, strontium oxide, cobalt oxide, copper oxide, iron oxide, and any combination thereof.

* * * * *

UNITED STATES PATENT AND TRADEMARK OFFICE
CERTIFICATE OF CORRECTION

PATENT NO. : 10,906,031 B2  
APPLICATION NO. : 16/377035  
DATED : February 2, 2021  
INVENTOR(S) : Randal A. Goffe Page 1 of 1

It is certified that error appears in the above-identified patent and that said Letters Patent is hereby corrected as shown below:

In the Claims

Column 37, Claim 1, Line 3:
"A binary catalyst composition; comprising:" should read: --A binary catalyst composition comprising:--.

Column 37, Claim 9, Line 39:
"BaZrO3, Zr0.9Ca0.10x" should read: --BaZrO3, Zr0.9Ca0.1Ox--.

Column 37, Claim 9, Line 41:
"Ba0.3Zr0.70x" should read: --Ba0.3Zr0.7Ox--.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*